(12) United States Patent
Amaya et al.

(10) Patent No.: US 11,764,636 B2
(45) Date of Patent: Sep. 19, 2023

(54) MOTOR

(71) Applicant: Panasonic Intellectual Property Management Co., Ltd., Osaka (JP)

(72) Inventors: Takanori Amaya, Osaka (JP); Akihiko Watanabe, Osaka (JP); Yoshikazu Yamagata, Osaka (JP); Yasuo Nanbu, Osaka (JP); Hisaaki Kato, Osaka (JP); Yasunori Wakamori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 114 days.

(21) Appl. No.: 17/141,886

(22) Filed: Jan. 5, 2021

(65) Prior Publication Data
US 2021/0126505 A1   Apr. 29, 2021

Related U.S. Application Data

(62) Division of application No. 16/461,882, filed as application No. PCT/JP2017/041969 on Nov. 22, 2017, now Pat. No. 11,190,076.

(30) Foreign Application Priority Data

Nov. 28, 2016 (JP) ................................ 2016-229628
Dec. 28, 2016 (JP) ................................ 2016-254573
Feb. 10, 2017 (JP) ................................ 2017-022671

(51) Int. Cl.
*H02K 5/10* (2006.01)
*H02K 5/136* (2006.01)
(Continued)

(52) U.S. Cl.
CPC ............. *H02K 5/136* (2013.01); *H02K 1/185* (2013.01); *H02K 7/083* (2013.01); *H02K 21/16* (2013.01)

(58) Field of Classification Search
CPC ........ H02K 5/136; H02K 1/185; H02K 7/083; H02K 21/16; H02K 3/522; H02K 5/08;
(Continued)

(56) References Cited

U.S. PATENT DOCUMENTS 4,387,311 A     6/1983  Kobayashi et al.
6,040,647 A *   3/2000  Brown .................. H02K 15/16
                                                29/596
(Continued)

FOREIGN PATENT DOCUMENTS

JP     S50-101801 A    8/1975
JP     S53-016113 U    2/1978
(Continued)

OTHER PUBLICATIONS

Extended European Search Report dated Oct. 5, 2020 for the related European Patent Application No. 20181415.9.
(Continued)

*Primary Examiner* — Thomas Truong
(74) *Attorney, Agent, or Firm* — McDermott Will & Emery LLP

(57) ABSTRACT

A motor according to the present invention includes: a stator having a stator core and a coil; a rotor having a rotary shaft and a rotation body; a shaft bearing rotatably supporting the rotor; and a molding resin covering the stator. The motor has a coil end that is the coil protruding from the stator core in a shaft center X direction, and has a non-combustible layer provided to cover the coil end. The non-combustible layer is a metallic cover made of, for example, metal. The metallic cover is disposed to cover a periphery of a coil assembly in which the coil is formed on the stator core through an insulator. The metallic cover is integrated with the coil assembly by a molding resin.

3 Claims, 37 Drawing Sheets

(51) Int. Cl.
*H02K 1/18* (2006.01)
*H02K 7/08* (2006.01)
*H02K 21/16* (2006.01)

(58) Field of Classification Search
CPC . H02K 11/20; H02K 3/34; H02K 3/00; H02K 3/30; H02K 3/38
See application file for complete search history.

(56) References Cited

U.S. PATENT DOCUMENTS

| | | | |
|---|---|---|---|
| 2010/0019588 A1* | 1/2010 | Makino | H02K 15/12 310/52 |
| 2012/0274157 A1 | 11/2012 | Watanabe et al. | |
| 2013/0209239 A1 | 8/2013 | Karlsson et al. | |
| 2013/0300223 A1 | 11/2013 | Kondo et al. | |
| 2014/0319936 A1 | 10/2014 | Makino et al. | |
| 2020/0006991 A1 | 1/2020 | Yamagata et al. | |

FOREIGN PATENT DOCUMENTS

| | | |
|---|---|---|
| JP | 54-082662 A | 7/1979 |
| JP | 54-182805 U | 12/1979 |
| JP | S54-183602 U | 12/1979 |
| JP | S58-072354 A | 4/1983 |
| JP | 61-176948 U | 11/1986 |
| JP | H5-336698 A | 12/1993 |
| JP | 2000-333429 A | 11/2000 |
| JP | 2002-272645 A | 9/2002 |
| JP | 2007-228673 A | 9/2007 |
| JP | 2014-121222 A | 6/2014 |
| JP | 2014-217239 A | 11/2014 |
| JP | 2015-015804 A | 1/2015 |
| JP | 2015015804 A * | 1/2015 |
| JP | 5972502 B1 | 8/2016 |
| WO | 2012/101976 A1 | 8/2012 |
| WO | 2013/128881 A1 | 9/2013 |

OTHER PUBLICATIONS

Extended European Search Report dated Oct. 6, 2020 for the related European Patent Application No. 20181429.0.
Extended European Search Report dated Oct. 23, 2019 for the related European Patent Application No. 17872916.6.
International Search Report of PCT application No. PCT/JP2017/041969 dated Feb. 13, 2018.
Non-Final Office Action issued in corresponding U.S. Appl. No. 16/461,882, dated Sep. 17, 2020.
Non-Final Office Action issued in corresponding U.S. Appl. No. 16/461,882, dated May 11, 2021.
Communication pursuant to Article 94(3) EPC dated Apr. 1, 2021 for the related European Patent Application No. 17872916.6.

* cited by examiner

MOTOR

CROSS-REFERENCE TO RELATED APPLICATIONS

This application is a Divisional Application of U.S. application Ser. No. 16/461,882, dated May 17, 2019, which is the U.S. national stage application of the PCT International Application No. PCT/JP2017/041969 filed on Nov. 22, 2017, which claims the benefit of foreign priority of Japanese patent application 2016-229628 filed on Nov. 28, 2016, Japanese patent application 2016-254573 filed on Dec. 28, 2016 and Japanese patent application 2017-022671 filed on Feb. 10, 2017, the contents all of which are incorporated herein by reference.

TECHNICAL FIELD

The present invention relates to a motor whose stator is covered with molding resin.

BACKGROUND ART

FIG. 41 is a cross-sectional view showing a configuration example of conventional motor 900. As shown in FIG. 41, motor 900 includes rotor 920 and stator 910, where stator 910 is covered with molding resin 931; and a motor having this configuration is also referred to as molded motor and already well-known (for example, PTL 1).

As shown in FIG. 41, stator 910 has: stator core 911 made of a plurality of metallic sheets; and coil 912 made of a winding wire wound on stator core 911. Coil 912 provided on stator 910 is covered with molding resin 931. In particular, a part protruding from stator core 911 of coil 912 as shown in FIG. 41 is also referred to as coil end 912a. Between coil 912 and stator core 911, there is attached insulator 913 for the purpose of electric insulation between coil 912 and stator core 911.

Incidentally, when an excessive current flows through coil 912, coil 912 generates heat and heats up to extremely high temperatures, and there is a possibility of causing a layer short. For this reason, an outer periphery of a conductor of the winding wire constituting coil 912 is covered with insulating material. However, when coil 912 generates heat, the insulating material of the winding wire whose outer periphery is insulated with the insulating material may be melted, and for this reason or other reasons, conductors can be short circuited. In a case where a layer short has occurred in coil 912 under an unusual environment where any safety protection device cannot work at all, a spark sometimes occurs. When a spark due to a layer short has occurred, a gas may be generated due to insulator 913 or the like heated by the spark, and the gas can be ignited by the spark and can generate flame.

On the other hand, on a part where coil 912 is in contact with molding resin 931 or other parts, applied heat and the like sometimes cause deterioration of physical properties of molding resin 931. When the physical properties of molding resin 931 has been deteriorated, a crack or the like will be generated in molding resin 931.

As a result, if a layer short has occurred while a crack or the like is generated in molding resin 931, gas generated from insulator 913 or the like is sometimes ignited to generate fire, and the generated fire can leak out of motor 900 through a part of molding resin 931 having the crack or the like.

In this case, the possibility of fire or smoke leaking outside is extremely low since all part but coil end 912a of coil 912 is surrounded by stator core 911. However, because coil end 912a protrudes from stator core 911, coil end 912a is in contact with molding resin 931. Therefore, there is a possibility that flame is generated on a part, of molding resin 931, being in contact with coil end 912a and that fire or smoke leaks outside.

In the above-described motor and in a device in which the motor is provided (the device is also referred to as motored device), in order to prevent fire or smoke from leaking out due to an excessive current flowing through the coil as described above, a safe protection circuit for preventing an excessive current from flowing through the coil of the stator is provided inside motors (for example, on a control board provided inside a motor) or in motored devices.

CITATION LIST

Patent Literature

PTL 1: PCT International Publication No. WO 2012/101976

SUMMARY

A motor of the present invention includes a stator and a rotor. The stator has a stator core and a coil wound on the stator core. The rotor is located on an inner side of the stator and has: a rotary shaft extending in a shaft center direction; and a rotation body that contains a magnet component, extends in a shaft center direction, and is fixed to the rotary shaft. The motor further includes: a shaft bearing rotatably supporting the rotor; and a molding resin covering the stator. The coil has a coil end protruding in the shaft center direction from the stator core, and the motor includes a non-combustible layer provided to cover the coil end.

With this configuration, since the non-combustible layer is provided to cover the coil end of the coil the stator, even if by any chance a safe protection circuit for preventing an excessive current from flowing through the coil of the stator does not normally function and an excessive current flows through the coil of the stator to cause a layer short, fire caused by the insulator or the like is blocked by the non-combustible layer, and fire and smoke can be prevented from coming outside of the motor.

Further, in a motor of the present invention, at least a part of the non-combustible layer is formed to extend in the shaft center direction at a position on an outer peripheral side of the coil end.

With this configuration, if fire is about to spread to the outer peripheral side of the coil end, the fire is blocked by the non-combustible layer. The non-combustible layer may be formed on the outer surface of the molding resin.

Further, in the motor of the present invention, at least a part of the non-combustible layer is formed to extend, in a radial direction, at a position on the side of the coil end opposite to the stator core.

With this configuration, even if fire is about to spread to the side of the coil end opposite to the stator core, in other words, to the outer side in the shaft center direction, the fire is blocked by the non-combustible layer. The non-combustible layer may be formed on the outer surface of the molding resin.

Further, the non-combustible layer of the motor of the present invention may be formed to cover the coil end from a position on the outer peripheral side of the coil end, from a position on the side of the coil end opposite to the stator core, and from a position on the inner peripheral side of the coil end.

With this configuration, fire is blocked by the non-combustible layer, even if the fire is about to spread in any direction to the following positions: the position on the outer peripheral side of the coil end; the position on the side of the coil end opposite to the stator core; and the position on the inner peripheral side of the coil end.

The non-combustible layer may be formed of air or may be formed of a non-combustible material such as inorganic material such as metal or ceramic. It is preferable that a metallic cover be further provided to cover the coil end through the molding resin.

The non-combustible layer of the motor of the present invention may cover a transition wire for the coil in addition to the coil end. The conductive wire constituting the coil of the stator can break in some cases. If by any chance a safe protection circuit for preventing an excessive current from flowing through the coil of the stator does not normally function and an excessive current flows through a conductive wire constituting the coil of the stator (for example, the transition wire), the conductive wire sparks and generates a spark at the time of wire break. In this case, there will be a possibility that a gas generated from the insulator or the like can be ignited by the spark and can generate flame. However, also in this case, since the non-combustible layer covers the transition wire for the coil, the fire generated from the transition wire at the time of wire break is blocked by the non-combustible layer.

As described above, the present invention is provided with a non-combustible layer covering the coil end protruding in the shaft center direction from the stator core. Owing to the above arrangement, even if by any chance a safe protection circuit for preventing an excessive current from flowing through the coil of the stator does not normally function and an excessive current flows through the coil of the stator to cause a layer short, the fire caused by the insulator or the like is blocked by the non-combustible layer, with the present invention. Therefore, fire and smoke can be prevented from coming outside of the motor. As a result, reliability and safety as a motor is further improved. Further, if a metallic cover is further provided to cover the coil end through the molding resin, it is possible to more surely prevent fire and smoke from coming outside of the motor.

DESCRIPTION OF PREFERRED EMBODIMENTS

In a motor in each exemplary embodiment of the present invention, a configuration to be described later can more surely prevent fire and smoke from coming outside of the motor.

That is to say, a safe protection circuit to deal with overcurrent is conventionally provided as described above; however, in a case where by any chance none of safe protection circuits functions normally, an excessive current can flow through the coil of the stator. For this reason, in order to improve tolerance of motored devices, a motor that is a constituent element of motored devices needs to be safer. Specifically, there is an issue that it is required to prevent fire from leaking from a motor to the outside of the motor even if a layer short has occurred in the coil under the above-mentioned unusual environment.

To address the issue, in the present exemplary embodiment, in a motor molded with a molding resin, there is provided a non-combustible layer covering at least a coil end. The present exemplary embodiment can more surely prevent fire and smoke from coming outside of a motor.

Hereinafter, exemplary embodiments of the present invention will be described with reference to the drawings. Note that, in the following description, the same components are assigned the same reference marks, and corresponding descriptions are used.

First Exemplary Embodiment

Figure 1:
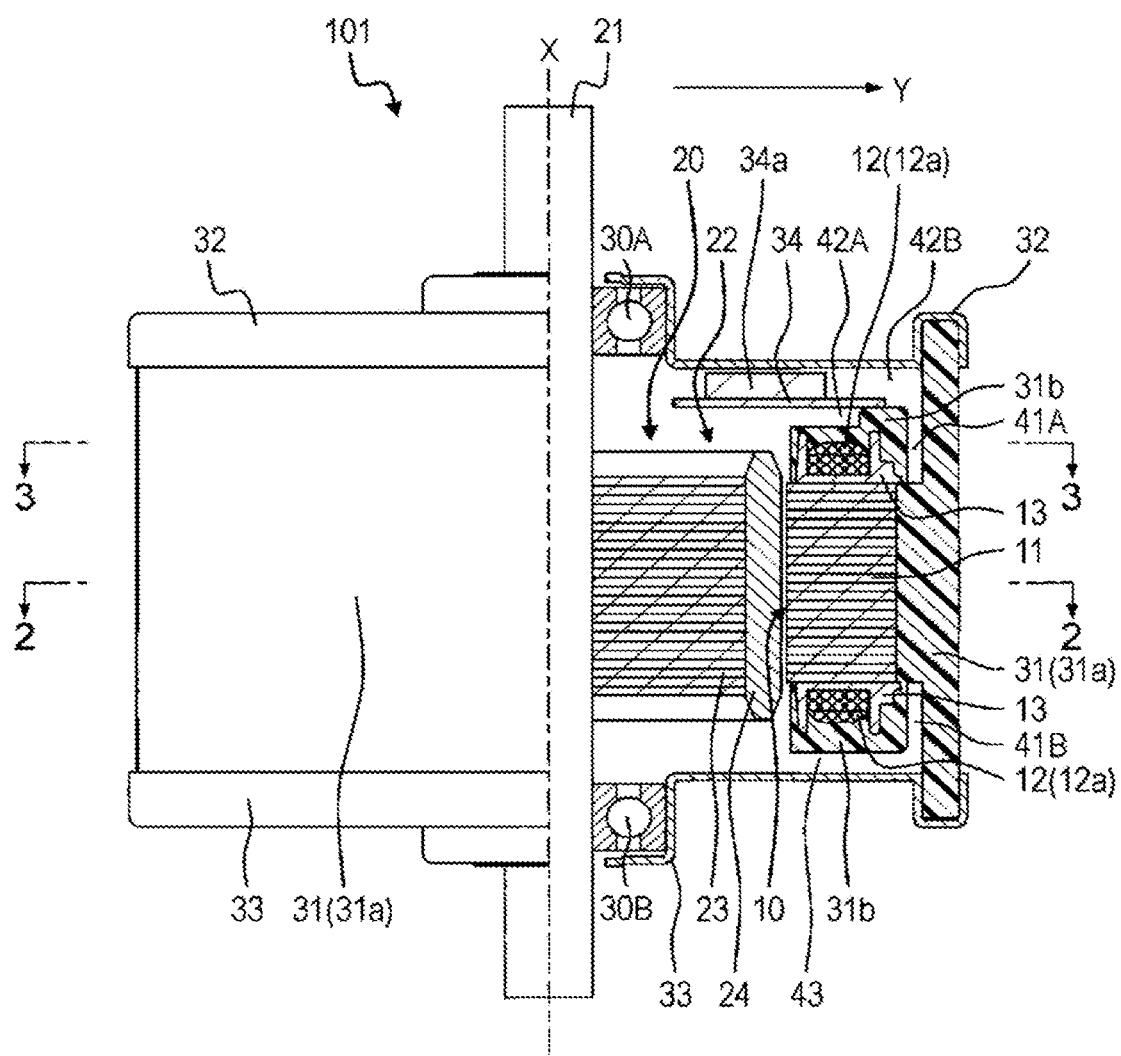
FIG. 1 is a half cross-sectional view of a motor according to a first exemplary embodiment of the present invention.
Figure 2:
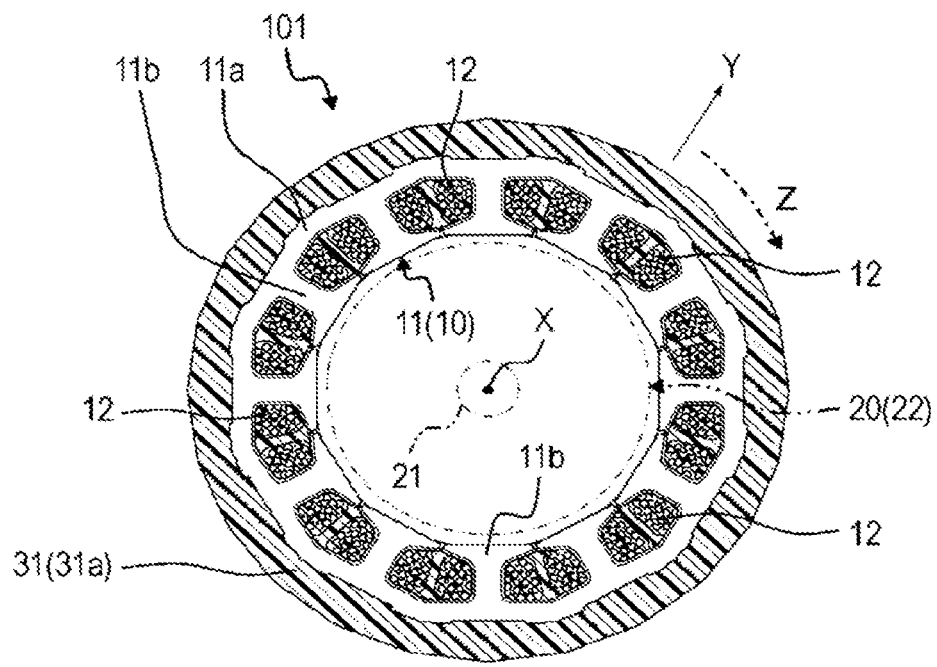
FIG. 2 is a plan cross-sectional view of the motor according to the first exemplary embodiment of the present invention taken along line 2-2 in FIG. 1.
Figure 3:
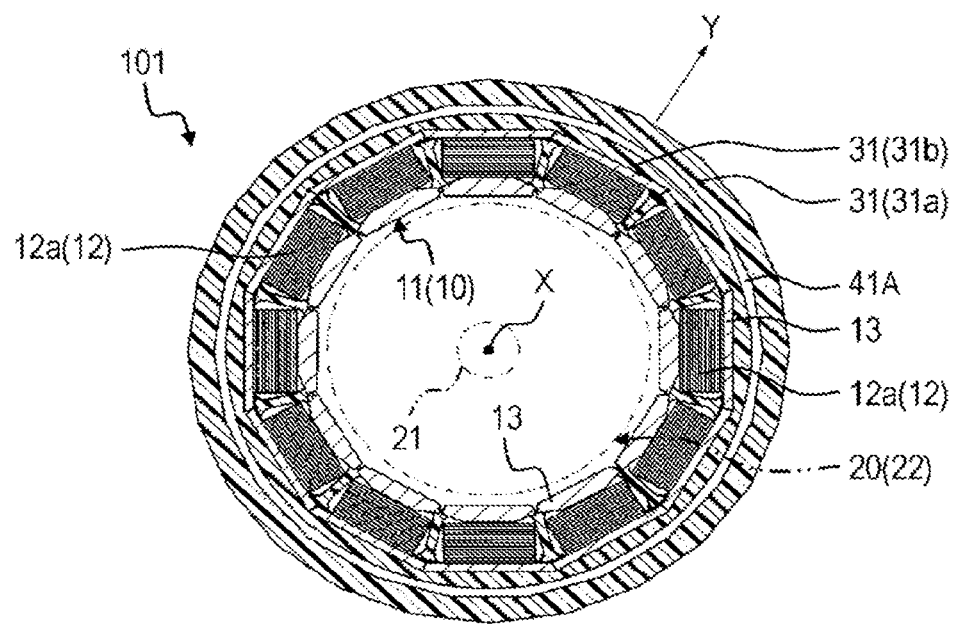
FIG. 3 is a plan cross-sectional view of the motor according to the first exemplary embodiment of the present invention taken along line 3-3 in FIG. 1.
Figure 4:
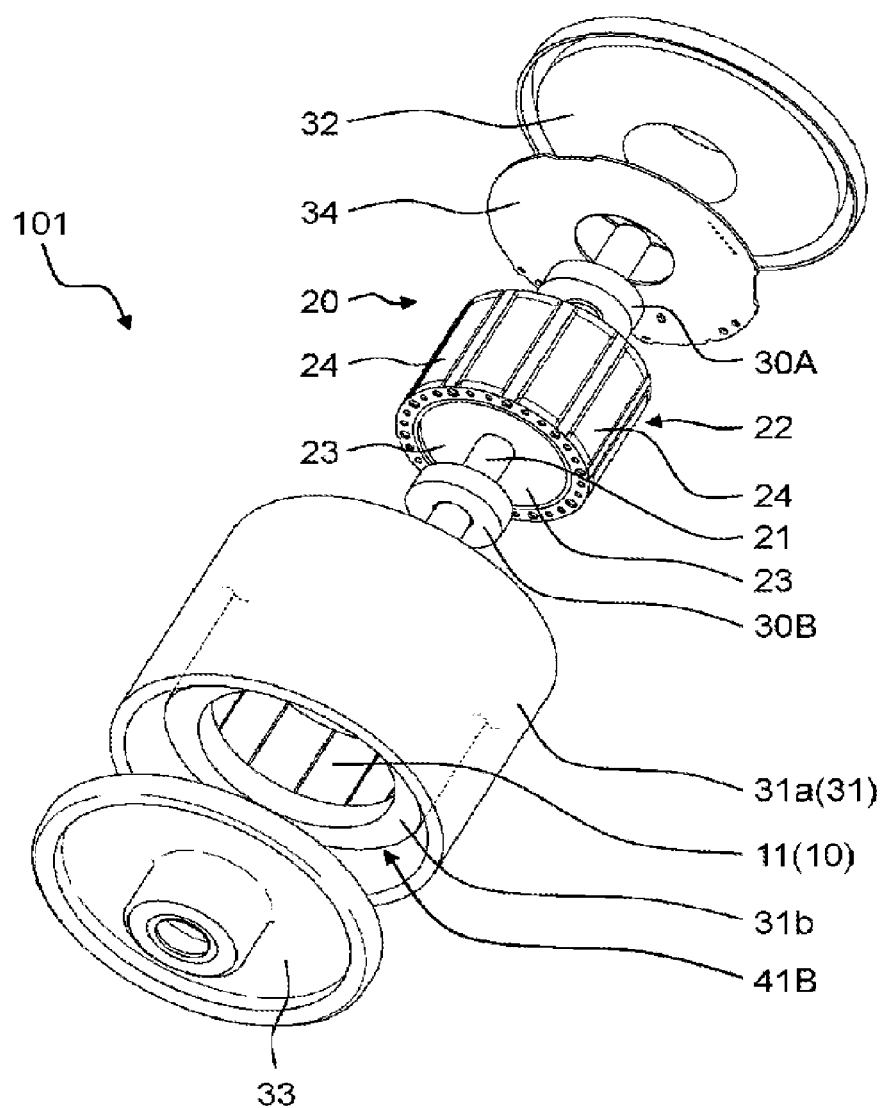
FIG. 4 is an exploded perspective view of the motor according to the first exemplary embodiment of the present invention.
Figure 5:
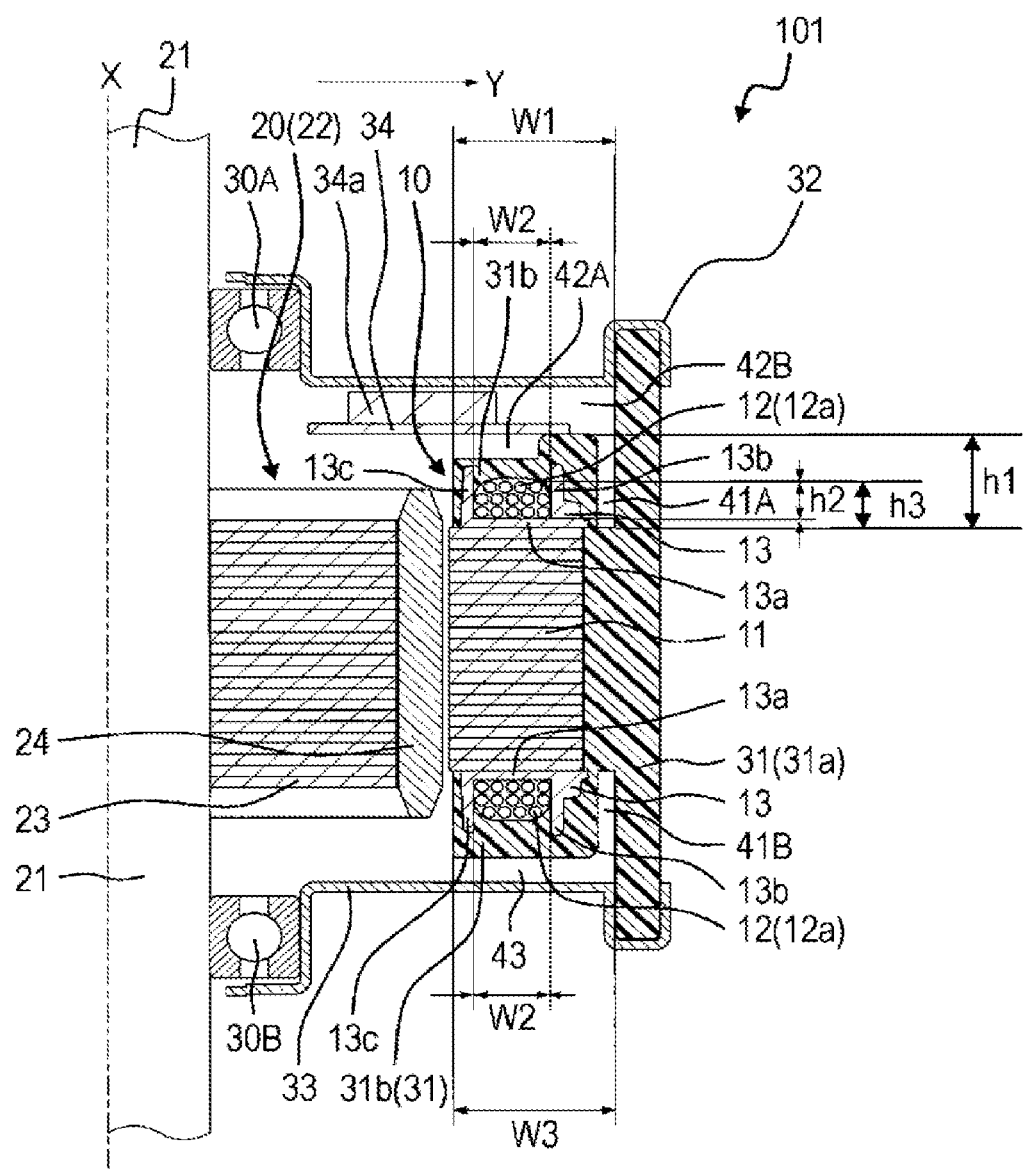
FIG. 5 is an enlarged half cross-sectional view of a main part of the motor according to the first exemplary embodiment of the present invention.

FIG. 1 is a half cross-sectional view of motor 101 according to a first exemplary embodiment of the present invention. FIG. 2 is a plan cross-sectional view of motor 101 according to the first exemplary embodiment of the present invention taken along line 2-2 in FIG. 1. FIG. 3 is a plan cross-sectional view of motor 101 according to the first exemplary embodiment of the present invention taken along line 3-3 in FIG. 1. FIG. 4 is an exploded perspective view of motor 101 according to the first exemplary embodiment of the present invention. FIG. 5 is an enlarged half cross-sectional view of a main part of motor 101 according to the first exemplary embodiment of the present invention.

As shown in FIGS. 1 to 5, motor 101 includes stator 10, rotor 20 located inside stator 10, a pair of shaft bearings 30A, 30B, and molding resin 31 covering stator 10. Rotor 20 has rotary shaft 21 disposed at a center of rotor 20. Rotor 20 are rotatably supported with both sides of rotary shaft 21 being held by the pair of shaft bearings 30A, 30B. Note that illustrated motor 101 is a brushless motor. In addition, in the present exemplary embodiment, motor 101 is also provided with: first and second brackets 32 and 33 constituting an outer shell (chassis) of motor 101; and circuit board 34. First and second brackets 32, 33 are made of metal and have an approximately disk shape in a plan view Stator 10 has: stator core 11 configured with a plurality of metallic sheets being laminated; and coils 12 wound on stator core 11. As shown in FIGS. 2 and 3, stator core 11 has: yoke 11a formed to surround rotor 20 disposed along shaft center X of rotary shaft 21; and a plurality of teeth 11b protruding in a protruding shape from yoke 11a toward shaft center X.

In the following description, the words "teeth" (plural form of tooth) and "tooth" are separately used. Specifically, a plurality of teeth protruding in a central direction of a stator core having a circular ring-shape are written as teeth (plural form of tooth). One of the plurality of teeth of the stator core is written as tooth.

Shaft center X is also referred to as shaft direction X.

As shown in FIGS. 1 and 4, rotor 20 has: rotary shaft 21 extending in a shaft center X direction; and rotation body 22 that includes a magnet component, extends in the shaft center X direction, and is fixed to rotary shaft 21. Rotation body 22 is configured, for example, with a plurality of magnets 24, which are permanent magnets, assembled on an outer peripheral surface of rotor core 23 such that polarities of adjacent magnets 24 are alternately arranged. Rotary shaft 21 of rotor 20 is rotatably supported by shaft bearing 30A fit in a central part of first bracket 32 and by shaft bearing 30B fit in a central part of second bracket 33, whereby rotor 20 is rotatably supported.

As shown in FIG. 5, coil 12 is wound on stator core 11 via insulators 13 made of insulating material such as resin. Schematically, insulators 13 each have bottom surface part 13a, outer peripheral wall 13b, and inner peripheral wall 13c.

Bottom surface parts 13a of insulators 13 are each mounted on an end surface of stator core 11 or the like. In the present exemplary embodiment, bottom surface part 13a of each insulator 13 is formed of a plane extending in a direction that intersects with shaft center X. Outer peripheral wall 13b of each insulator 13 is vertically provided on the outer peripheral side of a part on which coil 12 is wound, and outer peripheral wall 13b restricts the coil position. In the present exemplary embodiment, outer peripheral wall 13b of each insulator 13 is formed of a wall surface extending in a direction along shaft center X. Inner peripheral wall 13c of each insulator 13 is vertically provided on an inner peripheral side of a part on which coil 12 is wound, and inner peripheral wall 13c restricts the coil position. Inner peripheral wall 13c of each insulator 13 is formed of a wall surface extending in a direction along shaft center X. Inner peripheral wall 13c of each insulator 13 is located closer to shaft center X than outer peripheral wall 13b is. As long as insulator 13 insulates between coil 12 and stator core 11, a shape of insulator 13 is not limited to the above-described shape.

Coil 12 has coil ends 12a each protruding in the shaft center X direction from stator core 11. With respect to FIGS. 1 and 5, coil ends 12a each stick out and protrude from stator core 11 upward and downward on the diagram. As shown in FIGS. 2 and 3, a part of each coil 12 other than coil ends 12a is included in stator core 11. Coils 12, insulators 13, and stator core 11 of stator 10 except an inner peripheral surface of each tooth 11b are covered with molding resin 31. An outer peripheral surface side part of molding resin 31 is formed in a cylindrical shape and constitutes barrel (case barrel) 31a, which is a part of an outer shell (chassis) of motor 101. End edges of barrel 31a are each inserted in an outer circumferential part of each of first and second brackets 32 and 33, thereby being fixed. As shown in FIG. 1, in the present exemplary embodiment, circuit board 34 is mounted on a part of a section, of molding resin 31, covering coils 12. Electronic component 34a constituting a connection circuit to coils 12, various control circuits, and a safe protection circuit are mounted on circuit board 34.

Motor 101 is provided with non-combustible layers 41A, 41B, 42A, 42B, 43 that cover coil ends 12a. In the present exemplary embodiment, as shown in FIGS. 1 and 5, non-combustible layers 41A, 41B, 42A, 42B, 43 constituted by air in a space part are provided to cover coil end molds 31b of molding resin 31 from outside, where coil end molds 31b cover coil ends 12a.

In more detail, groove-shaped recesses are each formed in a part between each coil end mold 31b and barrel 31a, and non-combustible layers 41A, 41B serving as groove parts are each formed of air in each of spaces of the groove-shaped recesses. These non-combustible layers 41A, 41B are at positions in molding resin 31 on the outer peripheral side of coil ends 12a and each extend to cover a dimension range corresponding to each coil end 12a in the shaft center X direction. In other words, in the present exemplary embodiment, non-combustible layers 41A, 41B are formed such that dimension h1, of each of non-combustible layers 41A and 41B, in the shaft center X direction is longer than dimension h3 along which an attaching part of coil end mold 31b and insulator 13 to an end face of stator core 11 is provided in the shaft center X direction.

In other words, as shown in FIG. 5, non-combustible layers 41A and 41B serving as grooves are located on the outer peripheral side of coil ends 12a in a direction intersecting with shaft center X, in other words, in a radial direction (the direction indicated by arrow Y in the drawing, which is hereinafter written as "radial direction Y"). In other words, in the radial direction Y, non-combustible layers 41A, 41B are each located between coil end 12a and molding resin 31. In addition, in the shaft center X direction, heights h1 of non-combustible layers 41A, 41B are greater than height h2 of coil ends 12a.

Further, on the side where circuit board 34 is mounted, spaces are each formed also between coil end mold 31b except a part on which circuit board 34 is mounted and circuit board 34 and between coil end mold 31b and first bracket 32, and air in the respective spaces forms non-combustible layers 42A, 42B. In addition, also between second bracket 33 and one of coil end molds 31b that is close to second bracket 33, there is formed a space, and air in the space forms non-combustible layer 43.

These non-combustible layers 42A, 42B, 43 are formed to extend in the radial direction Y, on the side of each coil end 12a opposite to stator core 11, in other words, at the positions on the outer side in the shaft center direction. In addition, in present exemplary embodiment, non-combustible layers 42A, 42B, 43 formed of space are provided in a dimension range in the radial direction Y in which each coil end mold 31b is provided.

In other words, as shown in FIG. 5, in the direction along shaft center X, non-combustible layers 42A, 42B are located in the direction, with respect to coil end 12a, opposite to the direction in which stator core 11 is located. In the direction intersecting with shaft center X, in other words, in the radial direction Y, width W1 of the spaces formed by non-combustible layers 42A, 42B is wider than width W2 of coil end 12a.

In the direction along shaft center X, non-combustible layer 43 is located in the direction, with respect to coil end 12a, opposite to the direction in which stator core 11 is located. In the direction intersecting with shaft center X, in other words, in the radial direction Y, width W3 of a space formed by non-combustible layer 43 is wider than width W2 of coil end 12a.

The above configuration provides the following actions and effects. If by any chance a safe protection circuit configured to prevent an excessive current from flowing through coil 12 of stator 10 does not normally function, an excessive current will flow through coil 12 of stator 10. In that case, coil 12 generates heat and heats up to extremely high temperatures, whereby a layer short occurs. If a layer short has occurred in coil 12, a spark will occur. There is a possibility that gas generated from insulator 13 or the like can be ignited by the spark having occurred and can thus generate flame. To address such a problem, in the present exemplary embodiment, non-combustible layers 41A, 41B, 42A, 42B, 43 are provided to cover coil end molds 31b that cover coil ends 12a. Thus, even if a layer short has occurred, fire due to insulator 13 and the like is blocked by non-combustible layers 41A, 41B, 42A, 42B, 43, so that fire and smoke can be prevented from coming outside of motor 101.

Specifically, suppose, for example, the case where fire is caused from coil end 12a and the fire is about to spread to the outer peripheral side, in the radial direction Y, of coil end mold 31b covering coil end 12a and insulator 13. To address this case, in the present exemplary embodiment, non-combustible layers 41A, 41B are provided to be formed to extend in the shaft center X direction at the positions on the outer peripheral sides of coil ends 12a. Thus, even if the fire is about to spread as described above, the fire and smoke are blocked by non-combustible layers 41A, 41B and do not easily leak out of motor 101.

In addition, suppose, for example, the case where fire is caused from coil end 12a and the fire is about to spread to the side, of coil end mold 31b covering coil end 12a and insulator 13, opposite to stator core 11 in the shaft center X direction. To address this case, in the present exemplary embodiment, non-combustible layers 42A, 42B, 43 are each provided to be formed to extend in the radial direction Y on the side of coil end 12a opposite to stator core 11. Thus, even if the fire is about to spread as described above, the fire and smoke are blocked by non-combustible layers 42A, 42B, 43 and do not easily leak out of motor 101.

In the present exemplary embodiment, the drawings show the case where non-combustible layers 41A, 41B formed to extend in the shaft center X direction at positions on the outer peripheral side of coil ends 12a in the radial direction Y are formed parallel to the shaft center X direction.

However, the non-combustible layers are not limited to the above example, and the non-combustible layers only have to be connected to each other on at least a part of each non-combustible layer in the shaft center X direction even if the distance from shaft center X varies. In addition, the drawings show the case where non-combustible layers 42A, 42B, 43 formed to extend in the radial direction Y on the side opposite to stator core 11 (outer side in the shaft center X direction) are formed almost along the radial direction Y. However, the non-combustible layers are not limited to the above example, and the non-combustible layers only have to be connected to each other on at least a part of each non-combustible layer in radial direction Y even if the position in the shaft center X direction varies.

In the present exemplary embodiment, first bracket 32 is further provided on the outside, of non-combustible layer 42A, in the shaft center X direction, in other words, on the side of coil end 12a opposite to stator core 11. Thus, first bracket 32 further functions as a metallic cover covering coil end 12a and surely prevents fire and smoke from coming outside of motor 101, whereby reliability can be improved.

Figure 6:
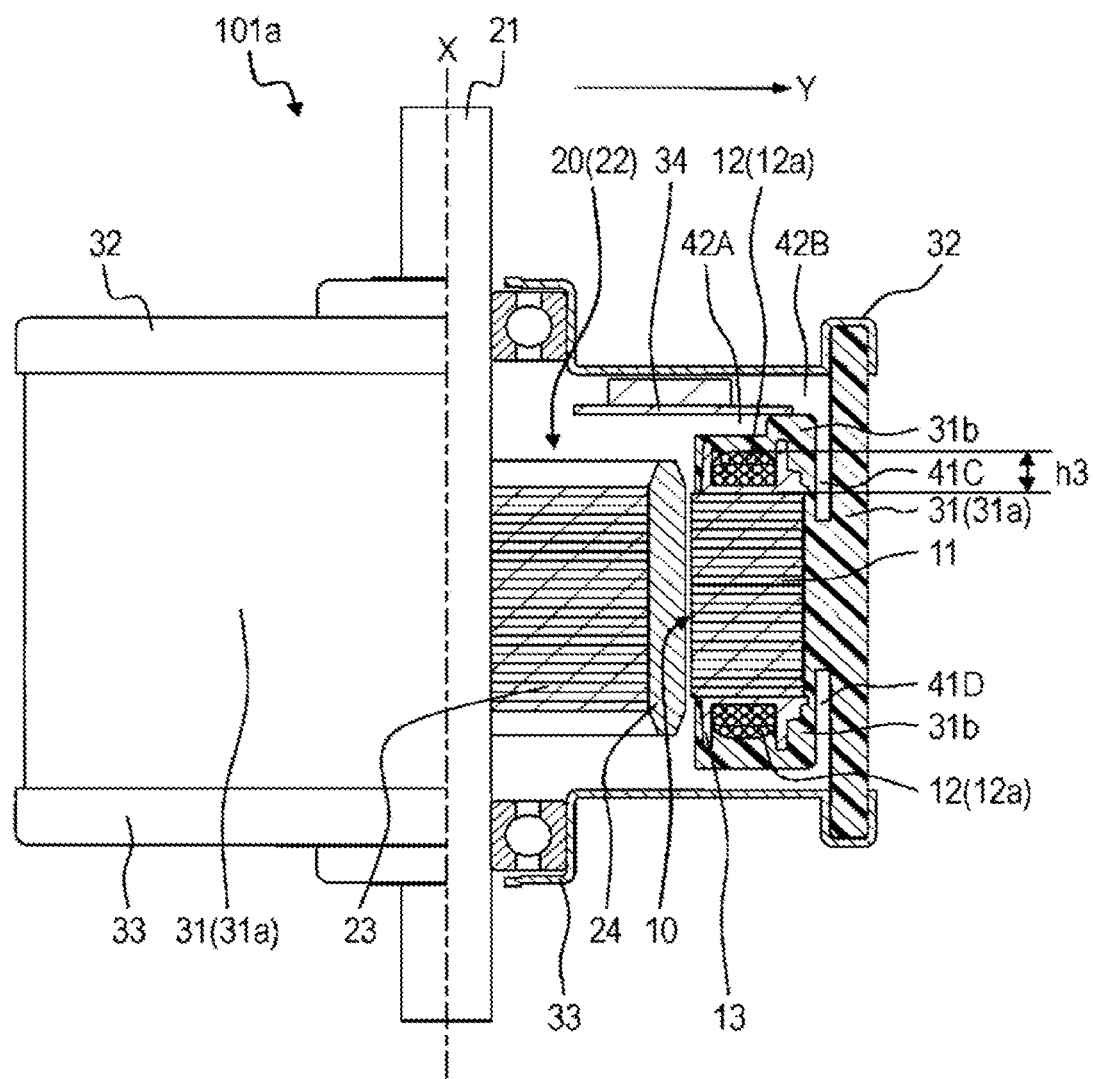
FIG. 6 is a half cross-sectional view of a modified example of the motor of the first exemplary embodiment.

The above exemplary embodiment describes the case where each of non-combustible layers 41A, 41B formed to extend in the shaft center X direction at the position on the outer peripheral side, of coil end 12a, in the radial direction Y is extended longer than dimension h3 along which an attaching part of coil end mold 31b and insulator 13 to an end face of stator core 11 is provided in the shaft center X direction. However, the non-combustible layers are not limited to the above example and may be made in another configuration, for example, as shown in FIG. 6. FIG. 6 is a half cross-sectional view of a modified example of the present exemplary embodiment. Specifically, as shown in FIG. 6, regarding motor 101a, non-combustible layers 41C, 41D are each formed to cut into the outer peripheral side of stator core 11 deeper than dimension h3 along which an attaching part of coil end mold 31b and insulator 13 to an end face of stator core 11 is provided in the shaft center X direction. With the above arrangement, if by any chance the safe protection circuit does not normally function and fire has ignited coil end mold 31b or insulator 13 from a part in the vicinity of coil end 12a or the like, it is possible to more surely prevent fire from coming outside of motor 101 and motor 101a, whereby reliability can be improved.

Second Exemplary Embodiment

Figure 7:
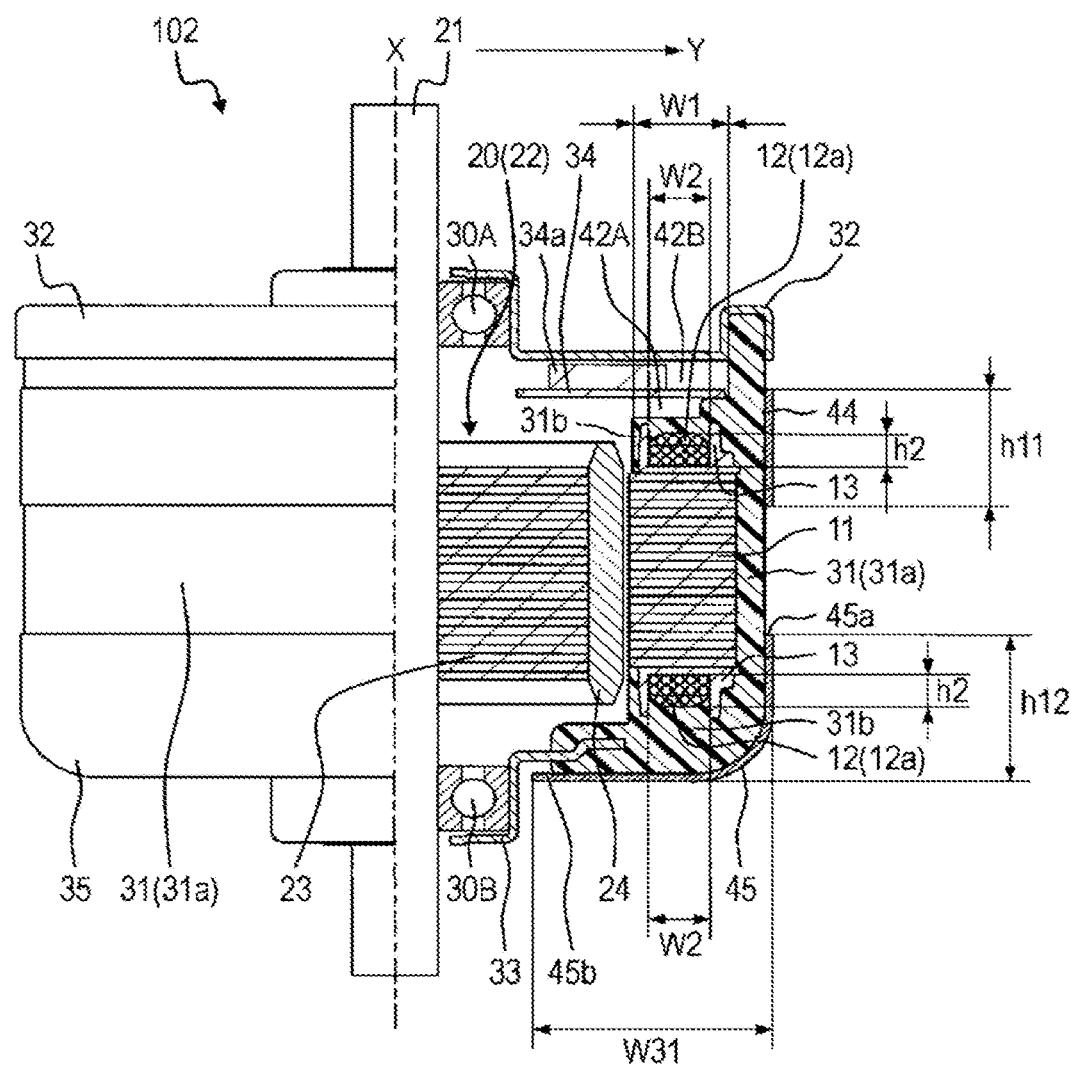
FIG. 7 is a half cross-sectional view of a motor according to a second exemplary embodiment of the present invention.

FIG. 7 is a half cross-sectional view of motor 102 according to a second exemplary embodiment of the present invention.

The above first exemplary embodiment describes the case where non-combustible layers 41A, 41B, 41C, 41D, 42A, 42B, 43 are constituted by air; however, the non-combustible layers are not limited to the first exemplary embodiment, and the non-combustible layers may be formed of a non-combustible material. Specifically, in the present exemplary embodiment, motor 102 including non-combustible layers 44, 45 made of metal will be described.

As shown in FIG. 7, non-combustible layers 44, 45 are formed of a non-combustible material made of metal. In addition, in the present exemplary embodiment, coil end molds 31b are covered with non-combustible layers 44, 45 made of metal from outside of molding resin 31. Specifically, non-combustible layer 44 is formed to extend in a shaft center X direction at a position on an outer peripheral surface of barrel 31a of molding resin 31 and on the outer peripheral side of coil end 12a close to circuit board 34. In other words, non-combustible layer 44 is formed to include coil end mold 31b in the shaft center X direction.

In other words, non-combustible layer 44 is located on the outer peripheral side of coil end 12a in a direction intersecting with a shaft center X, in other words, in the radial direction Y. Further, height h11 of non-combustible layer 44 is greater than height h2 of coil end 12a in the shaft center X direction.

Further, non-combustible layer 45 extends from the outer peripheral surface of barrel 31a of molding resin 31 to the vicinity of shaft bearing 30B. More specifically, non-combustible layer 45 is formed to extend in the shaft center X direction at a position on the outer peripheral side of coil end 12a close to second bracket 33 and on the outer peripheral surface of barrel 31a of molding resin 31, and is formed to include coil end mold 31b in the shaft center X direction. In addition, non-combustible layer 45 extends also in the radial direction Y at a position on the side of coil end 12a opposite to stator core 11 and is formed to include coil end mold 31b in the radial direction Y.

In other words, non-combustible layer 45 is formed to cover coil end 12a in a range from end part 45a located in the direction along shaft center X to end part 45b located in the radial direction Y. Specifically, in the direction along shaft center X, height h12 of non-combustible layer 45 is greater than height h2 of coil end 12a. Further, in the radial direction Y, non-combustible layer 45 has width W31 greater than width W2 of coil end 12a.

If by any chance a safe protection circuit configured to prevent an excessive current from flowing through coil 12 of stator 10 does not normally function as described above, an excessive current will flow through coil 12 of stator 10. In that case, coil 12 generates heat and heats up to extremely high temperatures, whereby a layer short occurs. If a layer short has occurred in coil 12, a spark will occur. There is a possibility that gas generated from insulator 13 or the like can be ignited by the spark having occurred and can thus generate flame. To address such a problem, in the present exemplary embodiment, non-combustible layers 44 and 45 formed of a non-combustible material made of metal are provided. As a result, even if the fire is about to spread to the outer peripheral side of motor 102, the fire and accompanying smoke are blocked by non-combustible layers 44, 45, whereby fire and smoke can be prevented from coming outside of motor 102.

For example, if fire is caused from coil end 12a and the fire is about to spread from coil end mold 31b to the side opposite to stator core 11 in the shaft center X direction, the fire and smoke are blocked by non-combustible layer 45 and non-combustible layers 42A, 42B, 44, whereby fire and smoke can be prevented from coming outside of motor 102.

For above-described non-combustible layers 44, 45 made of metal, it is possible to use metallic material such as, iron, stainless steel, brass, or aluminum.

In particular, when iron or brass is used, it is possible to improve a rustproof function by subjecting the surface to plating working. Specifically, when iron is used, it is possible to use a hot-dip galvanized steel sheet (Japanese industrial standard (JIS): SGCD) or an electrogalvanized steel sheet (JIS: SECD).

The present exemplary embodiment describes the case where non-combustible layers 44, 45 are formed of a non-combustible material made of metal; however, the material is not limited to metal, and an inorganic material such as ceramic or a molded article of aluminum hydroxide may be used instead of metal.

Third Exemplary Embodiment

Figure 8:
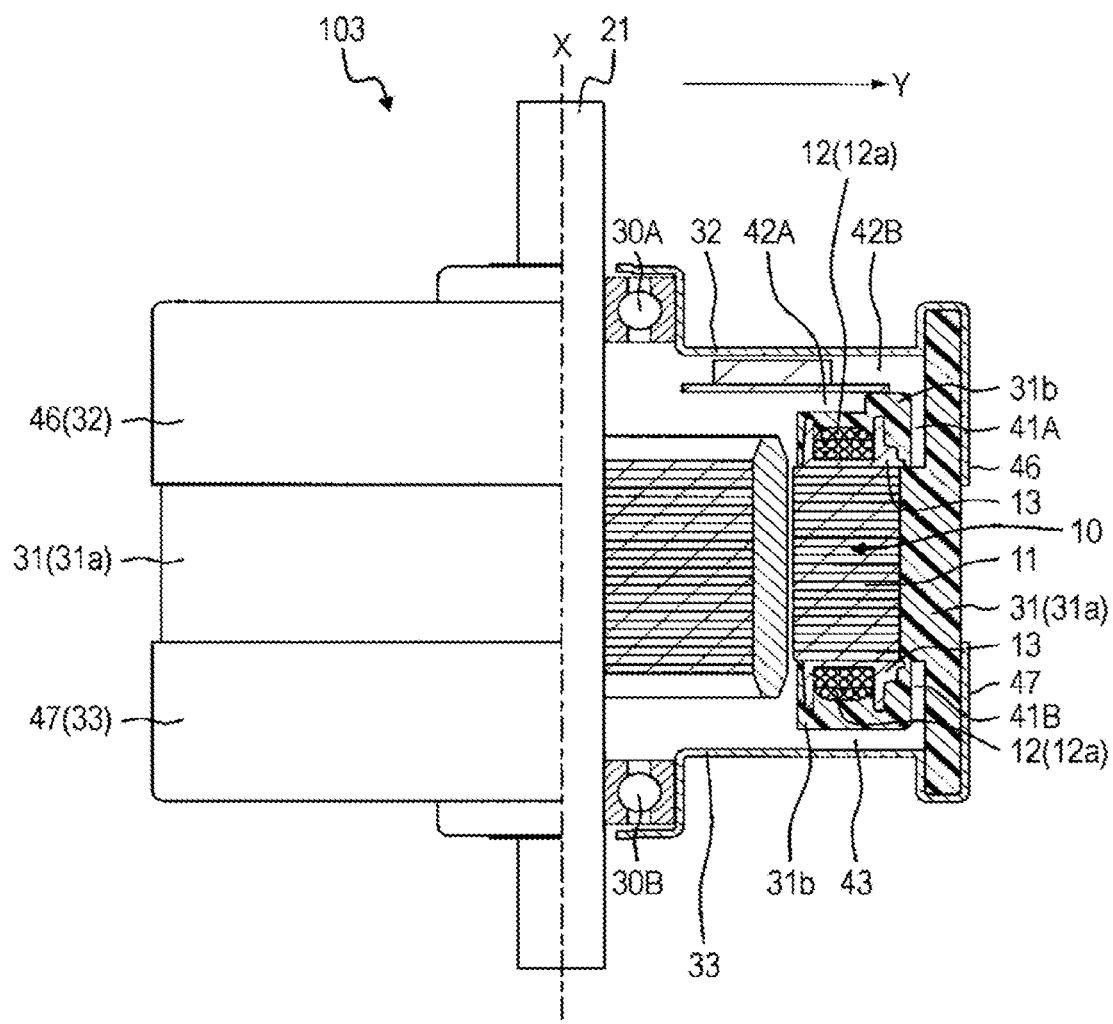
FIG. 8 is a half cross-sectional view of a motor according to a third exemplary embodiment of the present invention.

FIG. 8 is a half cross-sectional view of motor 103 according to a third exemplary embodiment of the present invention.

In the present exemplary embodiment, as shown in FIG. 8, in a similar way to the first exemplary embodiment, there are provided non-combustible layers 41A, 41B each of which is made of air in a space formed to extend in the shaft center X direction at a position on the outer peripheral side, of coil end 12a, in the radial direction Y In addition to non-combustible layers 41A and 41B, metallic covers are further provided outside of molding resin 31. Specifically, in the present exemplary embodiment, a part, of each of first and second brackets 32, 33, along barrel 31a of molding resin 31 is extended, and a function as a non-combustible layer is added to each of metallic cover units 46, 47, which are the extended parts of first and second bracket 32 and 33.

This configuration can more surely prevent fire and smoke from coming outside of motor 103, thereby improving reliability. Although metallic cover units 46, 47 are made by extending first and second brackets 32, 33 in the present exemplary embodiment, this configuration does not limit the invention, and individual metallic covers may be provided as non-combustible layer 44 of FIG. 7.

Fourth Exemplary Embodiment

Figure 9:
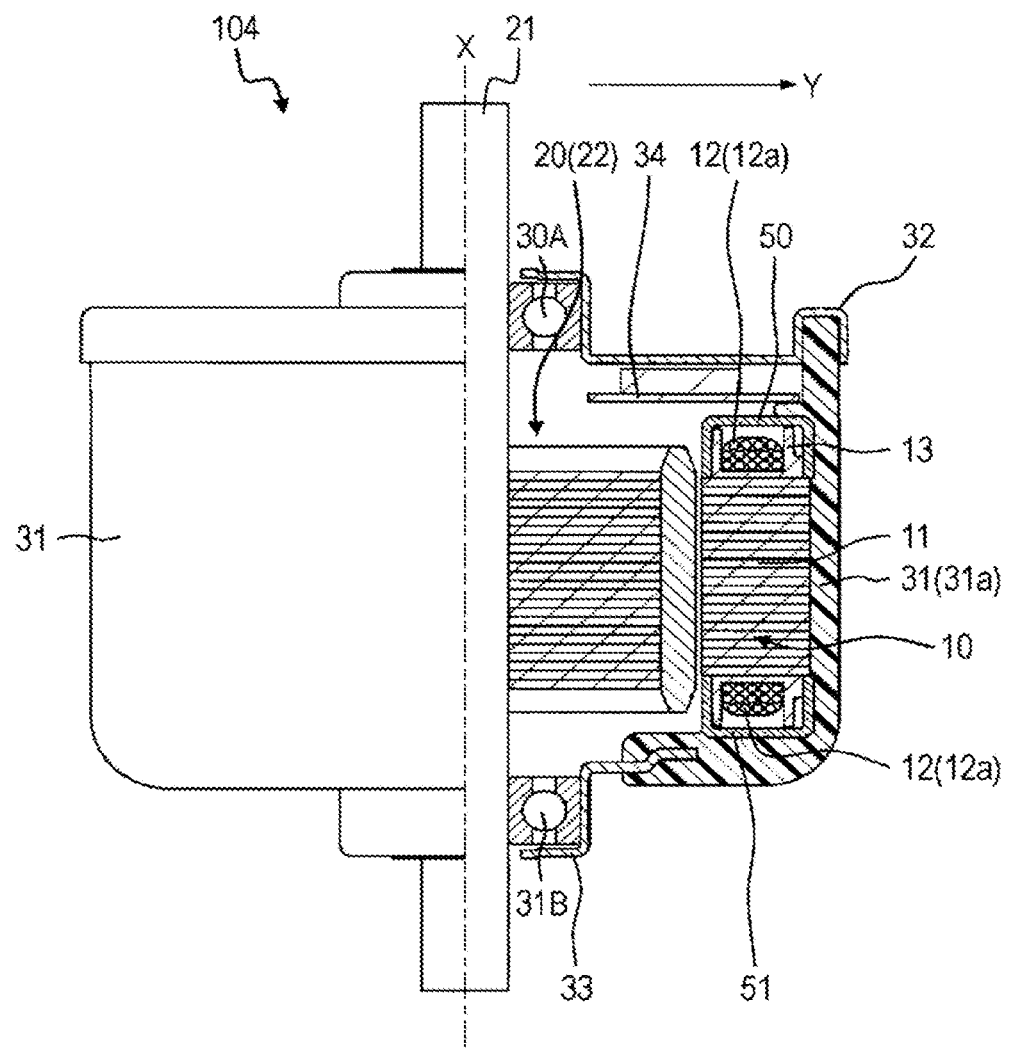
FIG. 9 is a half cross-sectional view of a motor according to a fourth exemplary embodiment of the present invention.
Figure 10:
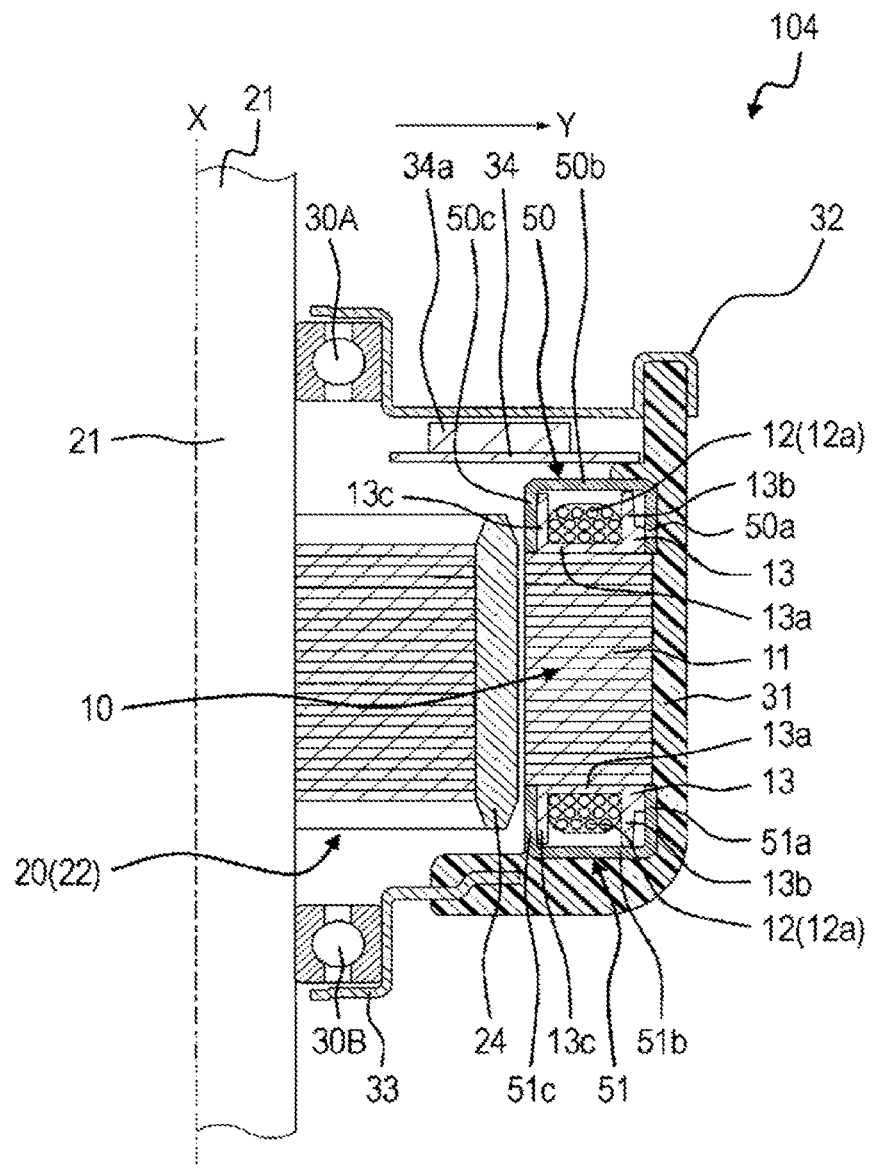
FIG. 10 is an enlarged half cross-sectional view of a main part of the motor according to the fourth exemplary embodiment of the present invention.

FIG. 9 is a half cross-sectional view of motor 104 according to a fourth exemplary embodiment of the present invention. FIG. 10 is an enlarged half cross-sectional view of a main part of motor 104 according to the fourth exemplary embodiment of the present invention.

In the present exemplary embodiment, coil ends 12a and insulators 13 holding these coil ends 12a are covered with non-combustible layers 50 and 51 as shown in FIG. 9. Non-combustible layers 50 and 51 may be made of air and are preferably made of a non-combustible material such as an inorganic material such as metal or ceramic. Alternatively, a space between each of non-combustible layers 50 and 51 and corresponding coil end 12a may be filled with air or molding resin 31.

FIGS. 9 and 10 show an example in which non-combustible layers 50, 51 are configured of metal in a cap shape. Non-combustible layers 50, 51 are each formed to surround coil end 12a and insulator 13 holding coil end 12a. More specifically, as shown in FIG. 10, non-combustible layer 50 is configured with: outer peripheral enclosure 50a at a position on the outer peripheral side of outer peripheral wall 13b of insulator 13; side enclosure 50b at a position on the side of insulator 13 opposite to a stator core; and inner peripheral enclosure 50c at a position on an inner peripheral side of inner peripheral wall 13c of insulator 13.

Similarly, non-combustible layer 51 is configured with outer peripheral enclosure 51a, side enclosure 51b, and inner peripheral enclosure 51c.

In other words, in the radial direction Y, non-combustible layers 50, 51 respectively have outer peripheral enclosures 50a, 51a and inner peripheral enclosures 50c, 51c. In the radial direction Y, outer peripheral enclosures 50a, 51a are each located on the outer peripheral side of outer peripheral wall 13b of insulator 13. In the radial direction Y, inner peripheral enclosures 50c, 51c are each located closer to shaft center X than inner peripheral wall 13c of insulator 13 is.

In the direction along shaft center X, non-combustible layers 50, 51 respectively have side enclosures 50b, 51b. In the direction along shaft center X, side enclosures 50b, 51b are each located to face each bottom surface part 13a through coil end 12a.

If by any chance a safe protection circuit configured to prevent an excessive current from flowing through coil 12 of stator 10 does not normally function as described above, an excessive current will flow through coil 12 of stator 10. In that case, coil 12 generates heat and heats up to extremely high temperatures, whereby a layer short occurs. If a layer short has occurred in coil 12, a spark will occur. There is a possibility that gas generated from insulator 13 or the like can be ignited by the spark having occurred and can thus generate flame. To address such a problem, in the present exemplary embodiment, non-combustible layers 50, 51 are each provided to cover coil end 12a of coil 12 of stator 10 and insulator 13. Thus, even if a layer short has occurred in coil 12, fire due to insulator 13 and the like is blocked by non-combustible layers 50, 51, so that fire and smoke can be prevented from coming outside of motor 104.

Non-combustible layers 50, 51 respectively have outer peripheral enclosures 50a, 51a each formed to extend in the shaft center X direction at a position on an outer peripheral side of coil end 12a and outer peripheral wall 13b of insulator 13. Thus, for example, if fire is caused from coil end 12a and is about to spread to the outer peripheral side, of coil end 12a and insulator 13, in the radial direction Y, the fire and smoke are blocked by outer peripheral enclosures 50a, 51a, and fire and smoke can be prevented from coming outside of motor 104.

Further, non-combustible layers 50, 51 respectively have side enclosures 50b, 51b each formed to extend in the radial direction Y at the side of coil end 12a opposite to stator core 11, in other words, on the outer side in the shaft center direction. As a result, for example, if fire is caused from coil end 12a and is about to spread to the side, of insulator 13 and coil end 12a, opposite to stator core 11 in the shaft center X direction, the fire and smoke are blocked by side enclosures 50b, 51b, and the fire and smoke can be prevented from coming outside of motor 104.

Further, non-combustible layers 50, 51 respectively have inner peripheral enclosures 50c, 51c each formed to extend in the shaft center X direction at a position on an inner peripheral side of coil end 12a and inner peripheral wall 13c of insulator 13. Thus, for example, if fire is caused from coil end 12a and is about to spread to the inner peripheral side, of coil end 12a and insulator 13, in the radial direction Y, the fire and smoke are blocked by inner peripheral enclosures 50c, 51c, and fire and smoke can be prevented from coming outside of motor 104.

Figure 11:
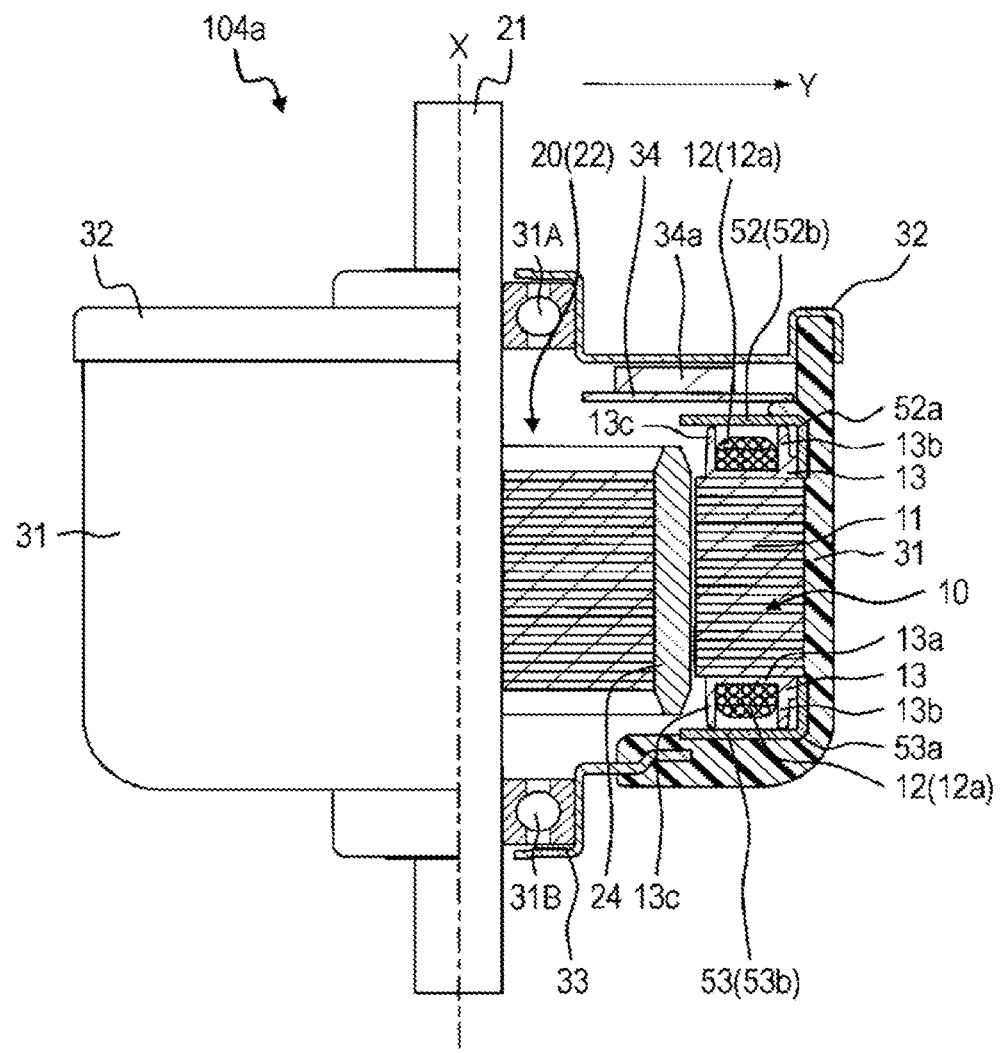
FIG. 11 is a half cross-sectional view of a modified example of the motor according to the fourth exemplary embodiment of the present invention.

In the present exemplary embodiment, non-combustible layers 50, 51 have a cross-section in an approximate U-shape; however, the shape is not limited to the U-shape, and any shape can be used as long as non-combustible layers 50 and 51 each can well cover insulator 13 and coil end 12a from outside. Further, the present exemplary embodiment has an advantage that even if fire comes out to the inner peripheral side from coil end 12a, fire and smoke can be prevented from coming outside of non-combustible layers 50, 51. However, the non-combustible layers are not limited to the above example and may be configured as shown in the half cross-sectional view of a modified example of the present exemplary embodiment in FIG. 11. Specifically, motor 104a shown in FIG. 11 has, as non-combustible layers 52, 53, outer peripheral enclosures 52a, 53a and side enclosures 52b, 53b, respectively. Although motor 104a has no inner peripheral enclosure as described above, fire caused from coil end 12a can be prevented from coming out of insulator 13 and coil end 12a to the outer peripheral side or to the lateral side. Thus, compared with the case of no non-combustible layers 52, 53 provided, there is provided an effect of preventing fire from coming outside of motor 104a to a certain extent.

In the case described in the above exemplary embodiments, the following members are included as non-combustible layers: the parts formed to extend in the shaft center direction at the position on the outer peripheral side of coil end 12a like non-combustible layers 41A, 41B, 41C, 41D, 44, 45, 50a, 51a, 52a, 53a; and the parts formed to extend in the radial direction Y at the position on the side of coil end 12a opposite to stator core 11 like non-combustible layers 42A, 42B, 43, 45, 50b, 51b, 52b, 53b. Thus, even if fire is caused from coil end 12a, this configuration can well prevent the fire from spreading from coil end 12a of the motor to the outside, in other words, spreading to the outside in the radial direction Y and the shaft center X direction, thereby preventing fire and smoke from coming outside of the motor. However, the non-combustible layers are not limited to the above configuration and may be configured as follows. A non-combustible layer may be configured with only a part formed to extend in the shaft center X direction at a position on the outer peripheral side of coil end 12a like non-combustible layers 41A, 41B, 41C, 41D, 44, 45, 50a, 51a, 52a, 53a; or a non-combustible layer may be configured with only a part formed to extend in the radial direction Y at a position on the side of coil end 12a opposite to stator core 11 like non-combustible layers 42A, 42B, 43, 45, 50b, 51b, 52b, 53b. Whichever form is used, there is an advantage that fire and smoke are less likely to come outside, compared with a motor configured to have no non-combustible layer.

Fifth Exemplary Embodiment

Figure 12:
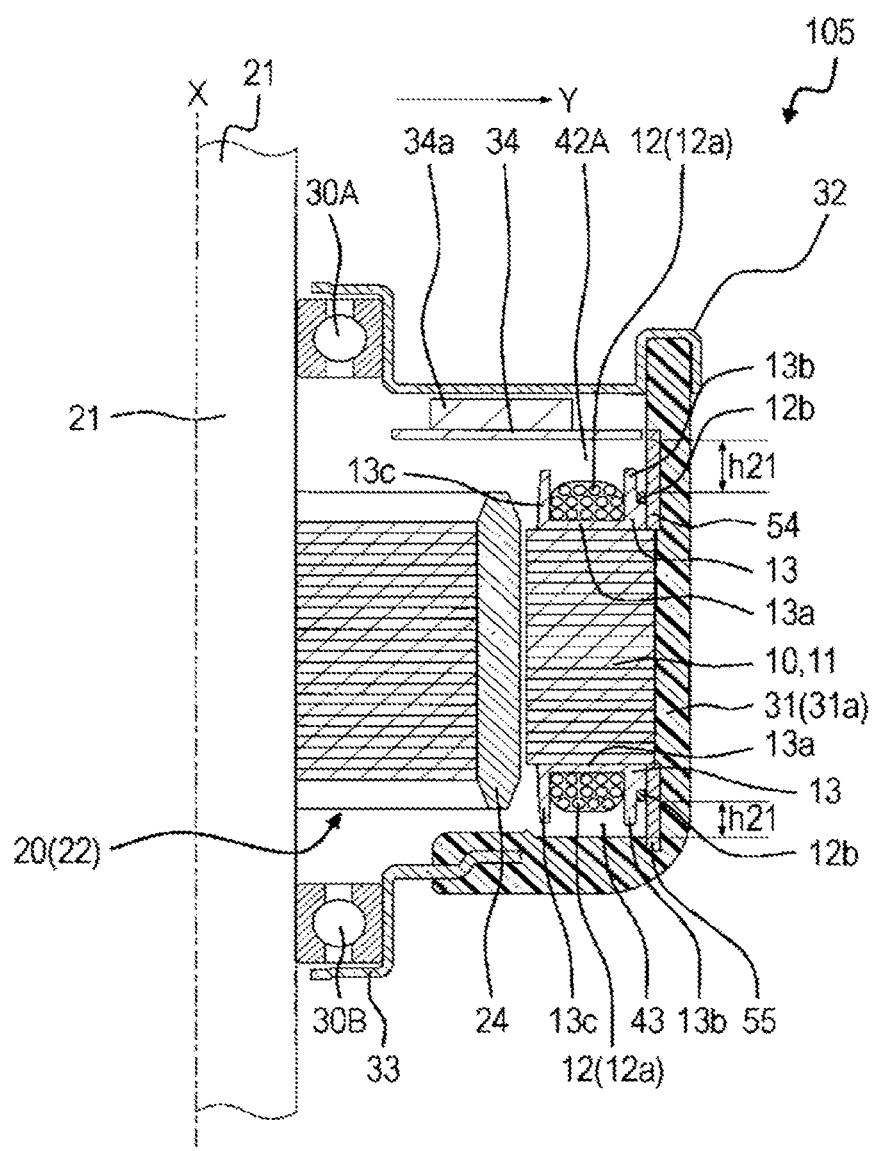
FIG. 12 is a half cross-sectional view of a motor according to a fifth exemplary embodiment of the present invention.

FIG. 12 is a half cross-sectional view of motor 105 according to a fifth exemplary embodiment of the present invention.

In the above first to fourth exemplary embodiments, for example, the case is described where non-combustible layers such as non-combustible layers 44, 45 cover coil ends 12a; however, in the present exemplary embodiment, as shown in FIG. 12, non-combustible layers 54, 55 also cover transition wires 12b for coils 12. In the same way as in a normal motor, motor 105 includes transition wires 12b each disposed on an outer periphery of outer peripheral wall 13b of each insulator 13 or the like, and transition wires 12b connect between coils 12 across teeth (11b). In the present exemplary embodiment, non-combustible layers 54, 55 are provided to also cover transition wires 12b.

In the present exemplary embodiment, non-combustible layers 54, 55 are each configured with a non-combustible material such as a ring-shaped metallic sheet. Further, non-combustible layers 54, 55 are each formed to extend in the shaft center X direction at a position on the outer peripheral side of coil end 12a, outer peripheral wall 13b of insulator 13, and transition wire 12b. Non-combustible layers 54, 55 cover transition wires 12b in addition to coil ends 12a and outer peripheral walls 13b of insulators 13, from the outer peripheral side. Further, height h21, which is a dimension of each of non-combustible layers 54, 55 in the shaft center X direction, only has to be large enough that if transition wire 12b sparks and generates a spark due to wire break of transition wire 12b or other reason, the spark caused by the sparking does not reach barrel 31a of molding resin 31. Note that non-combustible layers 54, 55 may be constituted by a non-combustible material such as an inorganic material or may be constituted by air. If non-combustible layers 54, 55 are constituted by air, it is necessary to secure, for non-combustible layers 54, 55, the dimension in the shaft center X direction, in addition, to secure a dimension in the radial direction Y equal to height h21.

According to this configuration, motor 105 is provided with non-combustible layers 54, 55 covering not only coil ends 12a of coils 12 of stator 10 but also transition wires 12b. Conductive wires constituting coils 12 of stator 10 can break in some cases. If by any chance a safe protection circuit configured to prevent an excessive current from flowing through coil 12 of stator 10 does not normally function, an excessive current will flow through the conductive wire constituting coil 12 of stator 10. Further, transition wire 12b connecting between coils 12 can break in some cases. At the time of transition wire 12b breaking, a broken part sparks and thus generates a spark in some cases. The spark generated by the sparking can ignite gas generated from insulator 13 or the like, and flame can be generated. To address such a problem, by employing the configuration of the present exemplary embodiment, even if a spark is generated by sparking, fire due to insulator 13 or the like is blocked by non-combustible layers 54, 55, and fire and smoke can be prevented from coming outside of motor 105.

That is, non-combustible layers 54, 55 are each formed to extend in the shaft center X direction at a position on the outer peripheral side of outer peripheral wall 13b of insulator 13 and transition wire 12b. Thus, for example, if fire is caused from transition wire 12b and is about to spread to the outer peripheral side, of insulator 13 and transition wire 12b, in the radial direction Y, the fire and smoke are blocked by non-combustible layers 54, 55, and fire and smoke are prevented from coming outside of motor 105.

In the above present exemplary embodiment, the case is described where two non-combustible layers 54, 55 cover also transition wires 12b for coils 12; however, the non-combustible layers are not limited to the above example. Specifically, the non-combustible layer may be configured as shown in the half cross-sectional view of a modified example of the present exemplary embodiment in FIG. 13. Motor 105a shown in FIG. 13 may be configured such that one non-combustible layer 56 covers not only coil ends 12a of coils 12 of stator 10 and transition wires 12b but also the outer peripheral side of stator core 11. With this arrangement, fire and smoke is blocked by non-combustible layer 56, and fire and smoke can be prevented from coming outside of motor 105a.

Figure 13:
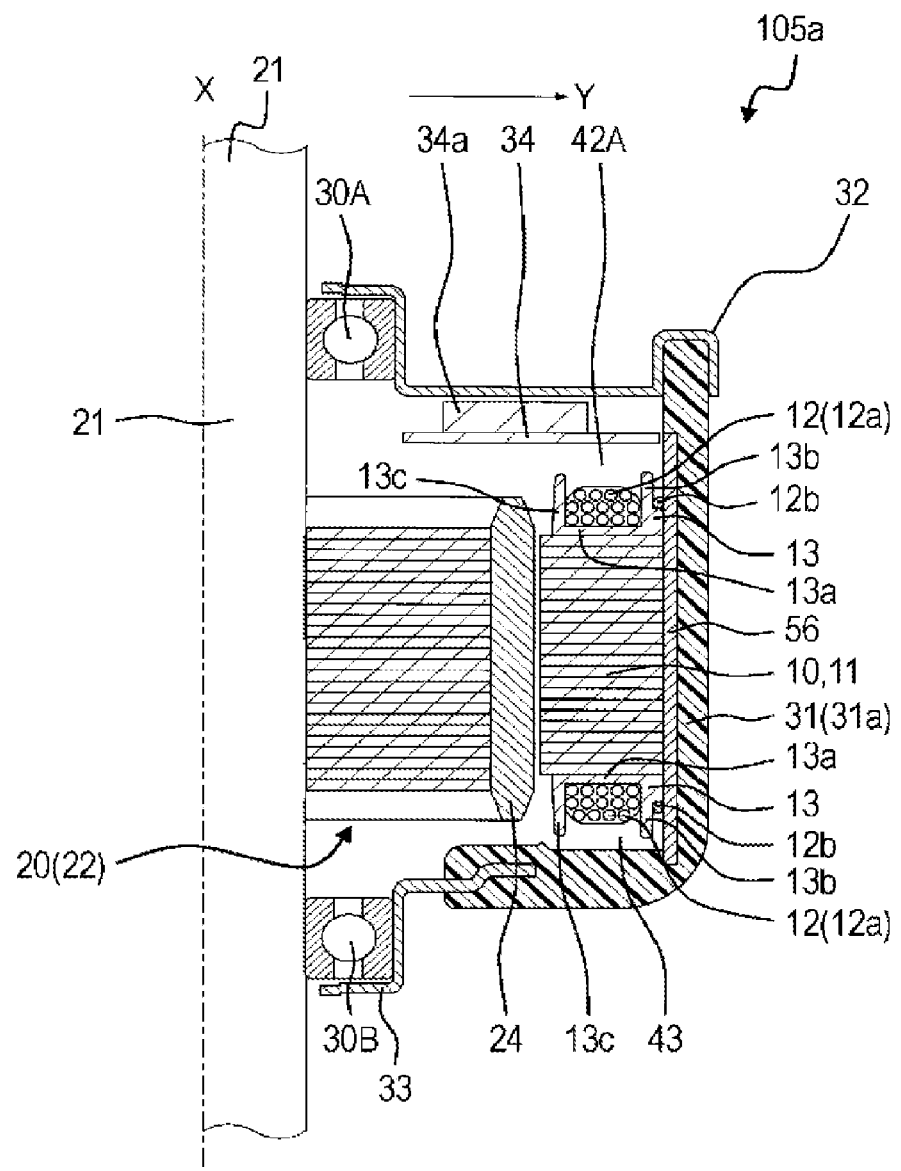
FIG. 13 is a half cross-sectional view of a modified example of the motor according to the fifth exemplary embodiment of the present invention.

Further, in motors 105, 105a shown in FIGS. 12 and 13, the case is described where each of non-combustible layers 54, 55, 56 is disposed inside (inner peripheral side) of molding resin 31; however, the placement of the non-combustible layer is not limited to the placement in the above example. Specifically, the non-combustible layer may be configured as shown in a half cross-sectional view of another modified example of the present exemplary embodiment shown in FIG. 14. In motor 105b shown in FIG. 14, non-combustible layers 57, 58 may be respectively disposed on the inner peripheral side and the outer peripheral side of molding resin 31. Non-combustible layers 57, 58 are constituted by a non-combustible material such as a metallic sheet or ceramic.

Figure 14:
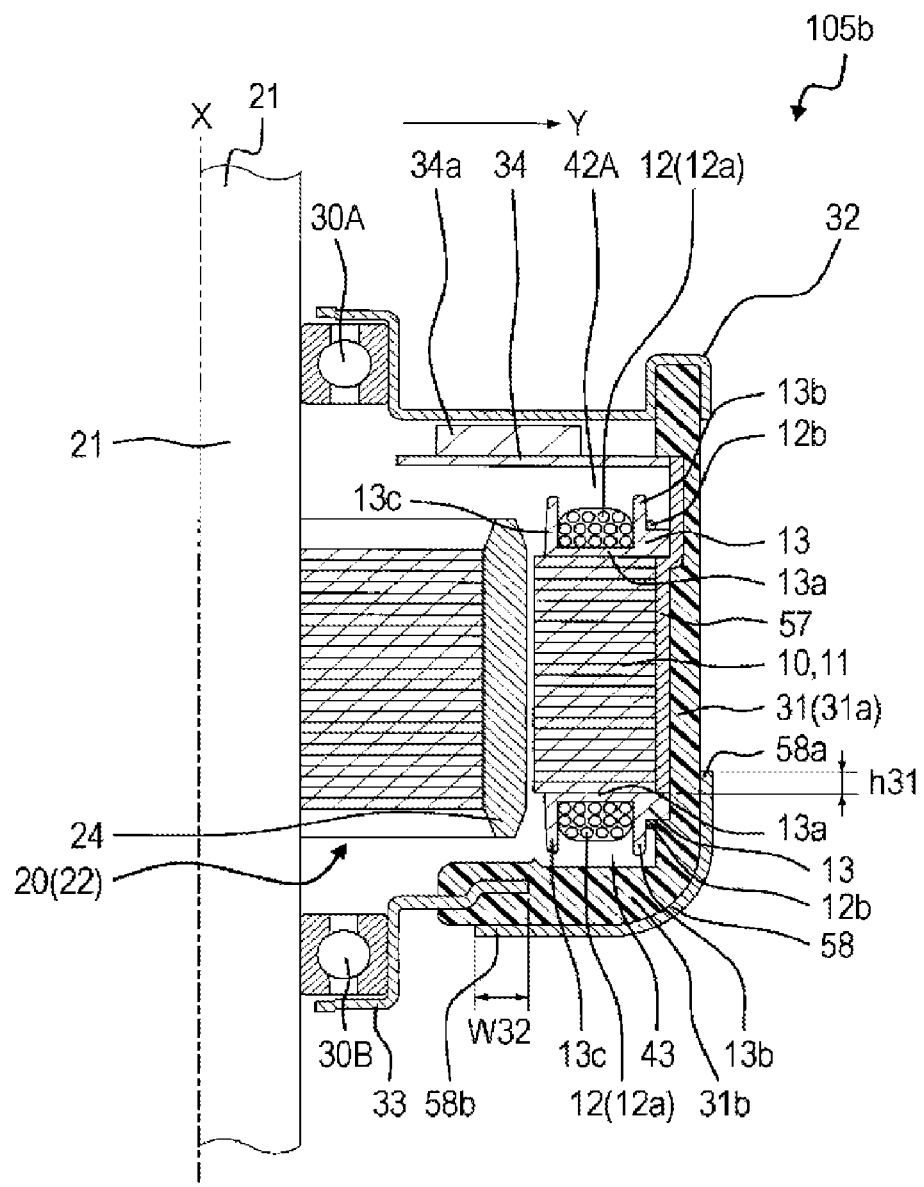
FIG. 14 is a half cross-sectional view of another modified example of the motor according to the fifth exemplary embodiment of the present invention.

In this modified example, as shown in FIG. 14, non-combustible layer 57 is formed to extend in the shaft center X direction on the inner peripheral side of molding resin 31. In more detail, non-combustible layer 57 is formed to include, in the shaft center X direction, coil end 12a, insulator 13, and transition wire 12b that are on the side close to circuit board 34 and first bracket 32, and to include stator core 11. As described above, non-combustible layer 57 covers the above members from the outer peripheral side in the radial direction Y.

In addition, on the outer peripheral side of molding resin 31 and on the outer side, of molding resin 31, on the lower side in FIG. 14, non-combustible layer 58 is formed to extend from an outer peripheral surface of barrel 31a of molding resin 31 to the vicinity of shaft bearing 30B, in other words, in the shaft center X direction and in the radial direction Y. More specifically, on an outer peripheral surface of barrel 31a of molding resin 31, non-combustible layer 58 extends in the shaft center X direction, at a position on the outer peripheral side of coil end 12a close to second bracket 33. Further, non-combustible layer 58 is formed to include coil end mold 31b in the shaft center X direction or to include coil end 12a, insulator 13, transition wire 12b, and stator core 11 as in the present exemplary embodiment. Further, non-combustible layer 58 is formed to extend also in the radial direction Y at a position on the side of coil end 12a opposite to stator core 11 so as to include coil end mold 31b in the radial direction Y. With this configuration, non-combustible layer 58 covers coil end 12a or covers coil end 12a, insulator 13, and transition wire 12b as in the present exemplary embodiment, in a region from end part 58a located in the direction along the shaft center X to end part 58b located in the radial direction Y.

Further, in this modified example, non-combustible layer 57 and end part 58a of non-combustible layer 58 overlap each other by height range h31 in the shaft center X direction. In addition, end part 58b of non-combustible layer 58 and second bracket 33 overlap each other in the radial direction Y by radial direction range W32.

As described above, according to the configuration of the present modified example, non-combustible layers 57, 58 are formed to extend in the shaft center X direction on the inner peripheral side and the outer peripheral side of molding resin 31, at positions on the outer peripheral side of outer peripheral walls 13b of insulators 13 and transition wires 12b. Thus, for example, if fire is caused from transition wire 12b and is about to spread to the outer peripheral side, of insulator 13 and transition wire 12b, in the radial direction Y, the fire due to insulator 13 and the like and smoke are blocked by non-combustible layers 57, 58, and fire and smoke can be prevented from coming outside of motor 105b.

In this modified example, non-combustible layer 57 and end part 58a of non-combustible layer 58 overlap each other by height range h31 in the shaft center X direction. With this arrangement, it is possible to improve blocking performance of fire and smoke when fire is caused from transition wire 12b and coil end 12a in the vicinity of non-combustible layer 57 and end part 58a, and fire and smoke can be better prevented from coming outside of motor 105b. In addition, end part 58b of non-combustible layer 58 and second bracket 33 overlap each other in the radial direction Y by radial direction range W32. With this arrangement, it is possible to improve blocking performance of fire and smoke when fire is caused from transition wire 12b and coil end 12a in the vicinity of non-combustible layer 57 and end part 58a, and fire and smoke can be better prevented from coming outside of the motor.

Figure 15:
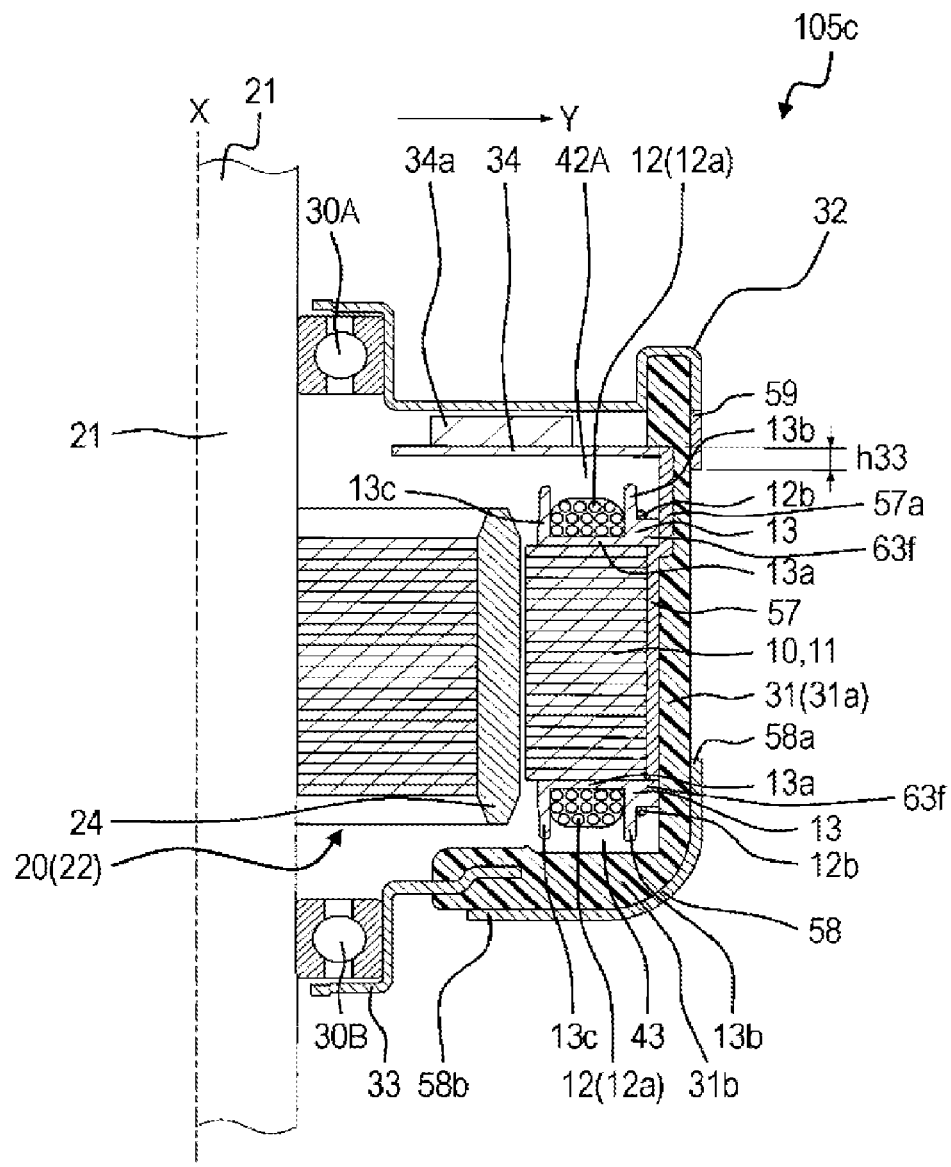
FIG. 15 is a half cross-sectional view of still another modified example of the motor according to the fifth exemplary embodiment of the present invention.

Alternatively, the non-combustible layers may be configured as shown in the half cross-sectional view of a still another modified example of the present exemplary embodiment shown in FIG. 15. Motor 105c shown in FIG. 15 is further provided with non-combustible layer 59 such that non-combustible layer 59 overlaps, on the outer peripheral side of molding resin 31, an end part of bulging part 57a of non-combustible layer 57 by height range h33 in the shaft center X direction. Non-combustible layer 59 is constituted by a non-combustible material such as a metallic sheet or ceramic. Also by non-combustible layer 59, blocking performance of fire and smoke is further improved, and fire and smoke can be better prevented from coming outside of the motor. Note that instead of separately providing non-combustible layer 59, it is possible to form non-combustible layer 59 by extending, in the shaft center X direction, an end part, of first bracket 32, on the outer peripheral side in the radial direction.

Sixth Exemplary Embodiment

Figure 16:
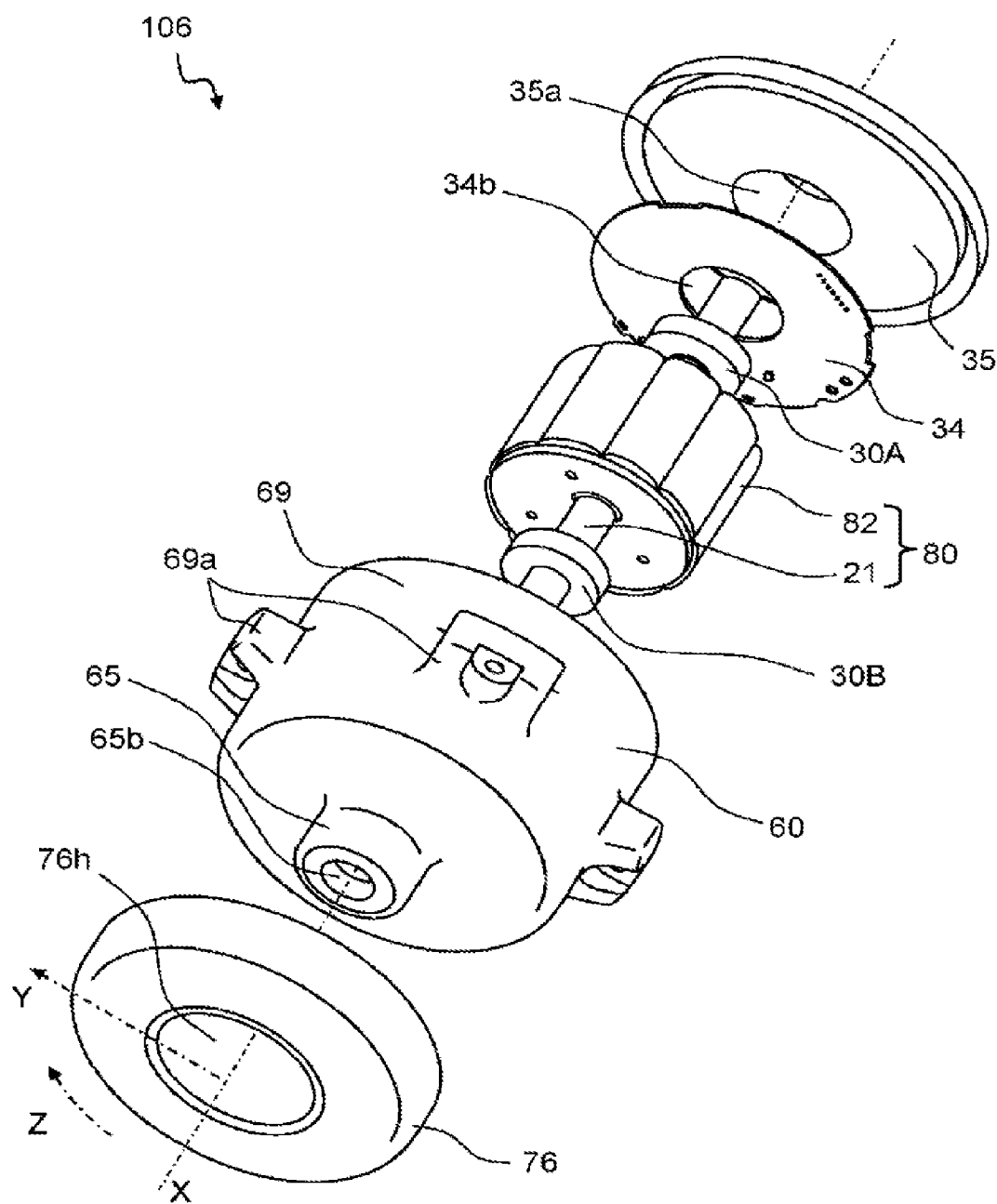
FIG. 16 is an exploded perspective view of a motor according to a sixth exemplary embodiment of the present invention.
Figure 17:
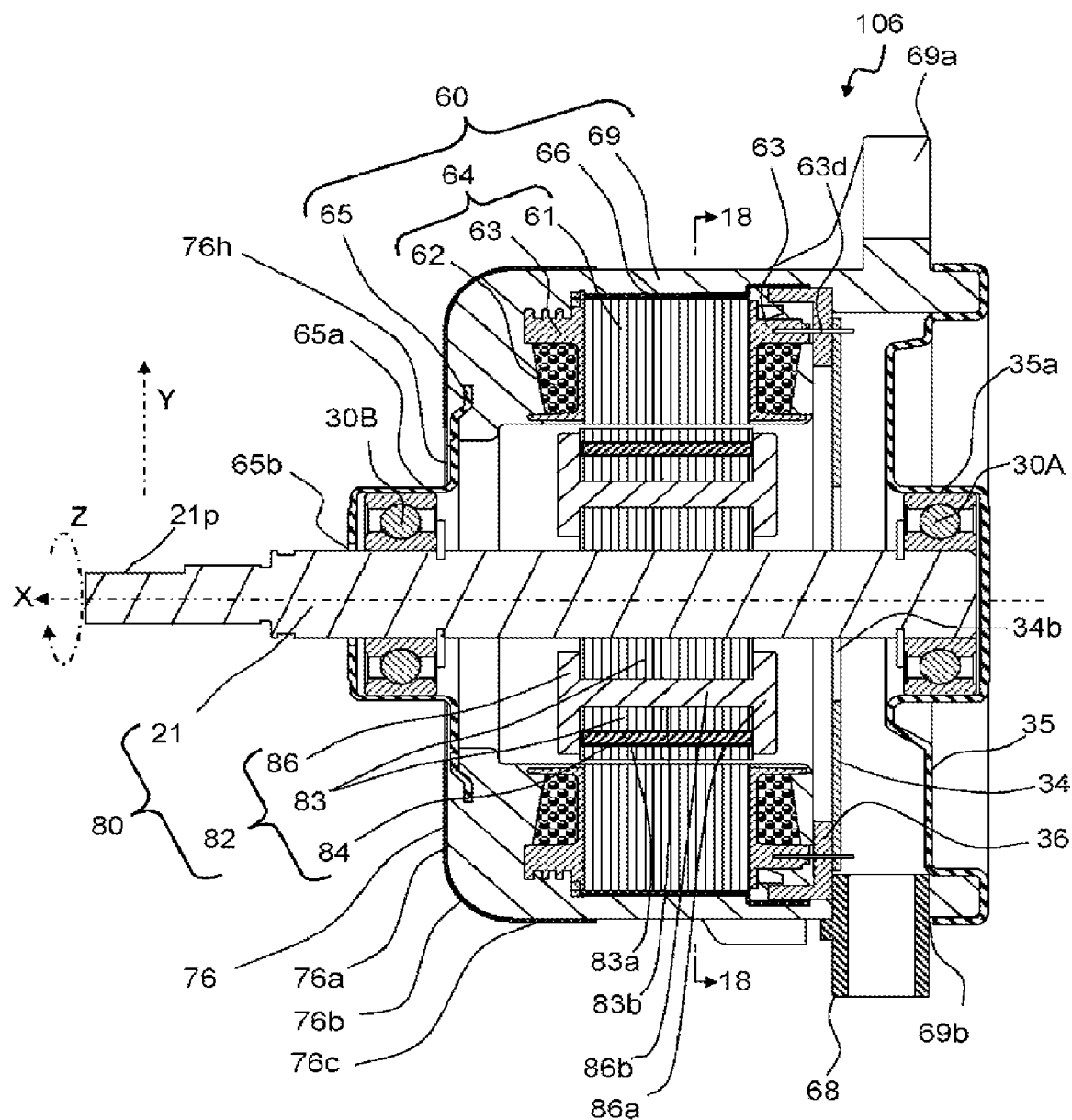
FIG. 17 is a cross-sectional view of the motor according to the sixth exemplary embodiment of the present invention.
Figure 18:
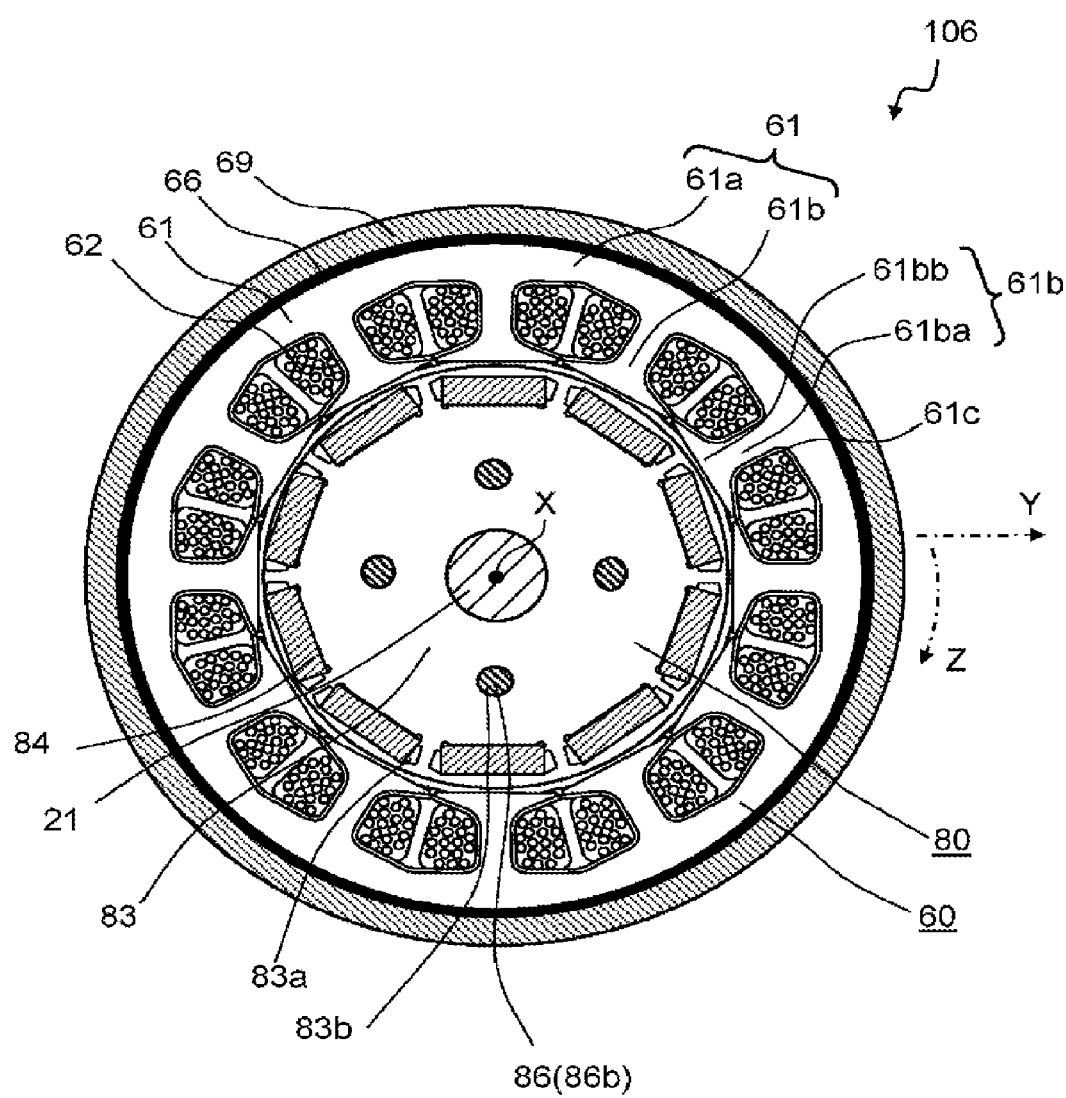
FIG. 18 is a plan cross-sectional view of the motor according to the sixth exemplary embodiment of the present invention taken along line 18-18 in FIG. 17.
Figure 19:
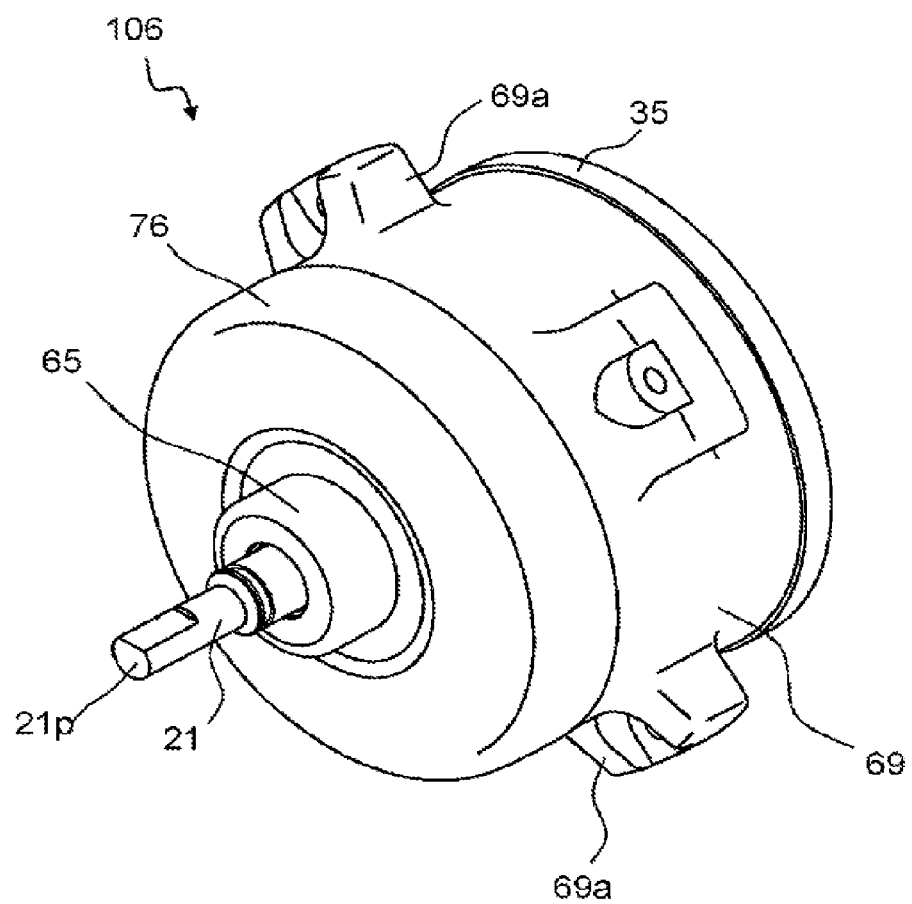
FIG. 19 is an external perspective view of the motor according to the sixth exemplary embodiment of the present invention.
Figure 20:
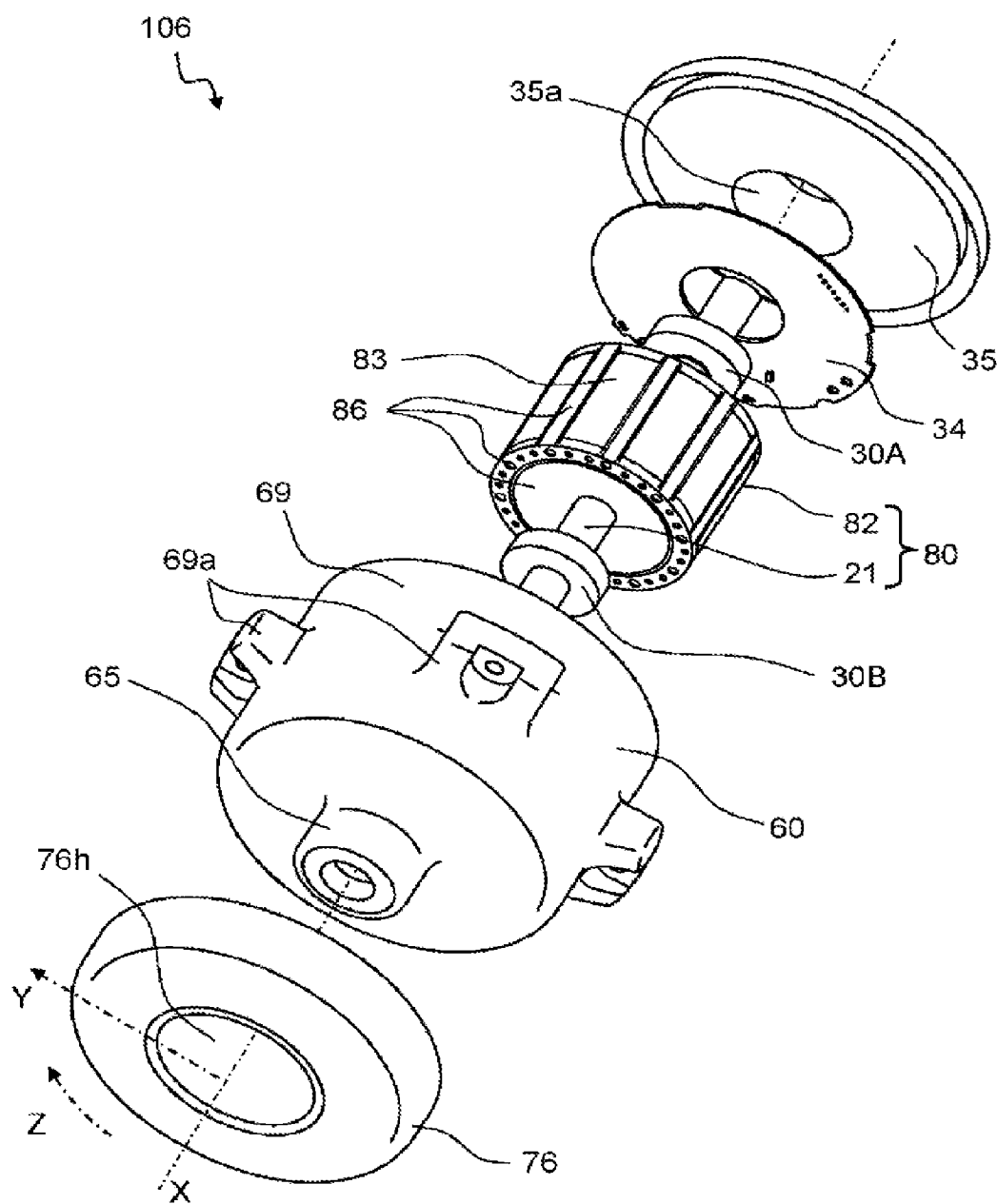
FIG. 20 is an exploded perspective view of another motor according to the sixth exemplary embodiment of the present invention.

FIG. 16 is an exploded perspective view of motor 106 according to a sixth exemplary embodiment of the present invention. FIG. 17 is a cross-sectional view of motor 106 according to the sixth exemplary embodiment of the present invention. FIG. 18 is a plan cross-sectional view of motor 106 according to the sixth exemplary embodiment of the present invention taken along line 18-18 in FIG. 17. FIG. 19 is an external perspective view of motor 106 according to the sixth exemplary embodiment of the present invention. In addition, FIG. 20 is an exploded perspective view of another motor according to the sixth exemplary embodiment of the present invention.

Also in the present exemplary embodiment, a description will be given on motor 106 as an example of a brushless motor including permanent magnets on a rotor. Hereinafter, as show in FIG. 16, a direction represented by "X" in which rotary shaft 21 extends is a shaft direction. A description will be given supposing that, in a plane perpendicular to the shaft direction X as shown in FIG. 18, a direction indicated by "Y" spreading from center X of rotary shaft 21 is a radial direction and a direction indicated by "Z" circling around central point X is a circumferential direction.

Further, as shown in FIG. 17, also in the present exemplary embodiment, a non-combustible layer is provided to prevent that fire and smoke come outside of a main body of motor 106 due to, for example, a problem that a safe protection circuit does not normally function and an excessive current thus flows through coil 62. Specifically, in the present exemplary embodiment, a metallic cover made of metal is used as the non-combustible layer. More specifically, the metallic cover is configured with metallic inner cover 66 and metallic outer cover 76.

As shown in FIG. 16, motor 106 of the present exemplary embodiment includes stator 60, rotor 80, first bracket 35, circuit board 34, two shaft bearings 30A and 30B, and metallic outer cover 76. Note that for easy understanding of a configuration of motor 106, metallic inner cover (66) (to be described later) is not shown in the drawing.

As shown in FIG. 17, stator 60 includes coil assembly 64 including stator core 61, coils 62, and insulators 63. Coil assembly 64 is assembled with coil 62 wound on stator core 61 via insulators 63 made of an insulating material similarly to the above exemplary embodiments.

Further, as shown in FIG. 18, stator core 61 has a ring-shaped yoke 61a and a plurality of teeth 61b extending inward in the radial direction from an inner peripheral surface of yoke 61a. The plurality of teeth 61b are disposed at the same intervals in the circumferential direction Z, forming slots 61c, which are opening parts, each between each tooth 61b. In the present exemplary embodiment, an example is described in which the plurality of teeth 61b are used to form 12 slots. On an end part of each extended tooth 61*b*, there is formed tooth top end 61*bb* that is expanded in the circumferential direction Z such that tooth top end 61*bb* is wider than a tooth middle part 61*ba*. An inner peripheral surface of each tooth top end 61*bb* serves as a magnetic pole surface that faces an outer peripheral surface of rotor 80. With respect to stator core 61 having the above configuration, coils 62 are formed by winding a winding wire on each tooth 61*b* while inserting the winding wire into an opening of each slot 61*c*. In addition, for example, transition wires as described in the fifth exemplary embodiment are each used to connect between individual coils 62. Coils 62 each on each tooth 61*b* as described above are energized and driven by, for example, three-phase alternating current with a U-phase, a V-phase, and a W-phase that are different in phase from each other by 120 degrees.

Further, in the present exemplary embodiment, stator 60 includes: metallic inner cover 66 made of metal being disposed to surround an outer periphery of stator core 61 as shown in FIG. 18; and second bracket 65 disposed to protrude from stator 60 as shown in FIG. 16. Further, as shown in FIG. 17, stator 60 is integrally molded with molding resin such that while coil assembly 64, metallic inner cover 66, and second bracket 65 are disposed at predetermined positions, the resin material covers all these members except the inner peripheral surface of each tooth (61*b*) and a projecting part of second bracket 65. As described above, stator 60 is configured to include molding resin part 69 in which the above-mentioned members are integrally molded with molding resin. Stator 60 configured as described above has an approximately cylindrical shape, and on a columnar surface of stator 60 there are formed mounting parts 69*a* for attaching motor 106 to an external device or the like and are formed wire hole 69*b* and the like. Of both circular surfaces of stator 60, one surface is open, and first bracket 35 is attached to the opening to cover one of the openings like putting a lid. The other surface is closed, and second bracket 65 is disposed to protrude from the surface. The configuration of stator 60 will be further described below in detail.

As shown in FIGS. 16 to 18, inside stator 60 as described above there is inserted rotor 80 with a predetermined distance between rotor 80 and stator 60 in the radial direction Y. That is, motor 106 is an inner rotor type motor, in which rotor 80 is disposed inside stator 60, and the present exemplary embodiment takes motor 106 of the above-described inner rotor type as an example.

Rotor 80 includes rotation body 82 holding magnets 84 centering around rotary shaft 21 rotatably held by shaft bearing 30A and shaft bearing 30B. As shown in FIG. 17, rotation body 82 includes rotor core 83, magnets 84, and rotor resin part 86. Rotor core 83 is configured with, for example, a plurality of thin steel sheets laminated in the shaft direction X and is fixed to rotary shaft 21 at approximately a central part of rotary shaft 21. Magnets 84 are permanent magnets and are arranged inside rotor core 83, in the present exemplary embodiment.

As shown in FIG. 18, in rotor core 83 there are formed a plurality of magnet insertion holes 83*a* arranged at the same intervals in the circumferential direction Z and penetrating through rotor core 83 in the shaft direction X. One magnet 84 is inserted in each magnet insertion hole 83*a*. The present exemplary embodiment describes an interior permanent magnet (IPM) type motor 106, in which magnets 84 are contained in rotor core 83 as described above. An example described in the present exemplary embodiment has 10 magnetic poles such that S pole and N pole of magnets 84 can be alternately arranged in the circumferential direction Z. An example of motor 106 in the present exemplary embodiment is a brushless motor having 10 poles and 12 slots.

Further, in the present exemplary embodiment, as shown in FIG. 17, rotation body 82 is configured with rotor resin part 86, and rotor resin part 86 is formed by molding such that both ends of each magnet insertion hole 83*a* of rotor core 83 in which magnet 84 is inserted are covered with the resin material. In the present exemplary embodiment, rotor core 83 is also provided with resin through holes 83*b* penetrating through in the shaft direction X. Rotor resin part 86 is provided with disk-shaped end plate resin parts 86*a* formed on both end parts in an axis direction of rotor resin part 86 such that disk-shaped end plate resin parts 86*a* sandwich each magnet 84 in the shaft direction X. In the present exemplary embodiment, resin through holes 83*b* of rotor core 83 are also filled with the resin material, which connects end plate resin parts 86*a* to each other with resin in the shaft direction X. The resin material filling resin through holes 83*b* constitutes inner resin parts 86*b* as part of rotor resin part 86. In the present exemplary embodiment, above-described rotor resin part 86 enables each magnet 84 to be securely fixed on rotor core 83. In addition, with this configuration, even if motor 106 is used for water-section devices, outdoor units of air conditioners, and the like, which are in contact with rain water and dew condensation water, magnets 84 are prevented from being in contact with water. Although the present exemplary embodiment describes above-described inner rotor type motor 106, the motor may be a surface permanent magnet motor (SPM) as shown in FIG. 20, in which magnets are held on the outer peripheral surface of rotor 80 like motors described in the first to fifth exemplary embodiments As described above, rotor 80 is configured with rotation body 82 having a columnar shape as shown in FIG. 16 and rotary shaft 21 penetrating through a center of rotation body 82.

Above-described rotary shaft 21 to which rotation body 82 is fixed is rotatably supported by two shaft bearings 30A and 30B. Shaft bearings 30A and 30B are each a bearing having a plurality of small diameter balls. In the present exemplary embodiment, above-described shaft bearings 30A and 30B are respectively fixed via first bracket 35 and second bracket 65 both made of metal and each disposed on each of both ends of stator 60 in the shaft direction.

As shown in FIGS. 16 and 17, first bracket 35 has an approximately disk shape and is configured to be attachable to an opening side of stator 60. First bracket 35 has holder 35*a* formed to be recessed in a cylindrical shape at a central part, and holder 35*a* holds shaft bearing 30A. Thus, first bracket 35 in which shaft bearing 30A is inserted in holder 35*a* is attached to stator 60, so that one side of rotary shaft 21 is rotatably supported.

Second bracket 65 has a diameter smaller than a diameter of first bracket 35 and has a shape in which a disk and a cylinder are combined. Further, by the above-mentioned molding, second bracket 65 is fixed to molding resin part 69 of stator 60. Also at a central part of second bracket 65, there is a holder 65*a* formed to be recessed in a cylindrical shape, and shaft bearing 30B is held by holder 65*a*. Thus, by inserting shaft bearing 30B into holder 65*a*, the other side of rotary shaft 21 is rotatably supported with respect to stator 60. In the present exemplary embodiment, at a center of holder 65*a*, there is formed opening 65*b*, and rotary shaft 21 penetrates through opening 65*b* and protrudes outward. Then, a protruding part of rotary shaft 21 serves as output shaft 21*p* for a load or the like to be connected.

A more detailed description will be given below, but in the present exemplary embodiment, metallic outer cover 76 made of metal is attached on second bracket 65 of stator 60. Metallic outer cover 76 has a hollow cup shape having opening part 76h at a center. Metallic outer cover 76 is attached to stator 60 such that second bracket 65 contained in stator 60 penetrates through opening part 76h of metallic outer cover 76.

The present exemplary embodiment further describes a configuration example in which motor 106 has circuit board 34 built-in on the opening side of stator 60. Circuit board 34 of the present exemplary embodiment has an approximately disk shape and has opening 34b formed at a central part for rotary shaft 21 to go through. On circuit board 34 there are mounted electronic components (34a) such as a drive circuit, and to circuit board 34 there are connected connecting wires and the like through which a supply voltage and a control signal are applied. Then, connecting wires for connection to outside are led outside via wire holder 68 attached to wire hole 69b.

As described above, motor 106 is configured in the following procedure. First, stator 60 is configured by integrally molding coil assembly 64, metallic inner cover 66, and second bracket 65 disposed at predetermined positions. Shaft bearings 30A and 30B are attached on both sides of rotary shaft 21 of rotor 80. Then, rotor 80 to which shaft bearings 30A and 30B are attached is inserted into stator 60 such that output shaft 21p protrudes from opening 65b of second bracket 65. Next, shaft bearing 30B is pressed into holder 65a of second bracket 65. Next, circuit board 34 is attached on the opening side of stator 60. The connecting wires connected to circuit board 34 are led outside via wire holder 68. Then, shaft bearing 30A is pressed into holder 35a of first bracket 35, and first bracket 35 is attached on the opening side of stator 60 like putting a lid. Finally, metallic outer cover 76 is attached on second bracket 65 of stator 60. In this manner, motor 106 as shown in FIG. 19 is completed.

When motor 106 configured as described above is supplied with a supply voltage, control signals, and the like via the connecting wires, coils 62 are energized and driven by the drive circuit mounted on circuit board 34. When coils 62 are energized, drive currents flow through coils 62, and stator core 61 generates a magnetic field. Then, due to an alternating magnetic field from stator core 61 and magnetic fields from magnets 84 owned by rotor 80, an attractive force and a repulsive force are generated depending on polarities of those magnetic fields, and these forces rotates rotor 80 in the circumferential direction Z centering on rotary shaft 21.

Next, regarding motor 106 configured as described above, a detailed configuration of stator 60 including metallic inner cover 66 will be described.

Figure 21:
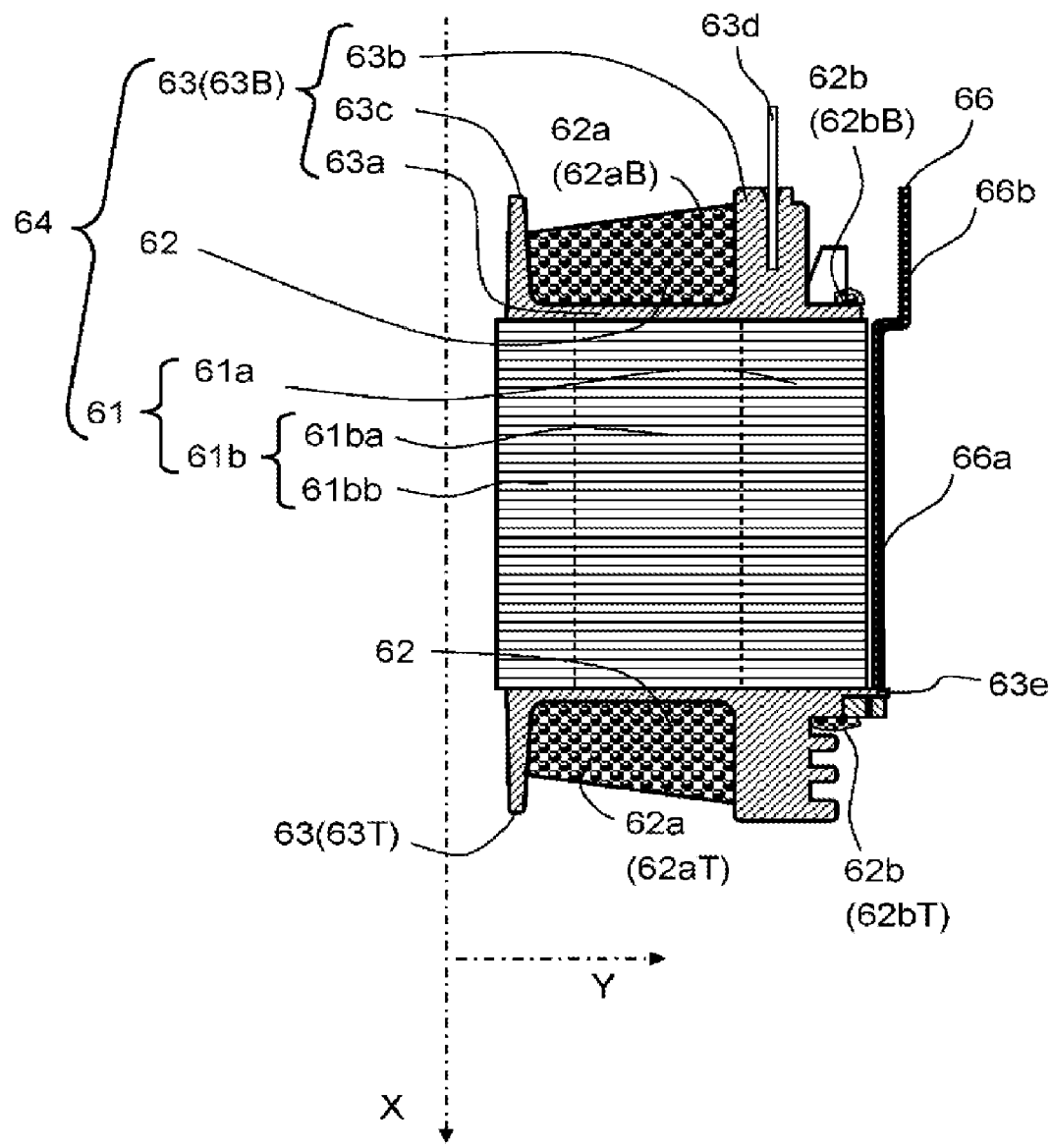
FIG. 21 is a cross-sectional view showing a cross-section of a metallic inner cover of the motor according to the sixth exemplary embodiment of the present invention and showing a cross-section of a tooth on which a coil is wound.
Figure 22:
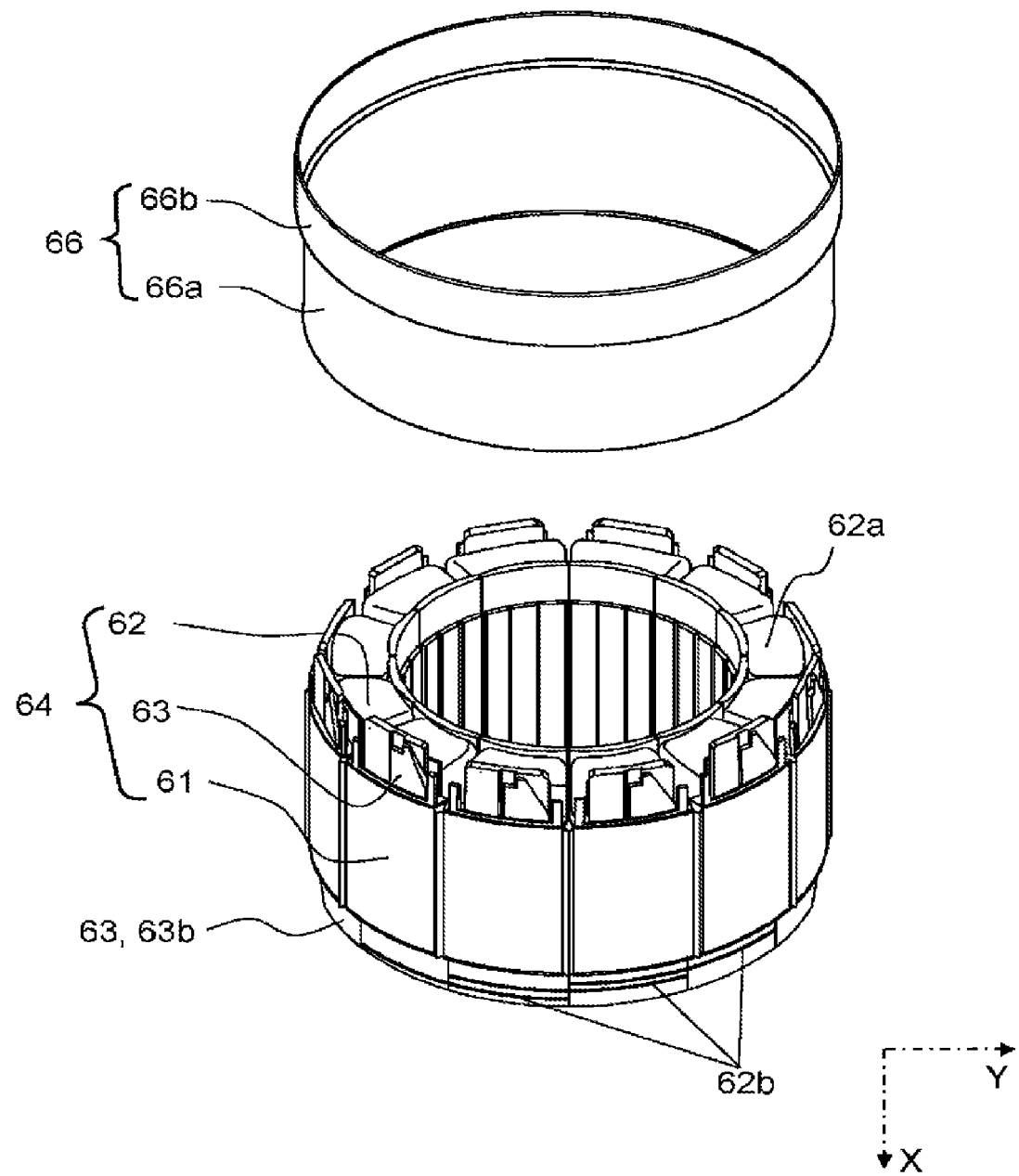
FIG. 22 is an exploded perspective view of a coil assembly and a metallic inner cover of the motor according to the sixth exemplary embodiment of the present invention.
Figure 23:
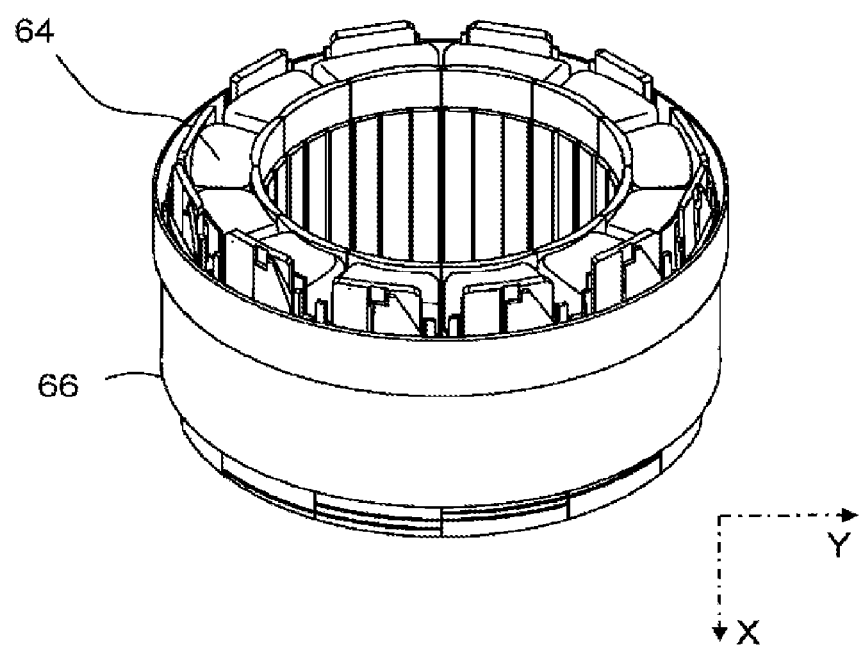
FIG. 23 is a configuration diagram of the metallic inner cover disposed on an outer periphery of the coil assembly of the motor according to the sixth exemplary embodiment of the present invention.

FIG. 21 is a cross-sectional view showing a cross-section of metallic inner cover 66 and a cross-section of tooth 61b on which coil 62 is wound. FIG. 22 is an exploded perspective view of coil assembly 64 and metallic inner cover 66. FIG. 23 is a configuration diagram of metallic inner cover 66 disposed on an outer periphery of coil assembly 64.

As shown in FIG. 21, insulator 63 schematically has bottom surface part 63a, outer peripheral wall 63b, and inner peripheral wall 63c. Bottom surface part 63a is formed of a surface perpendicular to the shaft direction X. Then, the surface formed on bottom surface part 63a is attached to an end surface, of stator core 61, in the shaft direction X. Further, outer peripheral wall 63b and inner peripheral wall 63c are each formed of a wall surface parallel to the shaft direction X. Above-described outer peripheral wall 63b is vertically provided on the outer peripheral side of a part where coil 62 is formed, and restricts a coil position. On outer peripheral wall 63b, there is attached pin 63d to protrude toward the side opposite to stator core 61. As shown in FIG. 17, pin 63d electrically connects coil 62 wound on tooth (61b) and circuit board 34 to each other. Pin 63d penetrates through terminal cap 36 and is connected to circuit board 34. Further, as shown in FIG. 21, inner peripheral wall 63c is vertically provided on the inner side, of outer peripheral wall 63b, in the radial direction, and at the same time, is provided on the inner peripheral side of the part, where coil 62 is formed, and restricts the coil position.

Bottom surface part 63a of above-described insulator 63 is attached to each of both surfaces located on ends, of tooth 61b, in the shaft direction X. A winding wire is wound via the pair of insulators 63 thus attached. By performing the above work, one coil 62 is formed on stator core 61. Then, similar coils 62 are each formed on each tooth 61b, and coils 62 are electrically connected to each other following a predetermined connection pattern, so that coil assembly 64 shown in FIG. 22 is completed.

As shown in FIG. 21, in coil assembly 64 formed as described above, coil 62 has coil ends 62a protruding from stator core 61 to both sides in the shaft direction X. On the other hand, as shown in FIG. 18, a part, of each coil 62, other than coil ends 62a is included in corresponding slot 61c of stator core 61. Further, in order to electrically connect coils 62 to each other, transition wires 62b for connecting between coils 62 are disposed, across teeth (61b), on an outer periphery of an outer peripheral wall 63b of each insulator 63 or other places.

In this case, as described in the above background art and the like, in a motor including above-described coil assembly 64, if by any chance a safety protection function for preventing an excessive current from flowing through coil 62 does not normally operate, the excessive current will flow through coil 62. Then, coil 62 or transition wire 62b generates heat and heats up to extremely high temperatures. As a result, a layer short can occur, a spark can be generated due to the layer short, or the generated spark can ignite gas generated from insulator 63 and the like, and flame can be generated. There is a high possibility that such a problem may arise particularly with the above-mentioned coil ends 62a and transition wires 62b because coil ends 62a and transition wires 62b protrude from stator core 61.

To address the problem, for example, similarly to the fifth exemplary embodiment, also in the present exemplary embodiment, metallic inner cover 66 as a non-combustible layer is disposed outside of coil assembly 64 as shown in FIG. 23. As shown in FIGS. 21 and 22, metallic inner cover 66 is a cylinder made of metal having an approximately cylindrical shape and having open ends on both sides. In the present exemplary embodiment, above-described metallic inner cover 66 is disposed to surround the outer periphery of coil assembly 64 and to have a predetermined clearance in the radial direction between the outer periphery of coil assembly 64 and metallic inner cover 66. Metallic inner cover 66 further has small-diameter part 66a and large-diameter part 66b having a larger diameter than small-diameter part 66a as shown in FIG. 22.

In order to make it possible to fit small-diameter part 66a to the outer periphery of stator core 61, an inner diameter of small-diameter part 66a is made approximately equal to an outer diameter of stator core 61. Further, a dimension of small-diameter part 66a in the shaft direction X is also made approximately equal to a dimension of stator core 61 in the shaft direction X. Due to these settings, when metallic inner cover 66 is fit to coil assembly 64 such that an outer peripheral surface of stator core 61 and an inner peripheral surface of small-diameter part 66a of metallic inner cover 66 are joined to each other, metallic inner cover 66 is simply fixed to coil assembly 64 temporarily as shown in FIG. 23.

Further, as shown in FIG. 21, a dimension of large-diameter part 66b in the shaft direction X is greater than a dimension of coil end 62a in the shaft direction X. In metallic inner cover 66, above-described large-diameter part 66b is provided only on one side, of small-diameter part 66a, in the shaft direction X. When above-described metallic inner cover 66 is attached to coil assembly 64, large-diameter part 66b of metallic inner cover 66 is disposed to surround coil end 62a and transition wire 62b on one side in the shaft direction X.

Note that in FIG. 21, in order to more clearly illustrate the placement of metallic inner cover 66, insulator 63, coil end 62a, transition wire 62b, and the like are separately shown as follows as well. Specifically, in FIG. 21, on one side, of stator core 61, in shaft direction X, insulator 63B, coil end 62aB, and transition wire 62bB are disposed; and on the other side of stator core 61, insulator 63T, coil end 62aT, and transition wire 62bT are disposed.

That is, as shown in FIG. 21, metallic inner cover 66 is disposed such that large-diameter part 66b surrounds insulator 63B, coil end 62aB, and transition wire 62bB. On the other hand, any of insulator 63T, coil end 62aT, and transition wire 62bT is not surrounded by metallic inner cover 66. In particular, on an outer periphery of insulator 63T located on the lower part in the drawing, there is provided positioning part 63e, which is not included in insulator 63B located on the upper part in the drawing. Since insulator 63T has positioning part 63e, when metallic inner cover 66 is attached, the positional relationships between small-diameter part 66a and stator core 61 and between large-diameter part 66b and insulator 63B are uniquely determined.

Further, in metallic inner cover 66 according to the present exemplary embodiment, large-diameter part 66b is formed to have a diameter larger than the diameter of small-diameter part 66a. Therefore, large-diameter part 66b is attached to stator core 61 with an enough insulation distance between large-diameter part 66b and pin 63d. As shown in FIG. 17, between large-diameter part (66b) and pin 63d, there is a side wall of terminal cap 36. If terminal cap 36 is formed of an insulating material, it is possible to secure the insulation distance between large-diameter part (66b) and pin 63d with a larger margin.

As described above, large-diameter part 66b of metallic inner cover 66 as a non-combustible layer is disposed on the outer peripheral side of coil end 62aB, outer peripheral wall 63b of insulator 63B, and transition wire 62bB. Therefore, even if fire is caused from coil 62 due to the above-mentioned problem caused by a layer short or the like and the fire is about to spread from insulator 63B and transition wire 62bB to the outer peripheral side in the radial direction, the fire and smoke is blocked by large-diameter part 66b of metallic inner cover 66, and the fire and smoke are prevented from coming outside of motor 106.

Further, as mentioned above, regarding the configuration as shown in FIG. 23 in which fire protection measures are taken, the configuration except the inner peripheral surface of each tooth 61b is covered with the resin material of molding resin part 69. That is, for example, in the fifth exemplary embodiment, insulators 13 and coil ends 12a in addition to the inner peripheral surface of each tooth 11b are exposed. However, in the present exemplary embodiment, only the inner peripheral surfaces of teeth 11b are exposed.

In other words, in the present exemplary embodiment, the resin material covers the whole of insulators 63 and coil ends 62a in addition to the whole of metallic inner cover 66. In the present exemplary embodiment, since the above-described configuration is employed, the above-mentioned fire protection measures are taken, and holding strength of coil assembly 64 in stator 60 is also sufficiently secured.

Further, as shown in FIG. 15, both of insulators 13 used in the fifth exemplary embodiment each have protrusion 63f protruding in the radial direction Y. Therefore, in the case of the present configuration, if non-combustible layer 57, in particular, non-combustible layer 57 made of the metallic material is attached to stator core 11, there is a need for a manufacturing step in which a plate-shaped metallic material is wrapped around stator core 11.

In contrast, if insulators 63T and 63B according to the present exemplary embodiment are used, metallic inner cover 66 having a cylindrical shape can be used. Therefore, the work of attaching metallic inner cover 66 to stator core 61 can be easy, and the productivity is thus improved.

As shown in FIG. 17, in addition to the above-described fire protection measures in stator 60, metallic outer cover 76 is further provided as a non-combustible layer in the present exemplary embodiment. Metallic outer cover 76 is attached to an outer surface of molding resin part 69 of stator 60. In the present exemplary embodiment, metallic outer cover 76 is attached to an outer side of stator 60 on a side closer to output shaft 21p. In addition, since metallic outer cover 76 is attached as described above, metallic outer cover 76 is disposed, in the shaft direction X, at a position on the side of stator core 61 opposite to large-diameter part (66b) of metallic inner cover 66.

Figure 24:
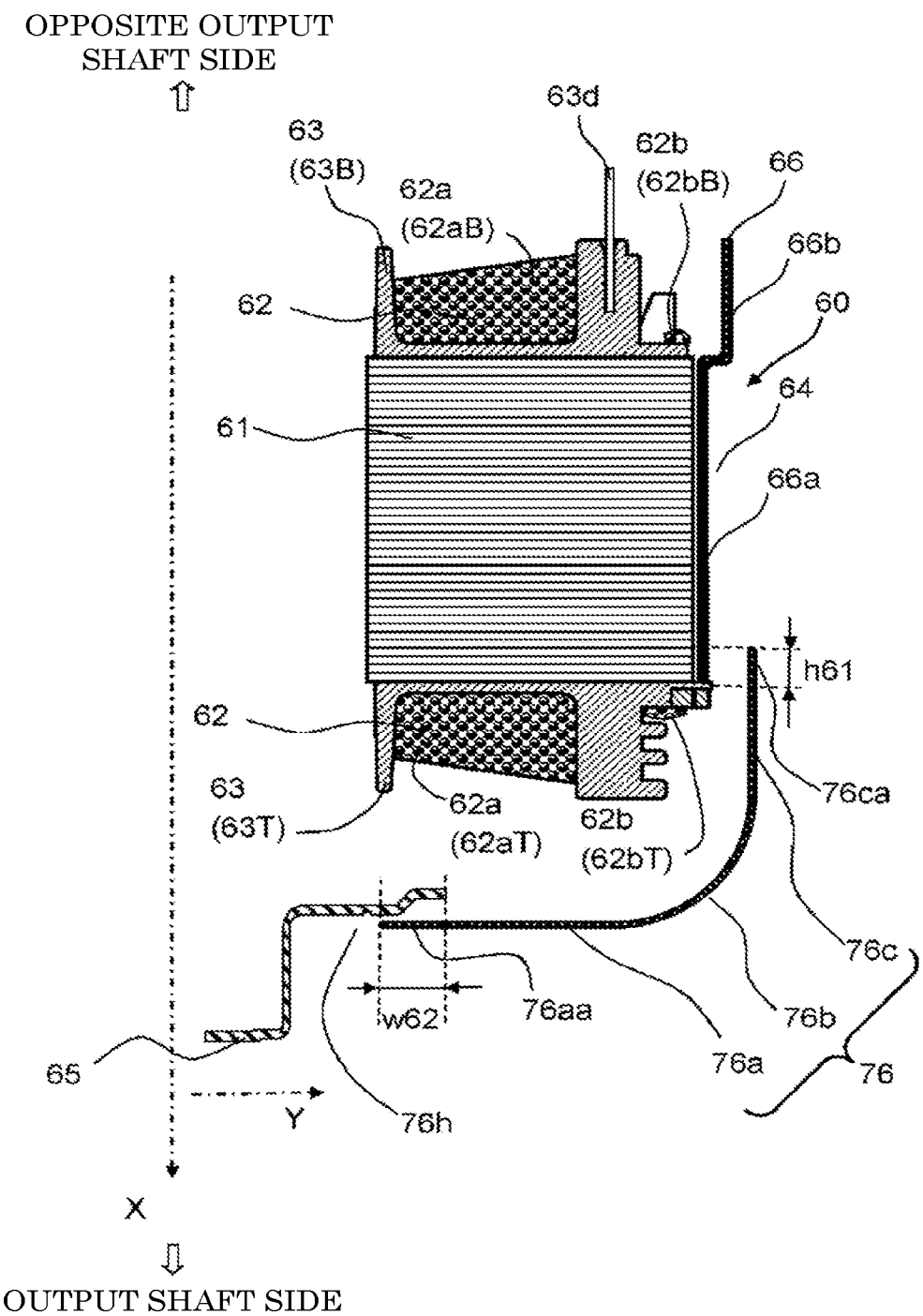
FIG. 24 is a diagram for illustrating the metallic outer cover of the motor according to the sixth exemplary embodiment of the present invention.

FIG. 24 is a drawing for describing metallic outer cover 76. In order to illustrate a positional relationship between metallic outer cover 76 and other members, FIG. 24 shows together with metallic outer cover 76 also coil assembly 64, metallic inner cover 66, and second bracket 65. Since metallic outer cover 76 is attached as shown in FIG. 17, metallic outer cover 76 is disposed, in the shaft direction X, at a position on the side of stator core 61 opposite to large-diameter part 66b of metallic inner cover 66 as shown in FIG. 24. In this case, as described above, on the opposite side of large-diameter part 66b, insulator 63T, coil end 62aT, and transition wire 62bT are disposed together with second bracket 65 from which output shaft (21p) protrudes. Note that a description will be given hereinafter supposing appropriately that in the shaft direction X, a side of above-described stator core 61 opposite to large-diameter part 66b of metallic inner cover 66 is defined as an output shaft side, on which output shaft (21p) is disposed, and supposing that an opposite side of the output shaft side is defined as an opposite output shaft side.

Metallic outer cover 76 is configured with top surface 76a, curved surface 76b, and cylindrical part 76c and has a hollow cup shape. Top surface 76a of metallic outer cover 76 has a disk shape and opening part 76h at a center of top surface 76a. Curved surface 76b is curved in a curved surface shape at approximately a right angle from top surface 76a. Cylindrical part 76c extends in a cylindrical shape from curved surface 76b and has an opening on an end side of cylindrical part 76c. Further, in order to make it easy to fit cylindrical part 76c to an outer periphery of stator 60, an inner diameter of cylindrical part 76c is made approximately equal to an outer diameter of stator 60.

Further, a dimension of metallic outer cover 76 in the shaft direction X when metallic outer cover 76 is attached to stator 60 is set to such a dimension that cylindrical part 76c and metallic inner cover 66 can create overlapping part 76*ca* in the shaft direction X. In other words, metallic outer cover 76 is attached at such a position that cylindrical part 76*c* and stator core 61 can create overlapping part 76*ca* in the shaft direction X when metallic outer cover 76 is attached to stator 60. In the specific example described here, overlapping part 76*ca* is dimension h61.

In this manner, in the present exemplary embodiment, on the output shaft side, at least a part of cylindrical part 76*c* overlaps, as overlapping part 76*ca*, stator core 61 in the shaft direction X. Further, metallic outer cover 76 is disposed with respect to coil assembly 64 such that overlapping part 76*ca* of cylindrical part 76*c* surrounds an outer side of the outer periphery of stator core 61, having a predetermined space between the outer periphery of stator core 61 and overlapping part 76*ca* in the radial direction Y. In the above-described positional relationship of metallic outer cover 76 with respect to coil assembly 64, metallic outer cover 76 is attached to stator 60. As a result, on the output shaft side, metallic outer cover 76 surrounds and covers insulator 63T, coil end 62*a*T, and transition wire 62*b*T.

In this manner, coil end 62*a*T, insulator 63T, and transition wire 62*b*T are covered by metallic outer cover 76, which is a non-combustible layer. Therefore, even if fire is caused due to the above-mentioned problem caused by a layer short or the like, and the fire is about to spread from insulator 63B and transition wire 62*b*B to the outer peripheral side in the radial direction, the fire and smoke is blocked by metallic outer cover 76, and the fire and smoke can be prevented from coming outside of motor 106.

Further, also in the present exemplary embodiment, similarly to the configurations of FIGS. 14 and 15 of the fifth exemplary embodiment, at least a part of top surface 76*a* of metallic outer cover 76 overlaps, as overlapping part 76*aa*, second bracket 65 in the radial direction Y. In more detail, a part, of top surface 76*a*, on an outer side of an outer periphery of opening part 76*h* is annular overlapping part 76*aa* that overlaps, in the radial direction Y, a part on the outer peripheral side of second bracket 65. Further, FIG. 24 shows an example in which overlapping part 76*aa* has dimension w62. As described above, also in the present exemplary embodiment, since metallic outer cover 76 and second bracket 65 are made to overlap each other on overlapping part 76*aa*, blocking performance of preventing the fire and smoke caused inside motor 106 from coming outside is improved.

As described above, motor 106 of the present exemplary embodiment includes metallic inner cover 66 and metallic outer cover 76 each serving as a non-combustible layer.

By molding stator core 61 and metallic inner cover 66 attached to a side surface of stator core 61 as described above, stator 60 is configured to include molding resin part 69 integrating these members. In above-described stator 60, on the opposite output shaft side, large-diameter part 66*b* of metallic inner cover 66 is disposed to surround insulator 63B, coil end 62*a*B, and transition wire 62*b*B. Therefore, on the opposite output shaft side, large-diameter part 66*b* of metallic inner cover 66 can block the fire and smoke caused inside motor 106.

Further, in the present exemplary embodiment, metallic outer cover 76 is fit in the outer periphery of stator 60 in the above-described manner. With this arrangement, on the output shaft side, metallic outer cover 76 is disposed to cover insulator 63T, coil end 62*a*T, and transition wire 62*b*T. Therefore, on the output shaft side, metallic outer cover 76 can block the fire and smoke caused inside motor 106.

In the present exemplary embodiment, molding resin part 69 covers the whole of insulators 63 and coil ends 62*a* in addition to the whole of metallic inner cover 66 while only inner peripheral surface of each tooth 11*b* is exposed. As a result, the above-described fire protection measures are taken, and holding strength of coil assembly 64 in stator 60 is sufficiently secured.

Although, in the present exemplary embodiment, metallic inner cover 66 and metallic outer cover 76, which are made of metal, are described as non-combustible layers, metallic inner cover 66 and metallic outer cover 76 only have to be made of a non-combustible material. Metallic inner cover 66 and metallic outer cover 76 may be made of a material other than metal such as ceramic, which is a non-combustible material.

Seventh Exemplary Embodiment

Figure 25:
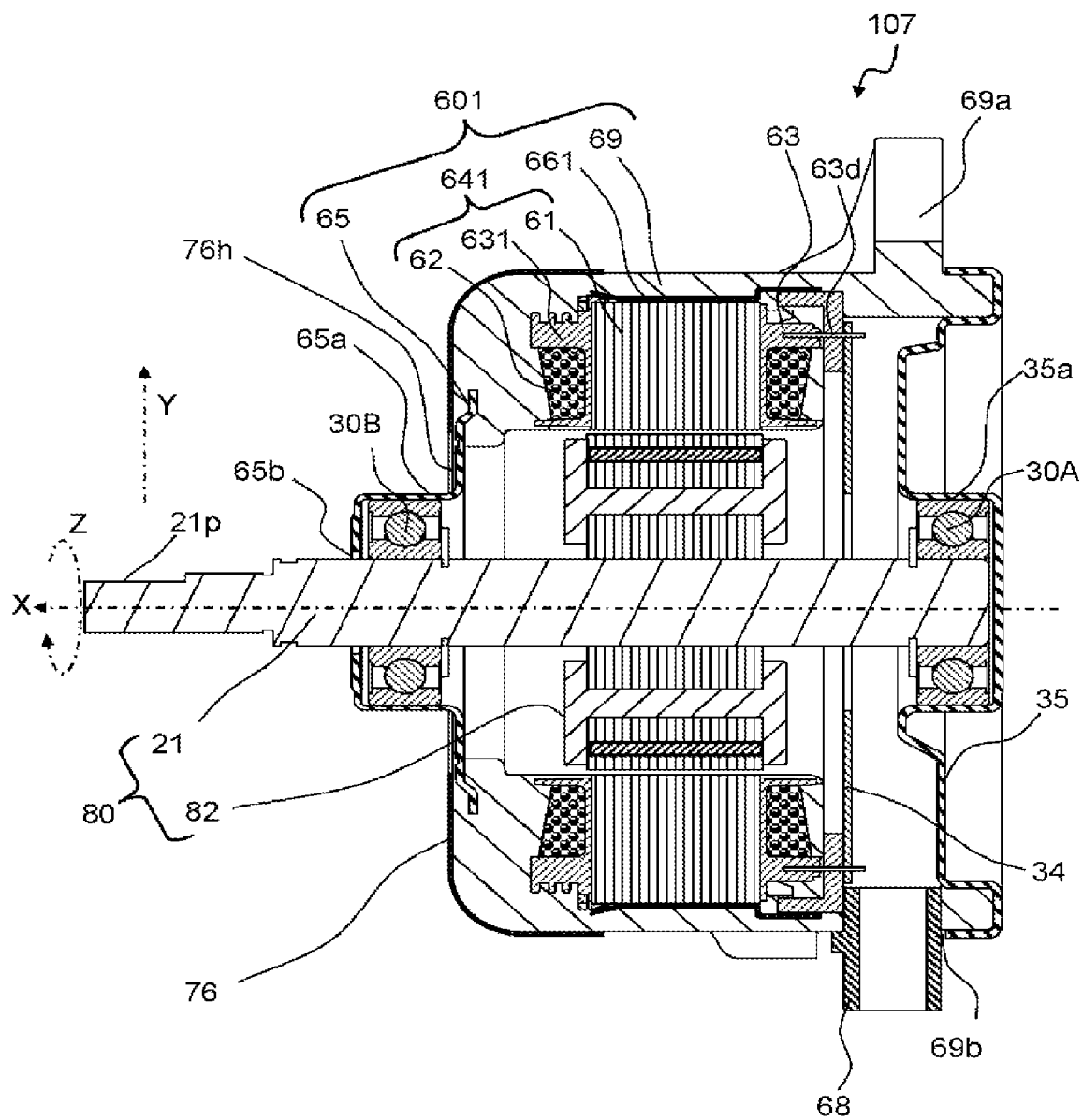
FIG. 25 is a cross-sectional view of a motor according to a seventh exemplary embodiment of the present invention.
Figure 26:
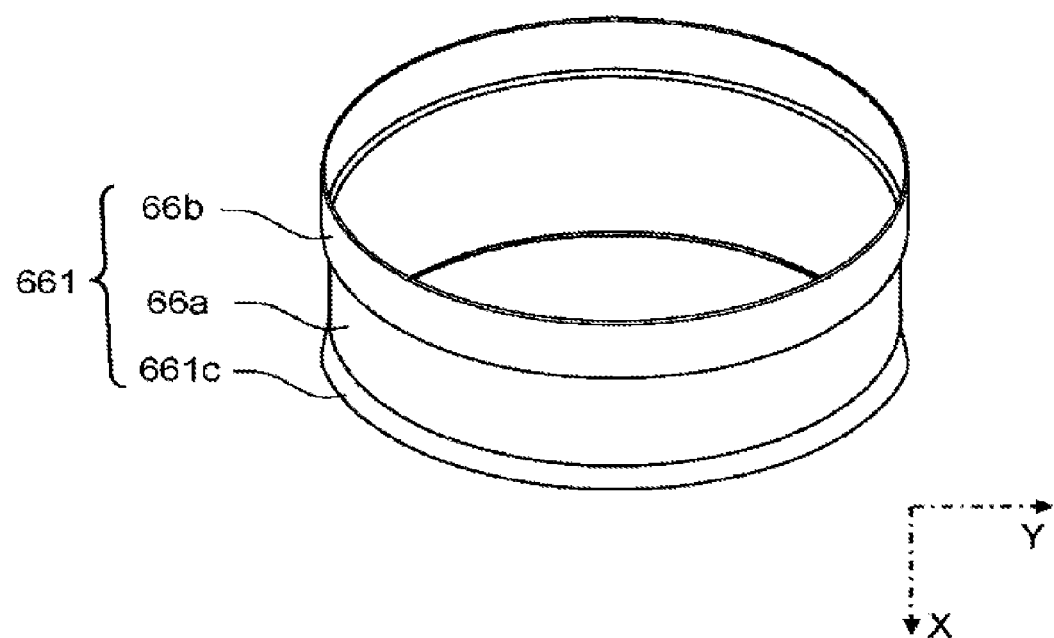
FIG. 26 is a perspective view of a metallic inner cover of the motor according to the seventh exemplary embodiment of the present invention.
Figure 27:
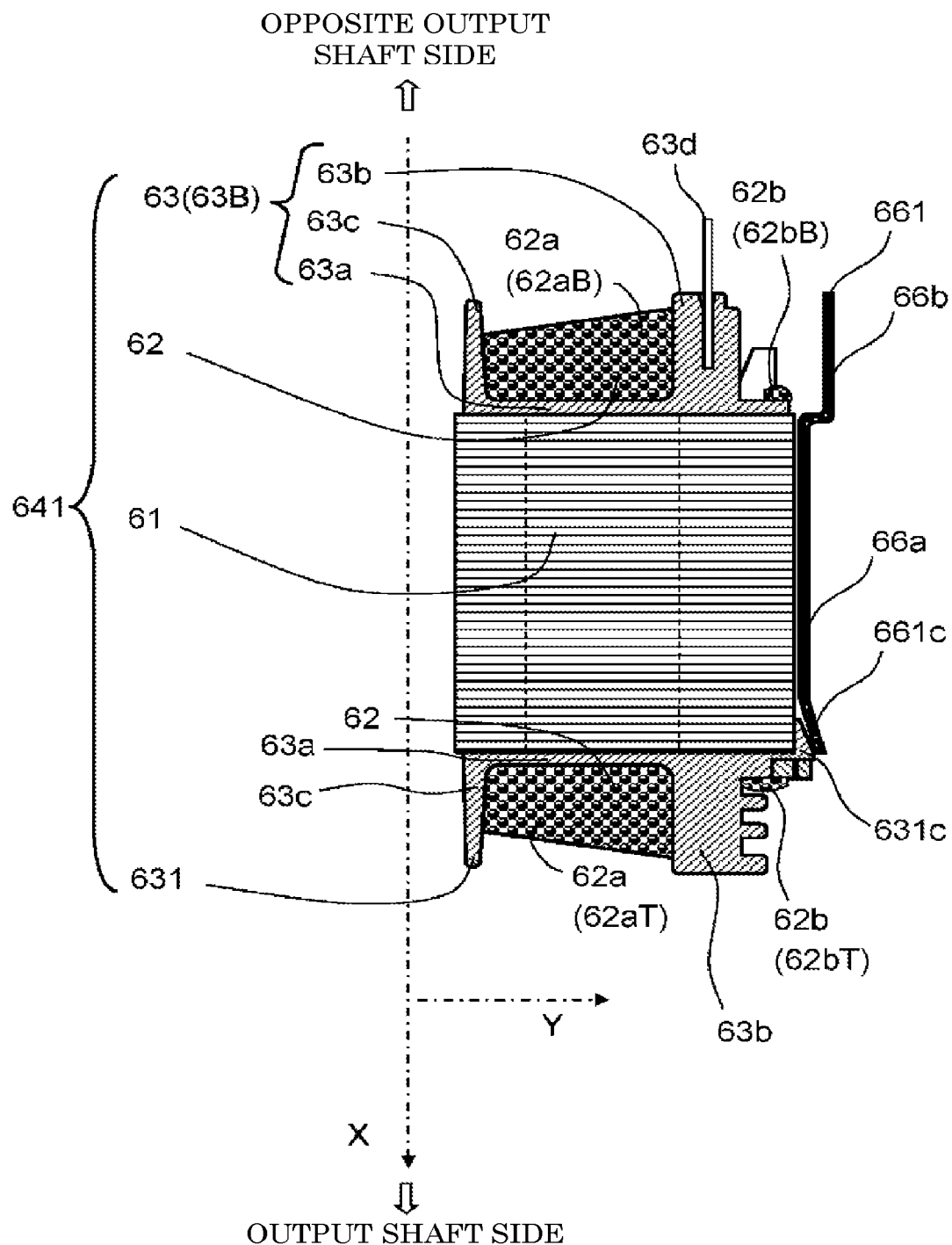
FIG. 27 is a cross-sectional view of the metallic inner cover and a coil assembly of the motor according to the seventh exemplary embodiment of the present invention.

FIG. 25 is a cross-sectional view of motor 107 according to a seventh exemplary embodiment of the present invention. FIG. 26 is a perspective view of metallic inner cover 661 of motor 107 according to the seventh exemplary embodiment of the present invention. FIG. 27 is a cross-sectional view of metallic inner cover 661 and coil assembly 641 of motor 107 according to the seventh exemplary embodiment of the present invention.

Compared with the sixth exemplary embodiment shown in FIG. 17, motor 107 in the present exemplary embodiment includes: metallic inner cover 661 that is a modification of metallic inner cover 66 of the sixth exemplary embodiment; and insulator 631 that is a modification of insulator 63 of the sixth exemplary embodiment. As shown in FIG. 25, motor 107 includes stator 601 including molding resin part 69 made by integrating metallic inner cover 661, coil assembly 641, and insulator 631 such that metallic inner cover 661 is attached to coil assembly 641 including insulator 631. However, the configuration and operation except the above arrangement is identical to the configuration of the sixth exemplary embodiment, and components identical to the components of the sixth exemplary embodiment are assigned the same reference marks, and the description of the sixth exemplary embodiment is used.

First, as shown in FIG. 26, metallic inner cover 661 as a non-combustible layer is also a cylinder made of metal having an approximately cylindrical shape and having open ends on both sides. Further, metallic inner cover 661 further has tapered part 661*c* in addition to small-diameter part 66*a* and large-diameter part 66*b* similar to the corresponding members of metallic inner cover 66 of the sixth exemplary embodiment.

Tapered part 661*c* is provided on an end part on the side of small-diameter part 66*a* opposite to large-diameter part 66*b*. Tapered part 661*c* has an inverse tapered shape, and a diameter of tapered part 661*c* becomes larger from a boundary between tapered part 661*c* and small-diameter part 66*a* of metallic inner cover 661 toward an end part.

Further, in the present exemplary embodiment, in addition to tapered part 661*c*, coil assembly 641 has insulator 631 different from insulator 63 of the sixth exemplary embodiment.

Specifically, as shown in FIG. 27, in coil assembly 641 in the present exemplary embodiment, insulator 63 similar to that in the sixth exemplary embodiment is disposed on the opposite output shaft side, and insulator 631 is disposed on the output shaft side. Insulator 631 has bottom surface part 63*a*, outer peripheral wall 63*b*, and inner peripheral wall 63*c* similar to those in the sixth exemplary embodiment, and further has tapered part 631c. When insulator 631 is attached to stator core 61 on the output shaft side, tapered part 631c is disposed on an outer periphery of stator core 61. Tapered part 631c has a triangular cross-section and has an inverse tapered shape as a whole, a diameter of tapered part 631c becomes larger toward an end part of stator core 61. Further, tapered part 631c is formed to have approximately the same angle of side surface and length in the shaft direction X as tapered part 661c of metallic inner cover 661.

When metallic inner cover 661 having above-mentioned tapered part 661c is gradually fit into coil assembly 641 having above-described tapered part 631c, tapered part 661c functions as a stopper at the time when tapered part 661c comes into contact with tapered part 631c, so that metallic inner cover 661 cannot be fit into any further. As described above, in the present exemplary embodiment, tapered part 661c and tapered part 631c restrict the position, in the shaft direction X, of metallic inner cover 661 with respect to coil assembly 641.

As described above, in the present exemplary embodiment, coil assembly 641 includes insulator 631 having tapered part 631c, and metallic inner cover 661 includes tapered part 661c whose shape coincides with the shape of tapered part 631c. Therefore, in the present exemplary embodiment, metallic inner cover 661 can be easily fit into coil assembly 641. In particular, since the above-described tapered shapes achieve a stopper function, metallic inner cover 661 can be more easily fit into. In addition, by such a simple operation as fitting metallic inner cover 661 into until tapered part 661c and tapered part 631c come in contact with each other, coil assembly 641 and metallic inner cover 661 can be accurately aligned with each other in the shaft direction X without error in positional relationship. Large-diameter part 66b of metallic inner cover 661 can therefore be disposed accurately around insulator 63, coil end 62aB, and transition wire 62bB located on the opposite output shaft side. As a result, with the present exemplary embodiment, since large-diameter part 66b of metallic inner cover 661 as a non-combustible layer can be more accurately disposed, fire and smoke can be more surely prevented from coming outside of motor 107.

Eighth Exemplary Embodiment

Figure 28:
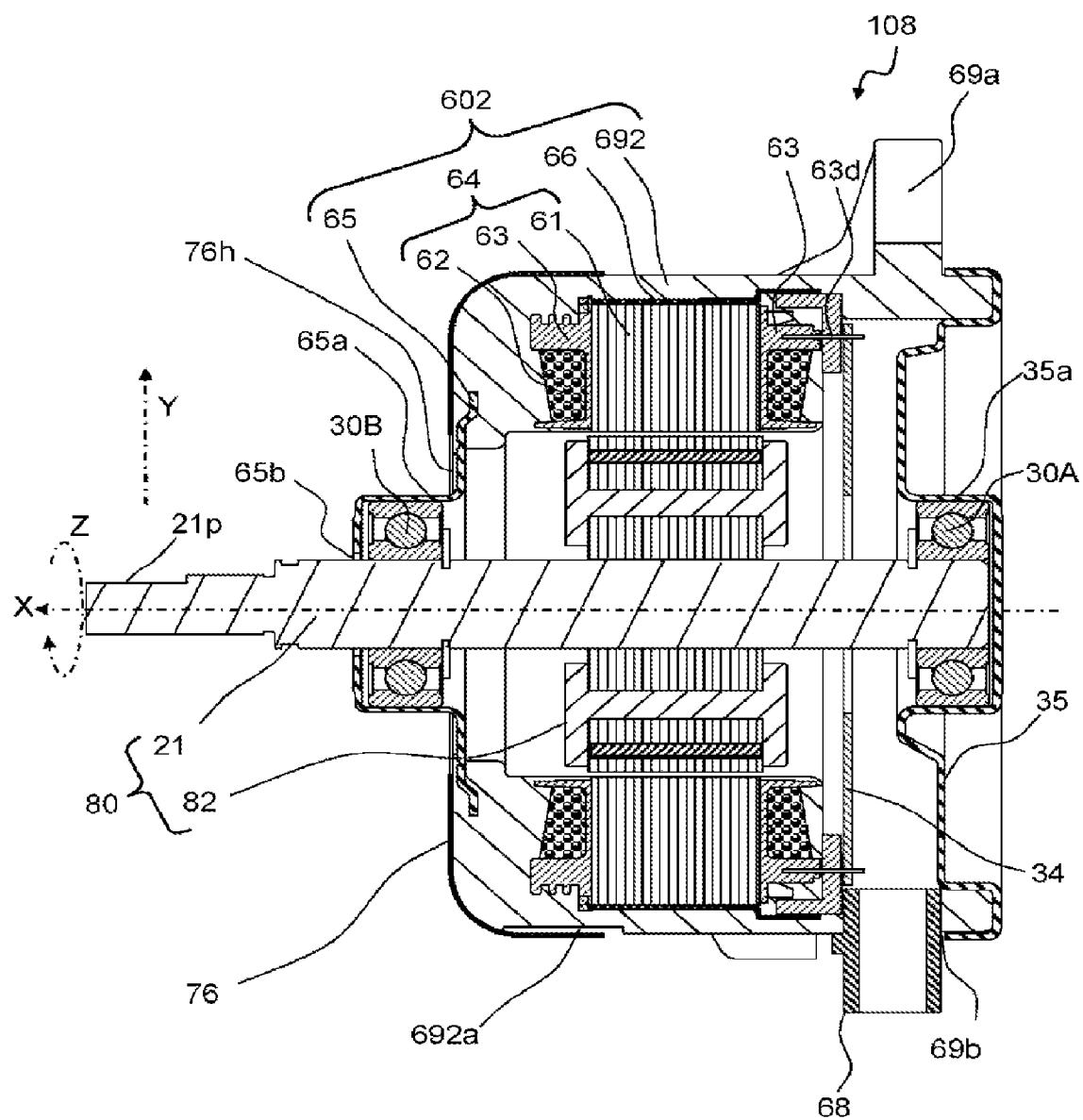
FIG. 28 is a cross-sectional view of a motor according to an eighth exemplary embodiment of the present invention.
Figure 29:
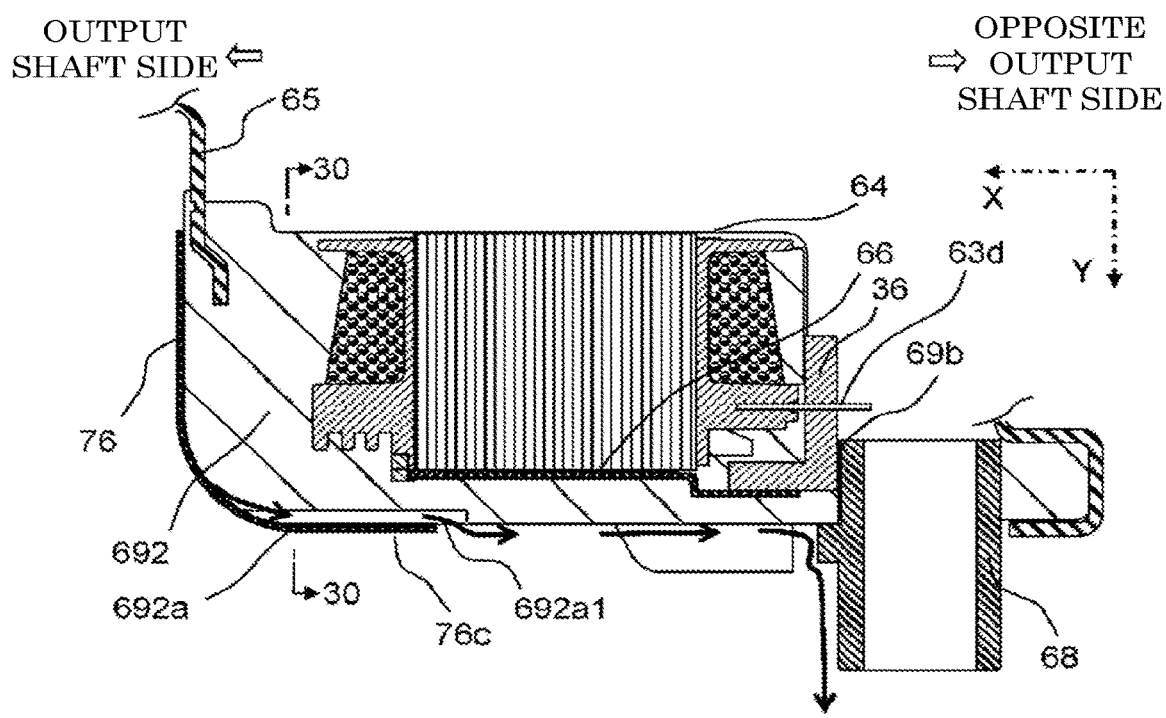
FIG. 29 is an enlarged cross-sectional view of the vicinity of a notch in the motor according to the eighth exemplary embodiment of the present invention.
Figure 30:
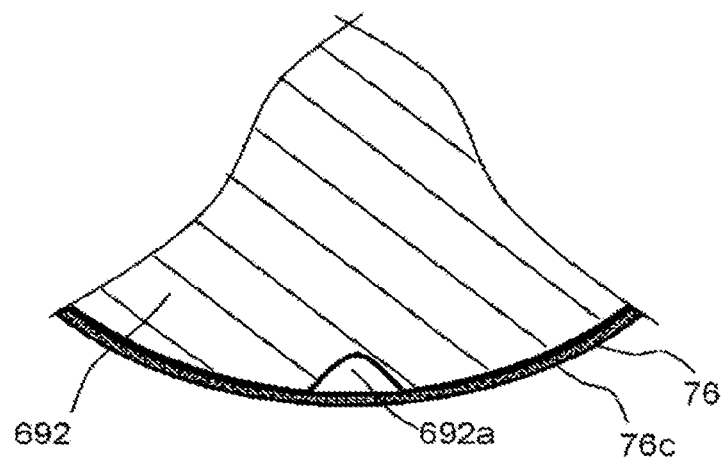
FIG. 30 is a plan cross-sectional view of the motor according to the eighth exemplary embodiment of the present invention taken along line 30-30 in FIG. 29.
Figure 31:
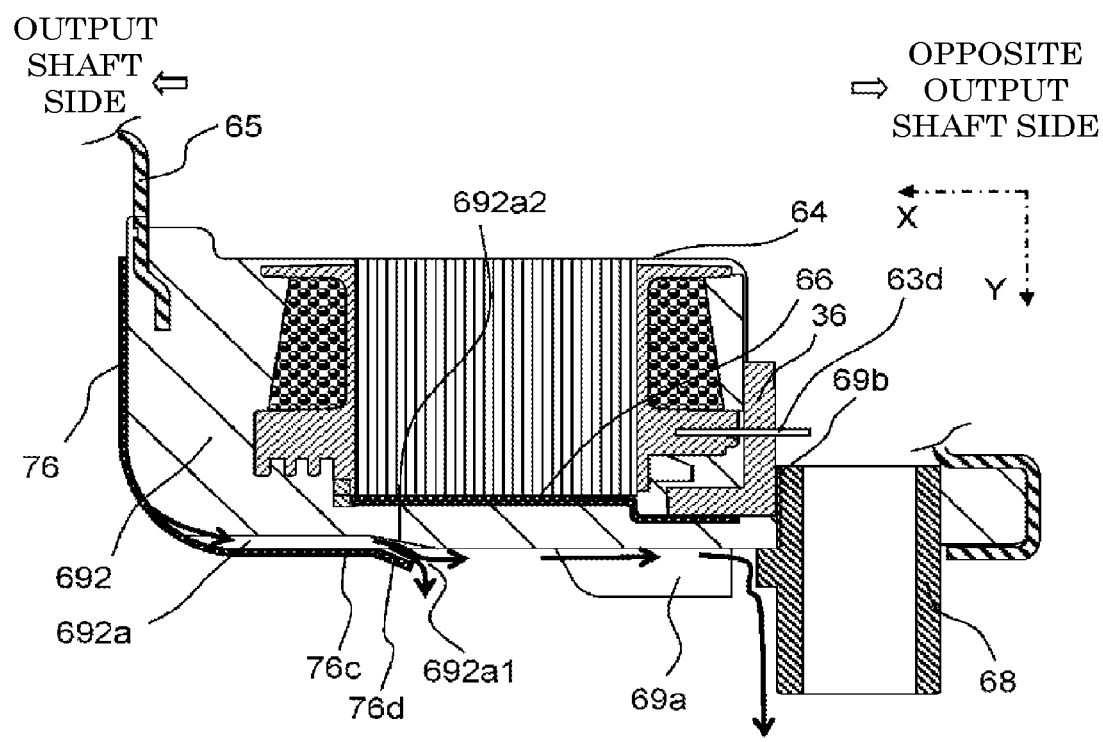
FIG. 31 is an enlarged cross-sectional view of the vicinity of another notch in the motor according to the eighth exemplary embodiment of the present invention.

FIG. 28 is a cross-sectional view of motor 108 according to an eighth exemplary embodiment of the present invention. FIG. 29 is an enlarged perspective view of the vicinity of notch 692a of motor 108 according to the eighth exemplary embodiment of the present invention. FIG. 30 is a plan cross-sectional view of motor 108 according to the eighth exemplary embodiment of the present invention taken along line 30-30 in FIG. 29. In addition, FIG. 31 is an enlarged perspective view of the vicinity of another notch of the motor according to the eighth exemplary embodiment of the present invention.

Compared with the sixth exemplary embodiment shown in FIG. 17, motor 108 in the present exemplary embodiment includes molding resin part 692 that is a modification of molding resin part 69 of the sixth exemplary embodiment. Specifically, as shown in FIG. 28, molding resin part 692 of motor 108 further includes notch 692a in molding resin part 69 of the sixth exemplary embodiment. However, the configuration and operation except the above arrangement is identical to the configuration of the sixth exemplary embodiment, and components identical to the components of the sixth exemplary embodiment are assigned the same reference marks, and the description of the sixth exemplary embodiment is used. In addition, a detailed description will be given next, but in the present exemplary embodiment, notch 692a is used to release water due to dew condensation and the like in metallic outer cover 76, from the main body of motor 108.

Notch 692a formed in molding resin part 692 has a shape in which, on an approximately circular-shaped cross-section of molding resin part 692 as shown in FIG. 30, a part of molding resin part 692 near an outer periphery of molding resin part 692 is recessed toward a central direction of the approximately circular shape. Further, as shown in FIG. 29, the above-described cross-sectional shape of notch 692a continues in the shaft direction X. In other words, notch 692a is a groove or recess formed by notching a part of molding resin part 692.

In the present exemplary embodiment, notch 692a is formed on the side of molding resin part 692 to which metallic outer cover 76 is attached. Further, notch 692a is formed such that when metallic outer cover 76 is attached to molding resin part 692, notch 692a and cylindrical part 76c of metallic outer cover 76 partially overlap each other as shown in FIG. 29. In other words, when metallic outer cover 76 is attached to molding resin part 692, notch 692a extends beyond the end part of metallic outer cover 76 to the opposite output shaft side in the shaft direction X. As described above, in the present exemplary embodiment, notch 692a is provided with notch opening 692a1 that is an opening on which notch 692a and cylindrical part 76c of metallic outer cover 76 do not face each other in the radial direction Y In addition, in the present exemplary embodiment, notch 692a is formed such that notch 692a and wire hole 69b to which wire holder 68 is attached are approximately at the same position in the circumferential direction Z. In other words, wire hole 69b and wire holder 68 are disposed on a line extended, in the shaft direction X, from an end part of notch 692a on the opposite output shaft side.

Metallic outer cover 76 is attached to molding resin part 692, in an exposed state. In addition, since metallic outer cover 76 is made of metal, dew condensation occurs more easily, and water easily gathers, for example, between molding resin part 692 and metallic outer cover 76. To address this issue, in the present exemplary embodiment, the above-mentioned groove-shaped notch 692a is provided to lead water formed in the vicinity of metallic outer cover 76 away from metallic outer cover 76.

In FIG. 29, an arrow mark is used to show an example of a path for the water to flow through. That is, motor 108 is fixed in a device or the like such that notch 692a and wire holder 68 are located on the lower side in the vertical direction. Then, water formed between molding resin part 692 and metallic outer cover 76 is first led to notch 692a. Further, the water flows from notch opening 692a1 of notch 692a to an outer surface of molding resin part 692. Further, the water having flown out flows along a ground side surface of molding resin part 692 and then reaches wire holder 68. Then, if a lead wire from wire holder 68 is led in a manner to deal with water, it is possible to use the lead wire to lead the water having reached wire holder 68 further away from motor 108.

As described above, in the present exemplary embodiment, molding resin part 692 has notch 692a as mentioned above. As a result, with the present exemplary embodiment, even if water is attached to metallic outer cover 76 for preventing fire and smoke from coming outside of motor 108 due to dew condensation or the like, the water can be led away from motor 108.

FIG. 31 shows a modified example of the present exemplary embodiment. FIG. 31 is an enlarged perspective view of the vicinity of another notch of the motor according to the eighth exemplary embodiment of the present invention.

The difference from the above-mentioned aspect shown in FIG. 28 to FIG. 30 is that tapered parts 76d and 692a2 are formed in the vicinity of notch opening 692a1 in the modified example. The other components are assigned the same reference marks as in the aspects in FIGS. 28 to 30, and the corresponding descriptions are used.

Specifically, as shown in FIG. 31, in the vicinity of notch opening 692a1, an end part, of metallic outer cover 76, on the opposite output shaft side has tapered part 76d opened in the radial direction Y. Similarly, molding resin part 692 has tapered part 692a2 at a position facing tapered part 76d. Tapered part 76d and tapered part 692a2 constitute inclined surfaces opened downward in the vertical direction such that the water having passed through notch 692a is smoothly discharged. As a result, the water having passed through notch 692a is more surely led outside of notch 692a.

Ninth Exemplary Embodiment

Figure 32:
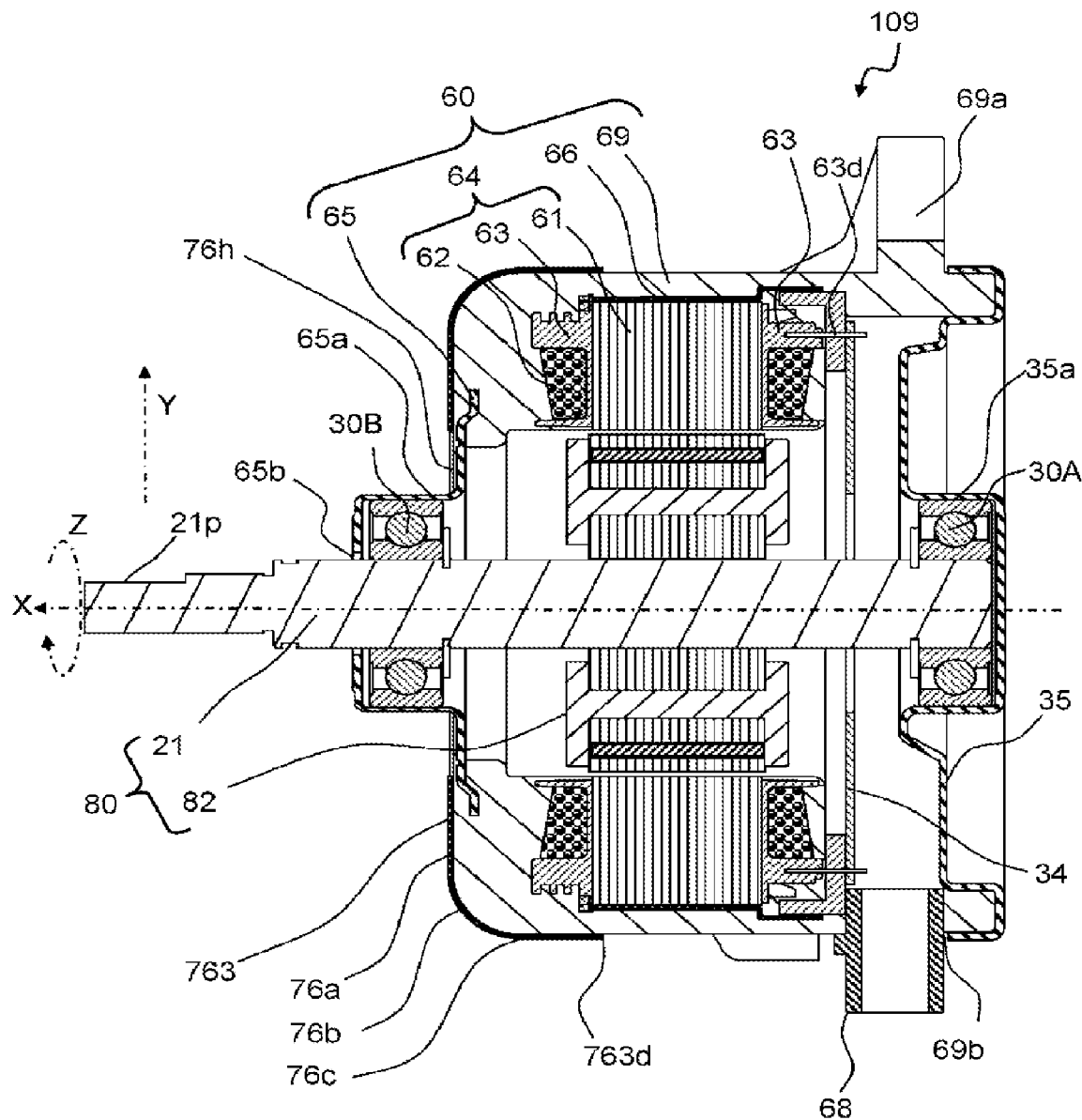
FIG. 32 is a cross-sectional view of a motor according to a ninth exemplary embodiment of the present invention.
Figure 33:
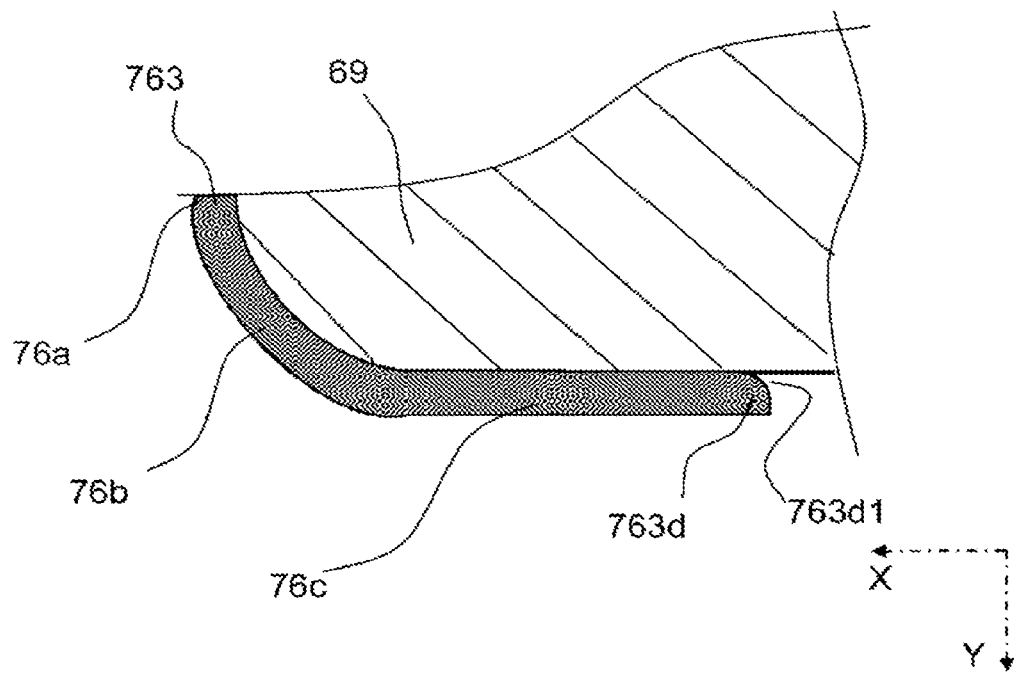
FIG. 33 is an enlarged view of the vicinity of a metallic outer cover in the motor according to the ninth exemplary embodiment of the present invention.

FIG. 32 is a cross-sectional view of motor 109 according to a ninth exemplary embodiment of the present invention. FIG. 33 is an enlarged view of the vicinity of metallic outer cover 763 of motor 109 according to the ninth exemplary embodiment of the present invention.

Compared with the sixth exemplary embodiment shown in FIG. 17, motor 109 in the present exemplary embodiment includes metallic outer cover 763 that is a modification of metallic outer cover 76 of the sixth exemplary embodiment. Specifically, as shown in FIG. 32 and FIG. 33, metallic outer cover 763 of motor 109 further includes edge part 763d having chamfered part 763d1 on metallic outer cover 76 of the sixth exemplary embodiment. However, the configuration and operation except the above arrangement is identical to the configuration of the sixth exemplary embodiment, and components identical to the components of the sixth exemplary embodiment are assigned the same reference marks, and the description of the sixth exemplary embodiment is used.

As shown in FIG. 33, metallic outer cover 763 further has chamfered part 763d1 on edge part 763d, which is a curved surface as a so-called "chamfer", in the opening side of metallic outer cover 763. In the present exemplary embodiment, since edge part 763d is rounded by providing chamfered part 763d1, metallic outer cover 763 can be easily attached to molding resin part 69. In addition, since edge part 763d is made as described above, injury, damage, and the like caused by a sharp edge are prevented. Note that chamfered part 763d1 may be a flat chamfer instead of a rounded chamfer.

Figure 34:
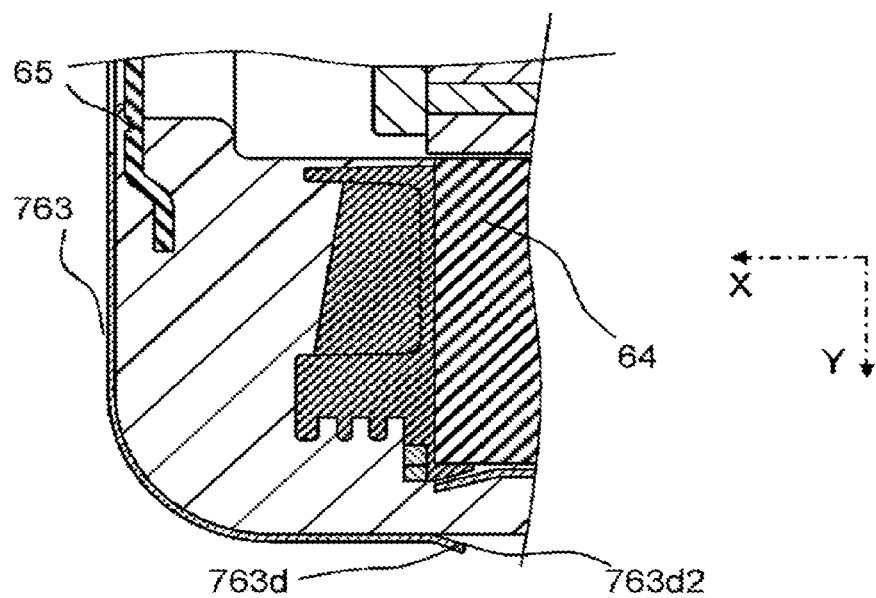
FIG. 34 is a partial cross-sectional view of a modified example of the motor according to the ninth exemplary embodiment of the present invention.

FIG. 34 is a partial cross-sectional view showing a modified example of the present exemplary embodiment. As shown in FIG. 34, in this modified example, edge part 763d on the opening side of metallic outer cover 763 is tapered part 763d2 having an inverse tapered shape. A diameter of tapered part 763d2 becomes larger toward the opposite output shaft side. This configuration also makes it easy to attach metallic outer cover 763 to molding resin part 69.

Tenth Exemplary Embodiment

Figure 35:
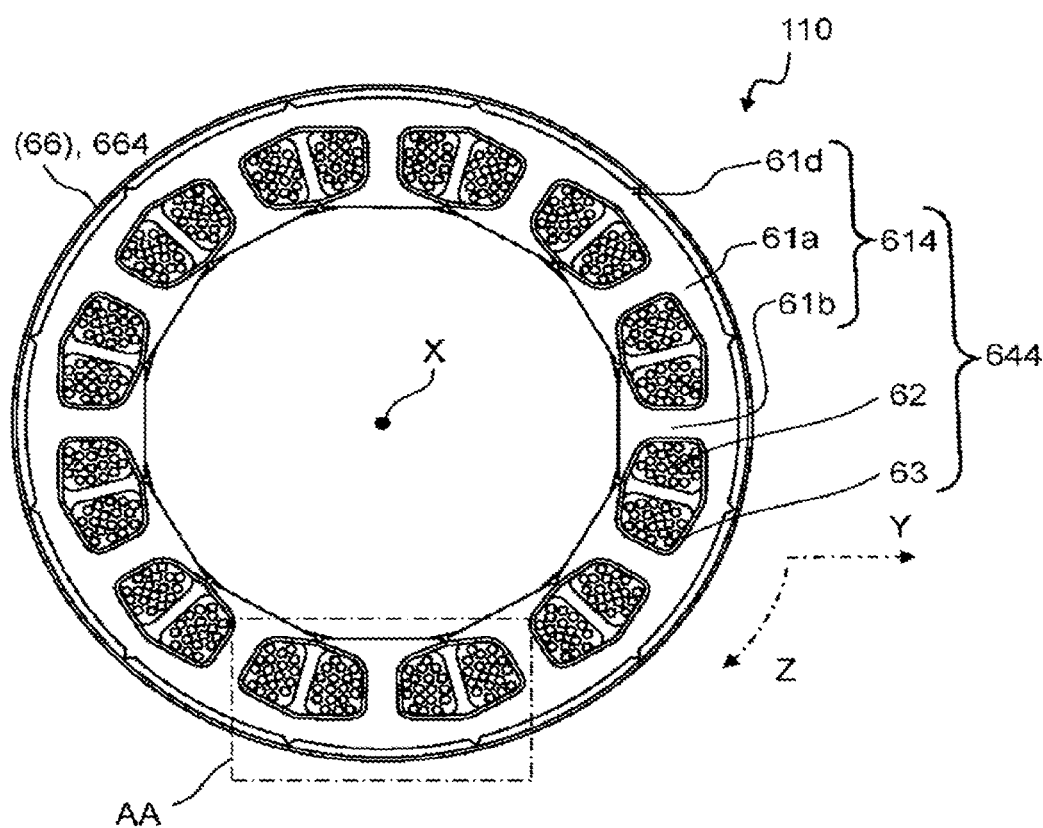
FIG. 35 is a plan cross-sectional view of a coil assembly of a motor of a tenth exemplary embodiment of the present invention, where a metallic inner cover is fit in the coil assembly but a swaging process is not performed yet.
Figure 36:
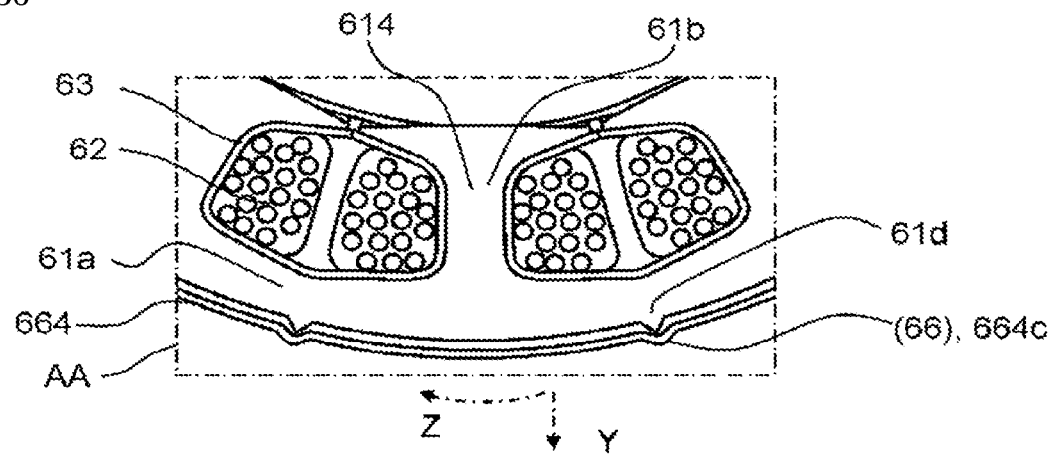
FIG. 36 is an enlarged cross-sectional view of area AA in FIG. 35 in the motor according to the tenth exemplary embodiment of the present invention.
Figure 37:
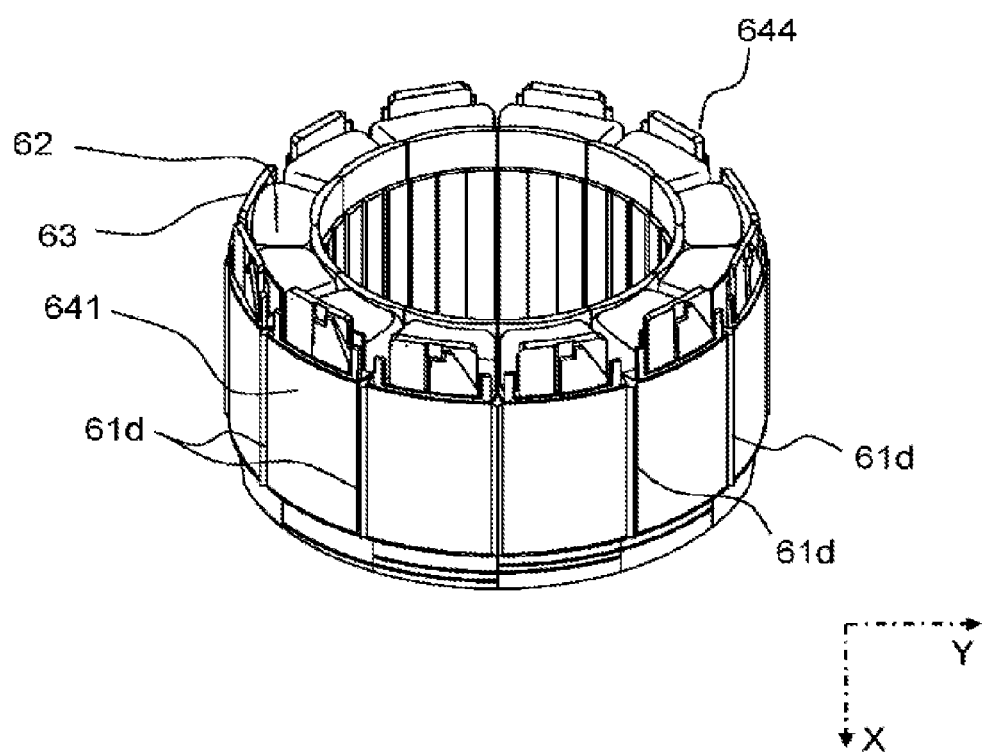
FIG. 37 is a perspective view showing an outer appearance of the coil assembly of the motor according to the tenth exemplary embodiment of the present invention.

FIG. 35 is a plan cross-sectional view of coil assembly 644 of motor 110 of a tenth exemplary embodiment of the present invention, where metallic inner cover 66 is fit on coil assembly 644 but a swaging process is not performed yet. FIG. 36 is an enlarged cross-sectional view of A-A part of FIG. 35, where metallic inner cover 66 is attached to coil assembly 644 and a swaging process has been performed. FIG. 37 is a perspective view showing an outer appearance of coil assembly 644 of motor 110 according to the tenth exemplary embodiment of the present invention.

Compared with the sixth exemplary embodiment shown in FIGS. 17 and 18, motor 110 in the present exemplary embodiment includes: stator core 614 of coil assembly 644 that is a modification of stator core 61 of coil assembly 64; and metallic inner cover 664 made by modifying metallic inner cover 66 of the sixth exemplary embodiment by a swaging process. Specifically, as shown in FIG. 35, motor 110 includes a stator including metallic inner cover 664 made by fitting metallic inner cover 66 on coil assembly 644 and then performing a swaging process on metallic inner cover 66. However, the configuration and operation except the above arrangement is identical to the configuration of the sixth exemplary embodiment, and components identical to the components of the sixth exemplary embodiment are assigned the same reference marks, and the description of the sixth exemplary embodiment is used.

Since the swaging process is performed as described above, protrusions 61d are formed on an outer periphery of stator core 614 as shown in FIGS. 36 and 37 in the present exemplary embodiment. At least one protrusion 61d only has to be formed, and in an example shown in the present exemplary embodiment, 12 protrusions 61d are formed, which is the same in number as teeth 61b. In the present exemplary embodiment, above-described protrusions 61d are formed on the outer periphery of stator core 614 at constant intervals in the circumferential direction Z. Each protrusion 61d extends in the shaft direction X and has a triangular shape protruding in the radial direction Y as shown in FIG. 36.

Further, in a step of assembling the stator of the present exemplary embodiment, metallic inner cover 66, which is the same as in the sixth exemplary embodiment and the like, is first fit on stator core 614 having these protrusions 61d. In this step, metallic inner cover 66 is fit on with an end of each protrusion 61d protruding in a triangular shape being in contact with an inner peripheral surface of metallic inner cover 66. That is, in the present exemplary embodiment, protrusions 61d make it possible to fit in metallic inner cover 66 while metallic inner cover 66 and stator core 614 are in contact with each other on a small contact area, and the workability can be accordingly improved.

In addition, in the present exemplary embodiment, after metallic inner cover 66 is fit on coil assembly 644, a swaging process with a swaging tool is performed on parts where protrusions 61d are located, from outside of metallic inner cover 66. Specifically, as shown in FIG. 36, the swaging tool having a triangular recess is pressed, from outside, against metallic inner cover 66 at a part where each protrusion 61d is located. With this process, the pressed parts of metallic inner cover 66 become protrusions each of which is curved in a triangular shape as shown in FIG. 36. In other words, with the above-described swaging process, metallic inner cover 664 having swaged parts 664c as the protrusions as shown in FIG. 36 is completed. In addition, of course, after the swaging process, an outer peripheral side of each protrusion 61d of stator core 614 and an inner peripheral side of corresponding swaged part 664c of metallic inner cover 664 are in contact with each other while meshing with each other in a triangular form as shown in FIG. 36.

As described above, in the present exemplary embodiment, at least one protrusion 61d is formed on stator core 614, and swaged part 664c is formed on metallic inner cover 664, corresponding to protrusion 61d. Then, metallic inner cover 664 is held on coil assembly 64 by protrusion 61d and swaged part 664c. Thus, it is possible to prevent positional deviation from each other, for example, at the time of molding. As a result, with the present exemplary embodiment, it is possible to prevent large-diameter part (66b) of metallic inner cover 664 as a non-combustible layer from being deviated from a predetermined position and other problematic issues; therefore, fire and smoke can be more surely prevented from coming outside of motor 110.

Although, in the present exemplary embodiment, a description is given to an example in which metallic inner cover 664 is held on coil assembly 64 on the basis of a swaging process, metallic inner cover 664 may be held by a spot-welding method. Specifically, after metallic inner cover 66 is fit on stator core 614 having protrusions 61d as mentioned above, a spot-welding method may be performed on parts at which protrusions 61d and metallic inner cover 66 are in contact with each other to fix metallic inner cover 66 on stator core 614.

Eleventh Exemplary Embodiment

Figure 38:
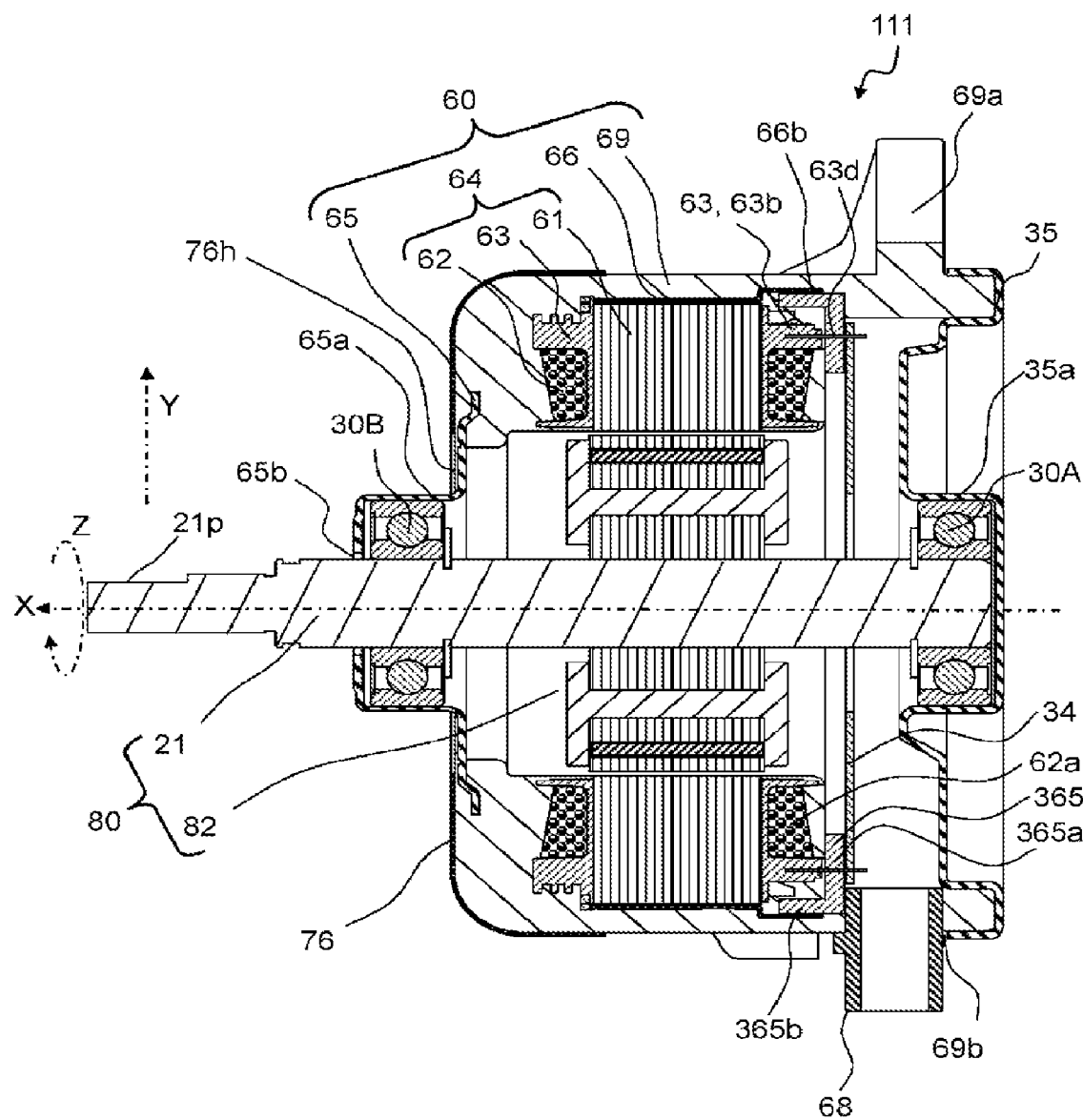
FIG. 38 is a cross-sectional view of a motor according to an eleventh exemplary embodiment of the present invention.
Figure 39:
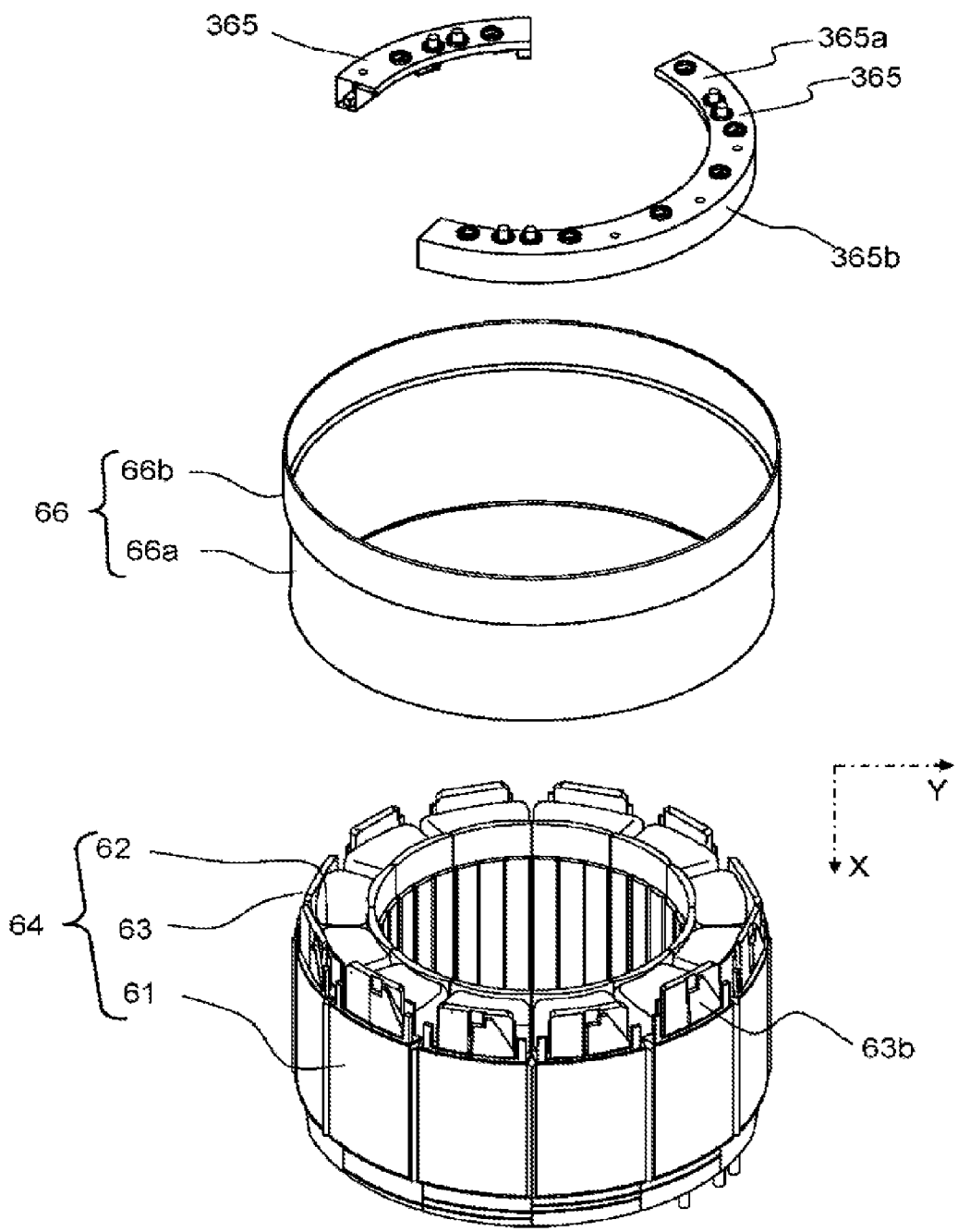
FIG. 39 is an exploded perspective view of a terminal cap, a metallic inner cover, and a coil assembly in the motor according to the eleventh exemplary embodiment of the present invention.

FIG. 38 is a cross-sectional view of motor 111 according to an eleventh exemplary embodiment of the present invention. FIG. 39 is an exploded perspective view of terminal cap 365, metallic inner cover 66, and coil assembly 64 of motor 111 according to the eleventh exemplary embodiment of the present invention.

Compared with the sixth exemplary embodiment shown in FIG. 17, motor 111 in the present exemplary embodiment includes terminal cap 365 that is a modification of terminal cap 36 of the sixth exemplary embodiment. Specifically, as shown in FIGS. 38 and 39, terminal cap 365 of motor 111 further includes wall 365b on terminal cap 36 of the sixth exemplary embodiment. However, the configuration and operation except the above arrangement is identical to the configuration of the sixth exemplary embodiment, and components identical to the components of the sixth exemplary embodiment are assigned the same reference marks, and the description of the sixth exemplary embodiment is used.

As shown in FIG. 39, terminal cap 365 includes wall 365b in addition to terminal face 365a having terminals for electric connection. Further, terminal cap 365 is formed of resin having insulation property as an insulating material. In the present exemplary embodiment, above-described terminal caps 365 are disposed on the opposite output shaft side in motor 111 As shown in FIG. 39, terminal cap 365 is disposed such that terminal face 365a faces coil assembly 64. In addition, wall 365b extends in the shaft direction X from an outer peripheral side of terminal face 365a. That is, wall 365b is parallel to large-diameter part 66b of metallic inner cover 66. Wall 365b is disposed between large-diameter part 66b and outer peripheral walls 63b included in insulators 63, in the radial direction Y. Between wall 365b and coil ends 62a, outer peripheral wall 63b is located.

As described above, in the present exemplary embodiment, terminal cap 365 includes wall 365b. With the present exemplary embodiment, this configuration prevents the terminals disposed on terminal face 365a and metallic inner cover 66 from being in contact with each other, thereby improving safety.

Twelfth Exemplary Embodiment

Figure 40:
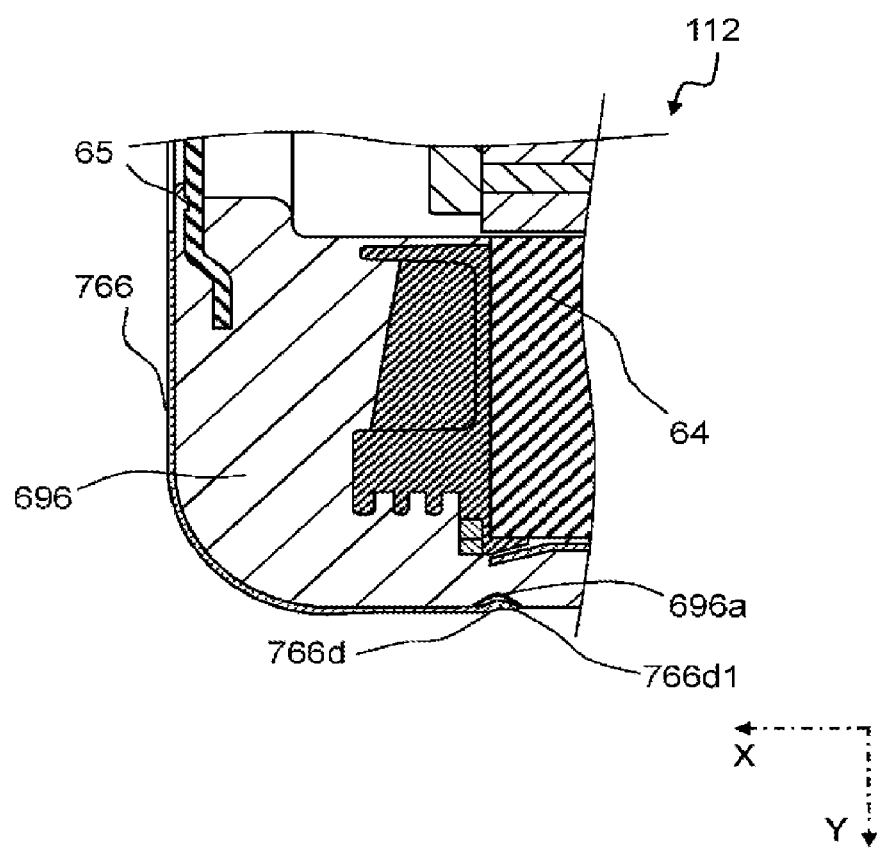
FIG. 40 is a partially enlarged cross-sectional view of a motor according to a twelfth exemplary embodiment of the present invention.
Figure 41:
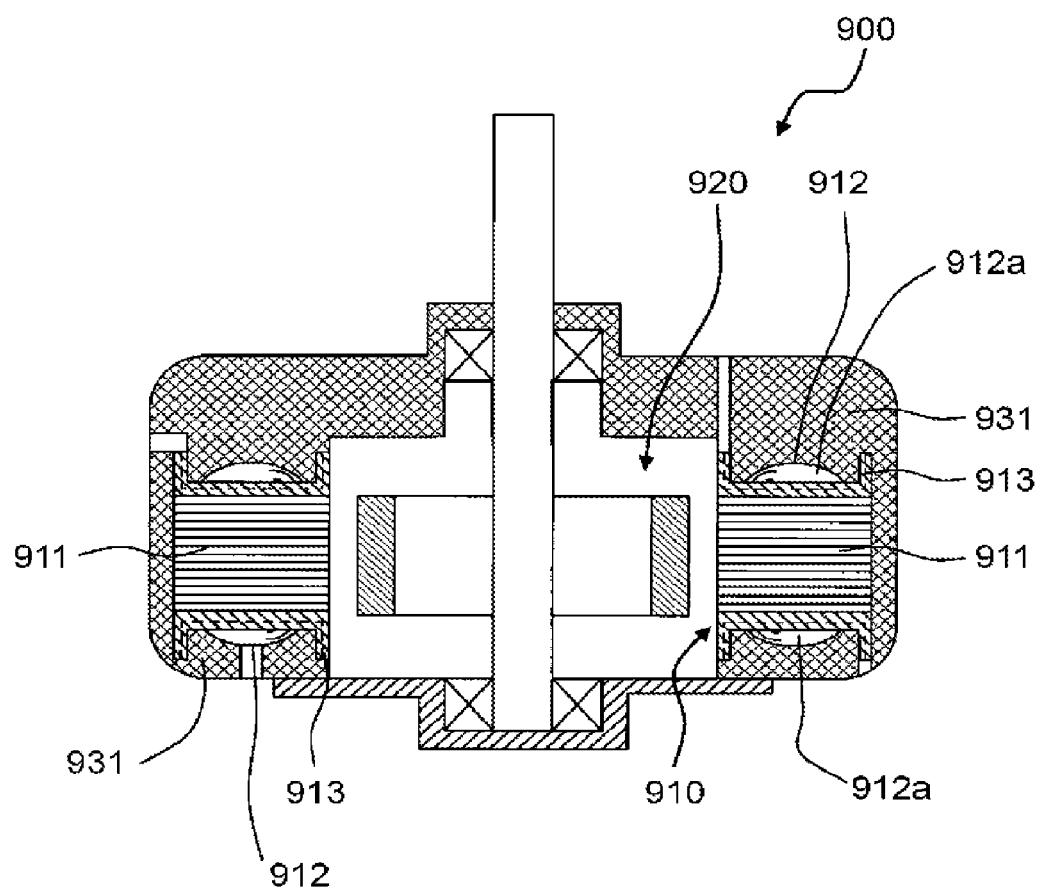
FIG. 41 is a front cross-sectional view of a conventional motor.

FIG. 40 is a partially enlarged cross-sectional view of motor 112 according to a twelfth exemplary embodiment of the present invention.

Compared with the sixth exemplary embodiment shown in FIG. 17, motor 112 in the present exemplary embodiment includes: molding resin part 696 that is a modification of molding resin part 69 of the sixth exemplary embodiment; and metallic outer cover 766 that is a modification of metallic outer cover 76 of the sixth exemplary embodiment. Specifically, as shown in FIG. 40, motor 112 has recess 696a formed in molding resin part 696 and has bent part 766d1 on edge part 766d of metallic outer cover 766. However, the configuration and operation except the above arrangement is identical to the configuration of the sixth exemplary embodiment, and components identical to the components of the sixth exemplary embodiment are assigned the same reference marks, and the description of the sixth exemplary embodiment is used.

At least one recess 696a is formed in the outer periphery of molding resin part 696, at a position closer to the output shaft. Further, bent part 766d1 is formed corresponding to recess 696a on edge part 766d, of metallic outer cover 766, on the opening part side. In the above configuration, when metallic outer cover 766 is attached to molding resin part 696, bent part 766d1 meshes with recess 696a. Therefore, with the present exemplary embodiment, metallic outer cover 766 can be easily attached to and fixed on molding resin part 696.

As apparent from the above description, the present disclosure improves safety of a motor itself even in the case where a safety protection device does not normally function when the motor is driven. In other words, an object of the present disclosure is to prevent fire and smoke from coming outside of a motor under an unusual environment.

Specifically, as described above, if an excessive current is kept being supplied to a motor while a safety protection device does not normally function, the excessive current continues to flow through a coil. In this case, if a problem has occurred with a winding wire constituting the coil and a layer short has occurred in the coil, the coil can be a heat source.

The present disclosure prevents the above-mentioned fire and smoke from flowing out by surrounding the coil, which can be a heat source, with a non-combustible layer. For the non-combustible layer, it is possible to use non-combustible materials such as air, a metallic material, and ceramic.

In a motor, a rotor rotates around a rotary shaft in general. For this reason, an outer shape of a motor generally has an approximately columnar shape extending in a rotary shaft direction. Therefore, a non-combustible layer according to the present disclosure needs to surround a coil on a side surface side of the columnar shape and a bottom surface side and an upper surface side of the columnar shape.

When an inner rotor type motor is taken into consideration, it is ideal to directly surround a coil, which can be a heat source, or to surround a coil assembly with a non-combustible layer. However, the coil is wound on a stator. In other words, inside the coil assembly, the rotor is located, being fixed to the rotary shaft. Therefore, these members cannot be directly surrounded easily by a non-combustible layer.

To address this issue, the applicants of the present application have conceived the above-mentioned exemplary embodiments in which the coil or the coil assembly on a part possible to be surrounded is surrounded in the closest place and in which the coil or the coil assembly on a part impossible to be surrounded is surrounded in a possible range.

For example, in particular, the sixth exemplary embodiment, which is considered useful in terms of electromagnetic compatibility (EMC) and manufacturing, is configured as follows.

Specifically, a metallic inner cover is directly attached to a stator core on which a coil is wound such that the metallic inner cover includes a side surface side of a coil end located on an opposite output shaft side.

The other parts, that is, a side surface side of the coil end located on an output shaft side and a bottom surface side and an upper surface side of each of the coil ends located on the output shaft side and the opposite output are surrounded by a first and second brackets and a metallic outer cover.

With the present configuration, an entire periphery of the coil assembly can be directly or indirectly surrounded. Therefore, when the present exemplary embodiment is employed, it is achieved that fire and smoke is prevented from coming outside of a motor under an unusual environment, which is an object of the present disclosure. In addition, it is possible to easily achieve a feature of a molded motor, that is, suppression of sound and vibration or a form including various outer shapes, such as presence or absence of a mounting part.

In other words, if the outer surface of a motor is surrounded by a metallic cover, it is possible to prevent fire and smoke from coming outside of the motor under an unusual environment, which is a main purpose. However, the following points should be considered.

In order to cover all of the outer surface of a motor with a metallic cover, it is necessary to prepare many metallic covers corresponding to various outer shapes such as presence or absence of a mounting part. Therefore, since it is necessary to carry a variety of inventory in terms of manufacturing, productivity needs to be improved.

In addition, there will be a small gap created between an outer surface of a motor and a metallic cover. This gap functions as an air layer. Specifically, this air gap functions to inhibit dissipation of heat of the motor when the motor is normally used. Therefore, there needs to be improvement in terms of cooling the motor.

Further, if the outer surface of a motor is surrounded by a metallic cover and the motor is used being attached to an electric device, the metallic cover acts as an antenna. Therefore, there needs to be further improvement in EMC resistance.

Therefore, in view of the spirit of the present disclosure, it is not intended to exclude a form in which an outer surface of a motor is covered with a metallic cover, but the above-mentioned exemplary embodiments are more preferable in which a coil or a coil assembly is covered at a closer position.

The present invention can be widely used in a field of a so-called molded motor in which a stator is covered with molding resin.

The invention claimed is:

1. A motor comprising:
    a stator including
        a stator core, and
        a coil wound on the stator core;
    a rotor disposed inside the stator, the rotor including
        a rotary shaft extending in a shaft center direction, and
        a rotation body that includes a magnet component, extends in the shaft center direction, and is fixed to the rotary shaft;
    a shaft bearing that rotatably holds the rotor; and
    a molding resin covering the stator, wherein:
    the coil includes a coil end protruding from the stator core in the shaft center direction, and is provided with a non-combustible layer covering the coil end,
    the motor further comprises two metallic covers covering the coil end through the molding resin and the two metallic covers do not contact each other,
    an outer peripheral surface side part of the molding resin is formed in a cylindrical shape and constitutes barrel, which is a part of an outer shell of the motor,
    end edges of the barrel are each inserted in an outer circumferential part of a first bracket and a second bracket, thereby being fixed,
    the two metallic covers include a first metallic cover having an opening and a second metallic cover, and
    a first end of the rotary shaft protrudes from the first metallic cover through the opening and the second bracket cover covers a second end of the rotary shaft.

2. The motor of claim 1, wherein the two metallic covers comprise:
    a first metallic cover covering the coil end in the shaft center direction through the molding resin, and
    a second metallic cover covering the coil end from the shaft center direction to a radial direction through the molding resin.

3. The motor of claim 1, wherein the two metallic covers are in direct contact with the molding resin.

* * * * *